US012811635B2

(12) United States Patent
Lee et al.

(10) Patent No.: US 12,811,635 B2
(45) Date of Patent: Nov. 24, 2026

(54) CSI REPORTING

(71) Applicant: Samsung Electronics Co., Ltd., Suwon-si (KR)

(72) Inventors: Gilwon Lee, McKinney, TX (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 18/912,509

(22) Filed: Oct. 10, 2024

(65) Prior Publication Data

US 2025/0132792 A1 Apr. 24, 2025

Related U.S. Application Data

(60) Provisional application No. 63/640,632, filed on Apr. 30, 2024, provisional application No. 63/631,826, (Continued)

(51) Int. Cl.

| | |
|---|---|
| ***H04B 7/04*** | (2017.01) |
| ***H04B 7/0456*** | (2017.01) |
| ***H04W 24/10*** | (2009.01) |

(52) U.S. Cl.

CPC .......... *H04B 7/0456* (2013.01); *H04W 24/10* (2013.01)

(58) Field of Classification Search

CPC ................ H04B 7/0456; H04B 7/0469; H04B 7/0479; H04B 7/0626; H04B 7/0639; H04W 24/10

(Continued)

(56) References Cited

U.S. PATENT DOCUMENTS

| | | | | |
|---|---|---|---|---|
| 2022/0052732 | A1* | 2/2022 | Sun | H04B 7/0639 |
| 2022/0149915 | A1* | 5/2022 | Mittal | H04B 7/0645 |

(Continued)

FOREIGN PATENT DOCUMENTS

| | | | |
|---|---|---|---|
| WO | 2022084725 | A1 | 4/2022 |
| WO | 2023175025 | A2 | 9/2023 |
| WO | 2023196421 | A1 | 10/2023 |

OTHER PUBLICATIONS

International Search Report and Written Opinion issued Feb. 12, 2025 regarding International Application No. PCT/KR2024/016058, 6 pages.

(Continued)

*Primary Examiner* — Emmanuel Bayard

(57) ABSTRACT

Apparatuses and methods for channel state information (CSI) reporting. A method performed by a user equipment (UE) includes receiving information about a channel state information (CSI) report, the information indicating an antenna port group, and determining, based on the information, a spatial domain (SD) basis vector $b_l$ for each layer l=1, 2 . . . , v. The method further includes determining, based on the information, an inter-polarization coefficient value $c_l$ for each layer l=1, 2 . . . , v, where v is a rank value, and transmitting the CSI report including a precoding matrix indicator (PMI). The PMI indicates the SD basis vector and the inter-polarization coefficient value.

20 Claims, 15 Drawing Sheets

Related U.S. Application Data filed on Apr. 9, 2024, provisional application No. 63/569,564, filed on Mar. 25, 2024, provisional application No. 63/545,500, filed on Oct. 24, 2023.

(58) Field of Classification Search
USPC .................................................... 375/267, 299
See application file for complete search history.

(56) References Cited

U.S. PATENT DOCUMENTS

| | | | | |
|---|---|---|---|---|
| 2022/0224391 | A1* | 7/2022 | Ramireddy | H04B 7/0417 |
| 2022/0286176 | A1* | 9/2022 | Grossmann | H04B 7/0456 |
| 2022/0295499 | A1 | 9/2022 | Rahman et al. | |
| 2022/0368386 | A1* | 11/2022 | Brown | H04B 7/0481 |
| 2023/0283326 | A1 | 9/2023 | Shahmohammadian et al. | |
| 2023/0291452 | A1 | 9/2023 | Chou et al. | |
| 2024/0030981 | A1* | 1/2024 | Fan | H04B 7/0626 |
| 2025/0055528 | A1* | 2/2025 | Muruganathan | H04B 7/0626 |
| 2025/0159518 | A1* | 5/2025 | Muruganathan | H04L 5/0051 |
| 2025/0184795 | A1* | 6/2025 | Lee | H04B 7/0639 |
| 2025/0274173 | A1* | 8/2025 | Lee | H04B 7/0478 |

OTHER PUBLICATIONS

"LTE; Evolved Universal Terrestrial Radio Access (E-UTRA); Physical channels and modulation (3GPP TS 36.211 version 17.3.0 Release 17)", ETSI TS 136 211 V17.3.0, Apr. 2023, 248 pages.

"LTE; Evolved Universal Terrestrial Radio Access (E-UTRA); Multiplexing and channel coding (3GPP TS 36.212 version 17.1.0 Release 17)", ETSI TS 136 212 V17.1.0, Apr. 2022, 264 pages.

"LTE; Evolved Universal Terrestrial Radio Access (E-UTRA); Physical layer procedures (3GPP TS 36.213 version 17.3.0 Release 17)", ETSI TS 136 213 V17.3.0, Oct. 2022, 586 pages.

"LTE; Evolved Universal Terrestrial Radio Access (E-UTRA); Medium Access Control (MAC) protocol specification (3GPP TS 36.321 version 17.3.0 Release 17)", ETSI TS 136 321 V17.3.0, Jan. 2023, 148 pages.

"LTE; Evolved Universal Terrestrial Radio Access (E-UTRA); Radio Resource Control (RRC); Protocol specification (3GPP TS 36.331 version 17.3.0 Release 17)", ETSI TS 136 331 V17.3.0, Jan. 2023, 1140 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"5G; NR; Multiplexing and channel coding (3GPP TS 38.212 version 17.3.0 Release 17)", ETSI TS 138 212 V17.3.0, Sep. 2022, 206 pages.

"5G; NR; Physical layer procedures for data (3GPP TS 38.214 version 17.3.0 Release 17)", ETSI TS 138 214 V17.3.0, Sep. 2022, 237 pages.

"5G; NR; Physical channels and modulation (3GPP TS 38.211 version 17.3.0 Release 17)", ETSI TS 138 211 V17.3.0, Sep. 2022, 141 pages.

* cited by examiner

CSI REPORTING

CROSS-REFERENCE TO RELATED AND CLAIM OF PRIORITY

The present application claims priority under 35 U.S.C. § 119(e) to U.S. Provisional Patent Application No. 63/545,500 filed on Oct. 24, 2023; U.S. Provisional Patent Application No. 63/569,564 filed on Mar. 25, 2024; U.S. Provisional Patent Application No. 63/631,826 filed on Apr. 9, 2024; and U.S. Provisional Patent Application No. 63/640,632 filed on Apr. 30, 2024, which are hereby incorporated by reference in their entirety.

TECHNICAL FIELD

The present disclosure relates generally to wireless communication systems and, more specifically, the present disclosure is related to apparatuses and methods for channel state information (CSI) reporting.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to CSI reporting.

In one embodiment, a user equipment (UE) is provided. The UE includes a transceiver configured to receive information about a CSI report. The information indicating an antenna port group. The UE further includes a processor operably coupled to the transceiver. The processor is configured to determine, based on the information, a spatial domain (SD) basis vector $b_l$ for each layer l=1, 2 . . . , v, and determine, based on the information, an inter-polarization coefficient value $c_l$ for each layer l=1, 2 . . . , v, where v is a rank value. The transceiver is further configured to transmit the CSI report including a precoding matrix indicator (PMI). The PMI indicates the SD basis vector and the inter-polarization coefficient value.

In another embodiment, a base station (BS) is provided. The BS includes a processor and a transceiver operably coupled to the processor. The transceiver is configured to transmit information about a CSI report, the information indicating an antenna port group; and receive the CSI report that includes a PMI. The PMI indicates (i) a SD basis vector $b_l$ for each layer l=1, 2 . . . , v and (ii) an inter-polarization coefficient value $c_l$ for each layer l=1, 2 . . . , v, where v is a rank value.

In yet another embodiment, a method performed by a UE is provided. The method includes receiving information about a CSI report, the information indicating an antenna port group and determining, based on the information, a SD basis vector $b_l$ for each layer l=1, 2 . . . , v. The method further includes determining, based on the information, an inter-polarization coefficient value $c_l$ for each layer l=1, 2 . . . , v, where v is a rank value, and transmitting the CSI report including a PMI. The PMI indicates the SD basis vector and the inter-polarization coefficient value.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1-19 discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [REF1] 3GPP TS 36.211 v17.3.0, "E-UTRA, Physical channels and modulation;" [REF2] 3GPP TS 36.212 v17.1.0, "E-UTRA, Multiplexing and Channel coding;" [REF3] 3GPP TS 36.213 v17.3.0, "E-UTRA, Physical Layer Procedures;" [REF4] 3GPP TS 36.321 v17.3.0, "E-UTRA, Medium Access Control (MAC) protocol specification;" [REF5] 3GPP TS 36.331 v17.3.0, "E-UTRA, Radio Resource Control (RRC) Protocol Specification;" [REF6] 3GPP TR 22.891 v1.2.0; [REF7] 3GPP TS 38.212 v17.3.0, "E-UTRA, NR, Multiplexing and Channel coding;" [REF8] 3GPP TS 38.214 v17.3.0, "E-UTRA, NR, Physical layer procedures for data;" and [REF9] 3GPP TS 38.211 v17.3.0, "E-UTRA, NR, Physical channels and modulation;"

Figure 1:
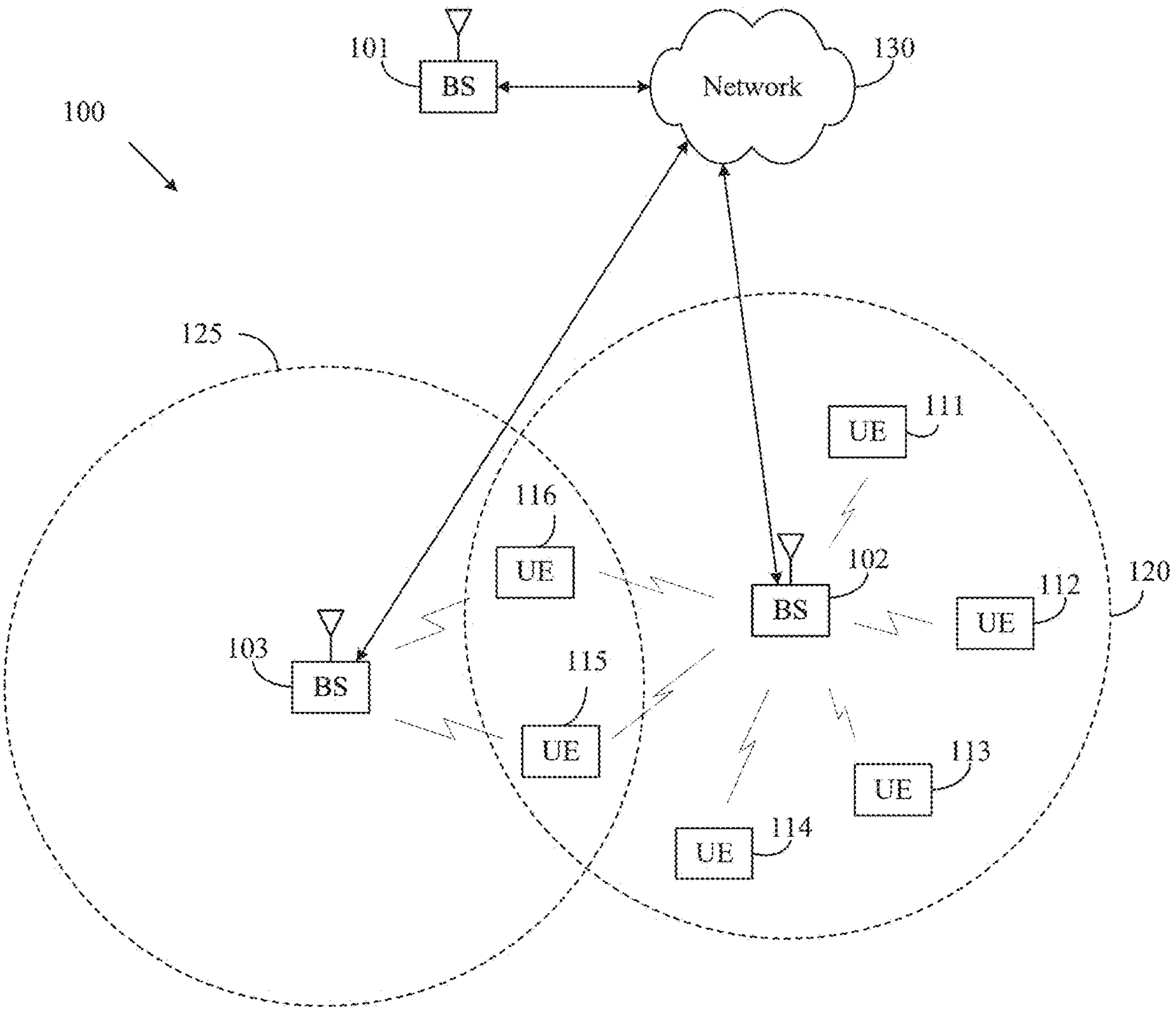
FIG. 1 illustrates an example wireless network according to embodiments of the present disclosure.
Figure 2:
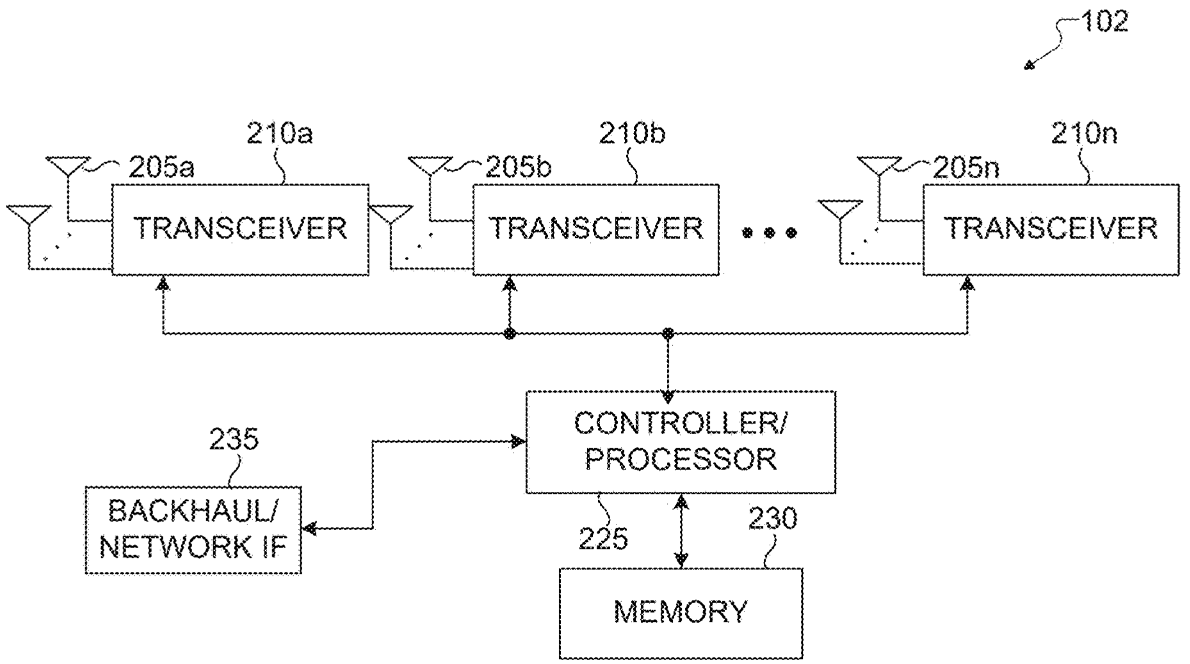
FIG. 2 illustrates an example gNodeB (gNB) according to embodiments of the present disclosure.
Figure 3:
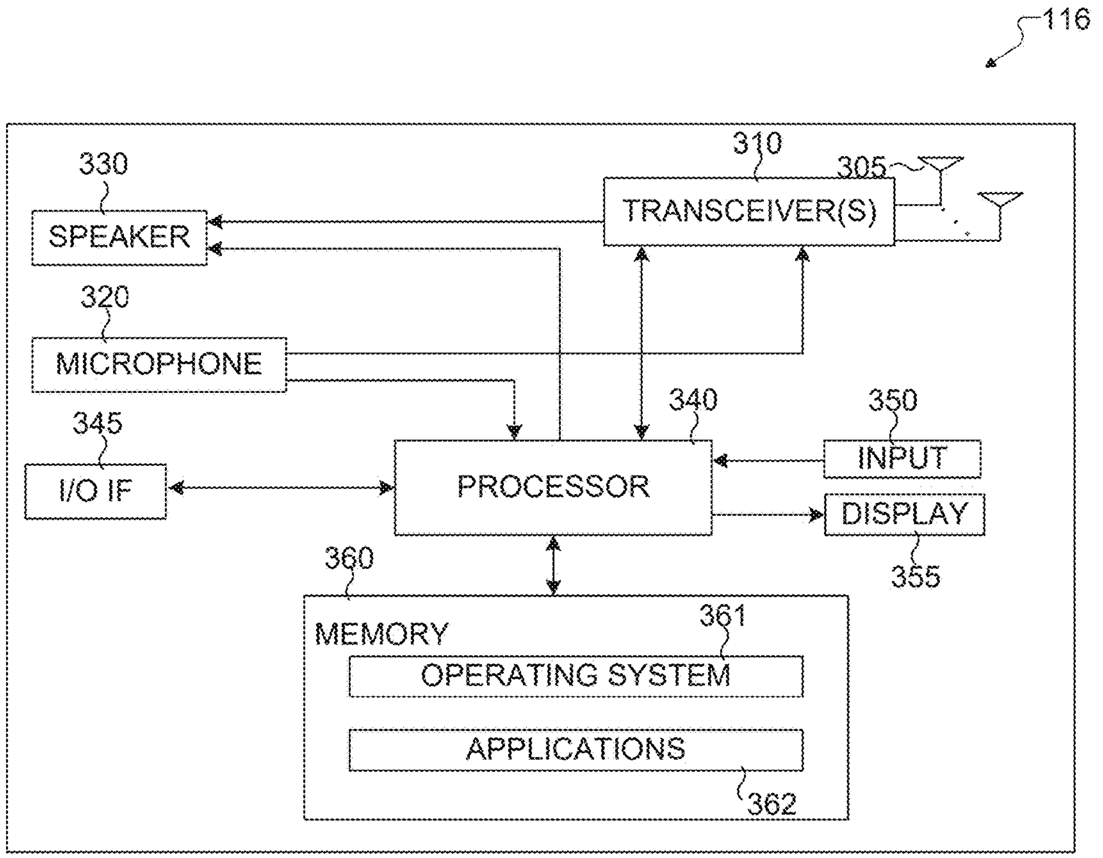
FIG. 3 illustrates an example UE according to embodiments of the present disclosure.

FIGS. 1-18 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of the present disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for performing CSI reporting. In certain embodiments, one or more of the BSs 101-103 include circuitry, programing, or a combination thereof to support CSI reporting.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming radio frequency (RF) signals, such as signals transmitted by UEs in the wireless network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. As another example, the controller/processor 225 could support methods for CSI reporting. Any of a wide variety of other functions could be supported in the gNB 102 by the controller/processor 225.

The controller/processor 225 is also capable of executing programs and other processes resident in the memory 230, such as processes to support CSI reporting. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for CSI reporting as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
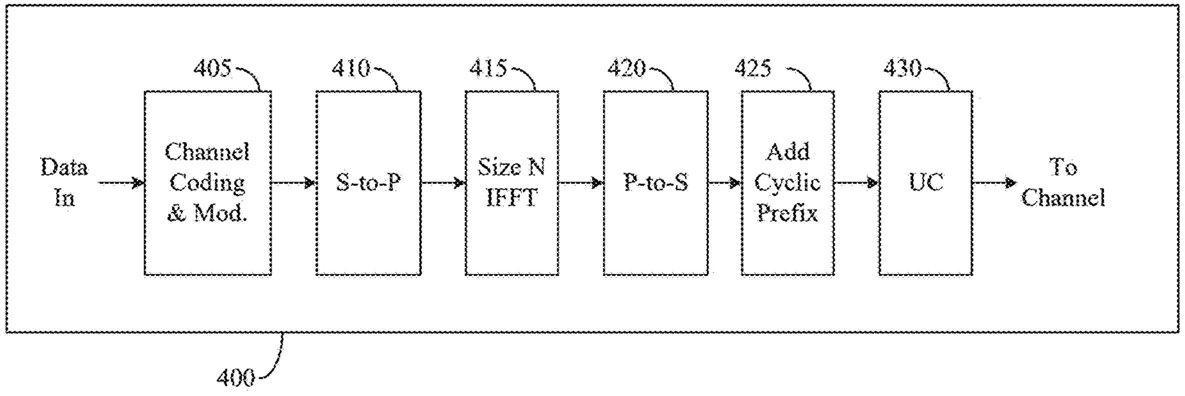
FIGS. 4A and 4B illustrate an example of a wireless transmit and receive paths according to embodiments of the present disclosure.
Figure 4B:
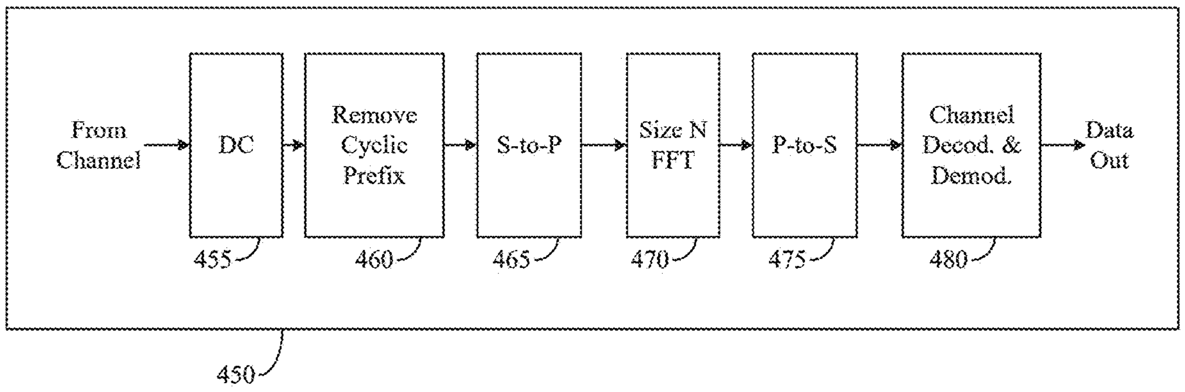

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the transmit path 400 is configured for CSI reporting as described in embodiments of the present disclosure.

As illustrated in FIG. 4A, the transmit path 400 includes a channel coding and modulation block 405, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 450 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB and the UE. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

Figure 5:
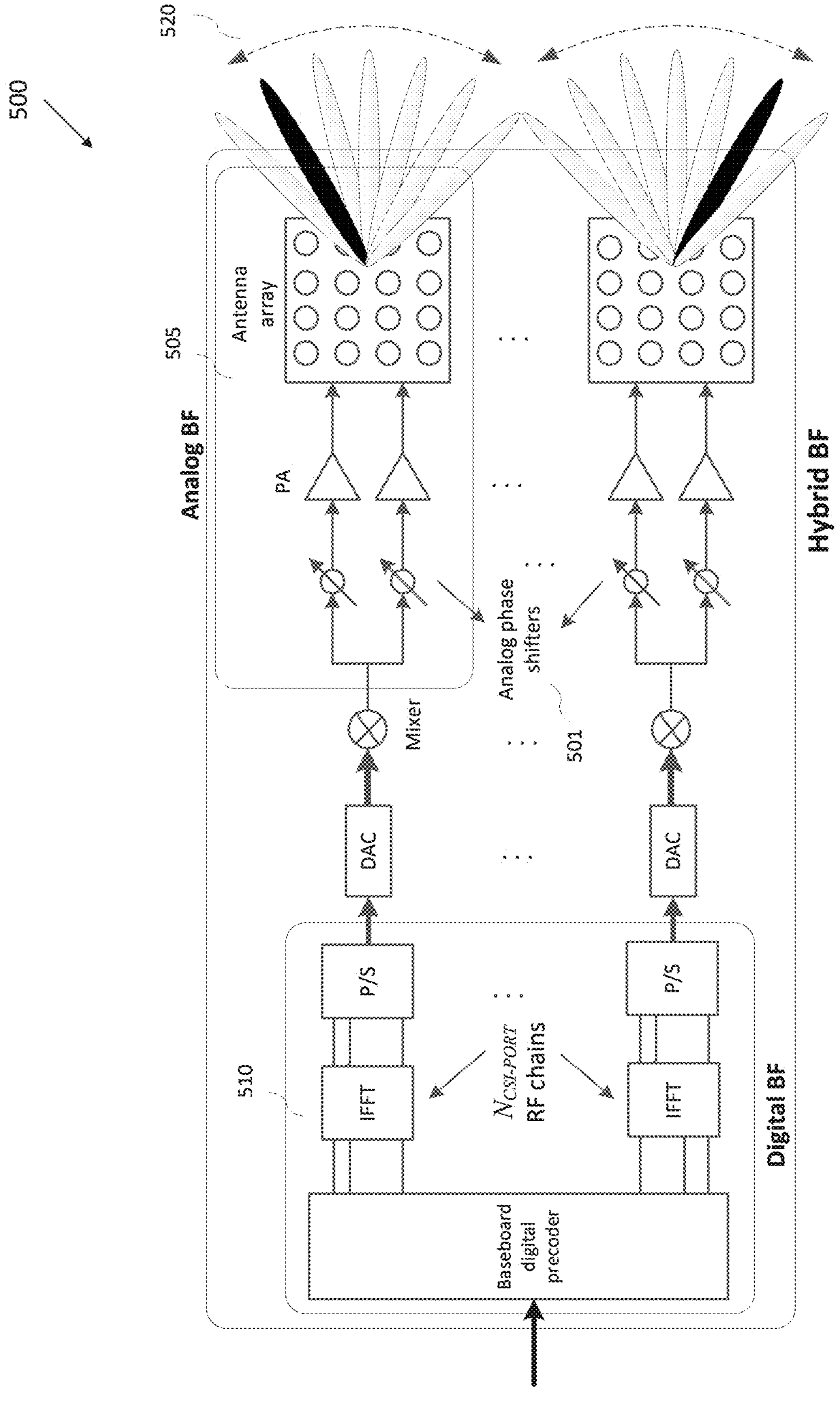
FIG. 5 illustrates an example of a transmitter structure for beamforming according to embodiments of the present disclosure.

FIG. 5 illustrates an example of a transmitter structure 500 for beamforming according to embodiments of the present disclosure. In certain embodiments, one or more of gNB 102 or UE 116 includes the transmitter structure 500. For example, one or more of antenna 205 and its associated systems or antenna 305 and its associated systems can be included in transmitter structure 500. This example is for illustration only and other embodiments can be used without departing from the scope of the present disclosure.

Accordingly, embodiments of the present disclosure recognize that Rel-14 LTE and Rel-15 NR support up to 32 CSI reference signal (CSI-RS) antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 5. Then, one CSI-RS port can be mapped onto a large number of antenna elements that can be controlled by a bank of analog phase shifters 501. One CSI-RS port can then correspond to one sub-array which produces a narrow analog beam through analog beamforming 505. This analog beam can be configured to sweep across a wider range of angles 520 by varying the phase shifter bank across symbols or slots/subframes. The number of sub-arrays (equal to the number of RF chains) is the same as the number of CSI-RS ports $N_{CSI-PORT}$. A digital beamforming unit 510 performs a linear combination across $N_{CSI-PORT}$ analog beams to further increase a precoding gain. While analog beams are wideband (hence not frequency-selective), digital precoding can be varied across frequency sub-bands or resource blocks. Receiver operation can be conceived analogously.

Since the transmitter structure 500 of FIG. 5 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 5 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are essential to compensate for the additional path loss.

The present disclosure relates generally to wireless communication systems and, more specifically, to compression-based CSI reporting.

A communication system includes a downlink (DL) that conveys signals from transmission points such as Base Stations (BSs) or NodeBs to User Equipments (UEs) and an UpLink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE, DL signals can include data signals conveying information content, control signals conveying DL Control Information (DCI), and Reference Signals (RS) that are also known as pilot signals. An eNodeB transmits data information through a Physical DL Shared Channel (PDSCH). An eNodeB transmits DCI through a Physical DL Control Channel (PDCCH) or an Enhanced PDCCH (EPDCCH)—see also document and standard [3]. An eNodeB transmits acknowledgement information in response to data Transport Block (TB) transmission from a UE (e.g., the UE 116) in a Physical Hybrid Automatic Repeat Request Indicator Channel (PHICH). An eNodeB transmits one or more of multiple types of RS including a UE-Common RS (CRS), a Channel State Information RS (CSI-RS), or a DeModulation RS (DMRS). A CRS is transmitted over a DL system BandWidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe (or slot) and can have, for example, duration of 1 millisecond.

DL signals also include transmission of a logical channel that carries system control information. A broadcast control channel (BCCH) is mapped to either a transport channel referred to as a Broadcast Channel (BCH) when it conveys a Master Information Block (MIB) or to a DL Shared Channel (DL-SCH) when it conveys a System Information Block (SIB)—see also document and standard [3] and document and standard [5]. Most system information is included in different SIBs that are transmitted using DL-SCH. A presence of system information on a DL-SCH in a subframe (or slot) can be indicated by a transmission of a corresponding PDCCH conveying a codeword with a cyclic redundancy check (CRC) scrambled with a special System Information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe (or slot) and a group of Physical resource blocks (PRBs). A transmission BW incudes frequency resource units referred to as Resource Blocks (RBs). Each RB includes $$N_{sc}^{RB}$$

sub-carriers, or Resource Elements (REs), such as 12 REs. A unit of one RB over one subframe (or slot) is referred to as a PRB. A UE can be allocated $M_{PDSCH}$ RBs for a total of $$M_{sc}^{PDSCH} = M_{PDSCH} \cdot N_{sc}^{RB}$$

REs for the PDSCH transmission BW.

UL signals can include data signals conveying data information, control signals conveying UL Control Information (UCI), and UL RS. UL RS includes DMRS and Sounding RS (SRS). A UE transmits DMRS only in a BW of a respective PUSCH or Physical UL Control Channel (PUCCH). An eNodeB can use a DMRS to demodulate data signals or UCI signals. A UE transmits SRS to provide an eNodeB with an UL CSI. A UE transmits data information or UCI through a respective PUSCH or a PUCCH. If a UE requires to transmit data information and UCI in a same UL subframe (or slot), it may multiplex both in a PUSCH. UCI includes Hybrid Automatic Repeat reQuest ACKnowledgement (HARQ-ACK) information, indicating correct (ACK) or incorrect (NACK) detection for a data TB in a PDSCH or absence of a PDCCH detection (DTX), Scheduling Request (SR) indicating whether a UE has data in its buffer, Rank Indicator (RI), and Channel State Information (CSI) enabling an eNodeB to perform link adaptation for PDSCH transmissions to a UE. HARQ-ACK information is also transmitted by a UE in response to a detection of a PDCCH/enhanced PDCCH (EPDCCH) indicating a release of semi-persistently scheduled PDSCH (see also document and standard [3]).

An UL subframe (or slot) includes two slots. Each slot includes $$N_{symb}^{UL}$$

Symbols for transmitting data information, UCI, DMRS, or SRS. A frequency resource unit of an UL system BW is an RB. A UE is allocated $N_{RB}$ RBs for a total of $$N_{RB} \cdot N_{sc}^{RB}$$

REs for a transmission BW. For a PUCCH, $N_{RB}$=1. A last subframe (or slot) symbol can be used to multiplex SRS transmissions from one or more UEs. A number of subframe (or slot) symbols that are available for data/UCI/DMRS transmission is $$N_{symb} = 2 \cdot (N_{symb}^{UL} - 1) - N_{SRS},$$

where $N_{SRS}$=1 if a last subframe (or slot) symbol is used to transmit SRS and $N_{SRS}$=0 otherwise.

Figure 6:
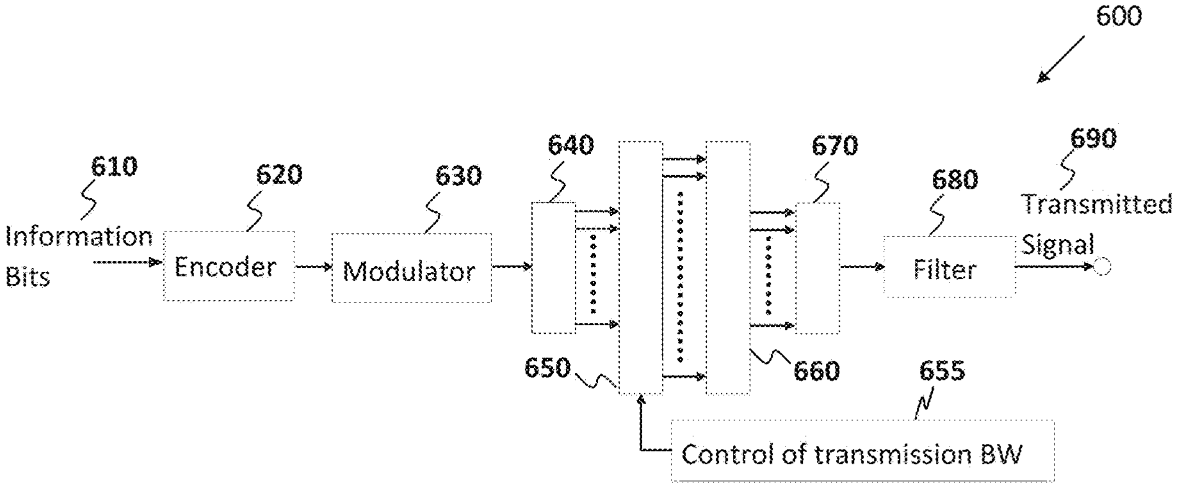
FIG. 6 illustrates an example of a transmitter structure for physical downlink shared channel (PDSCH) in a subframe according to embodiments of the present disclosure.

FIG. 6 illustrates an example of a transmitter structure 600 for PDSCH in a subframe according to embodiments of the present disclosure. For example, transmitter structure 600 can be implemented in gNB 102 of FIG. 1. This example is for illustration only and other embodiments can be used without departing from the scope of the present disclosure.

As illustrated in FIG. 6, information bits 610 are encoded by encoder 620, such as a turbo encoder, and modulated by modulator 630, for example using Quadrature Phase Shift Keying (QPSK) modulation. A Serial to Parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse Fast Fourier Transform (IFFT), the output is then serialized by a Parallel to Serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
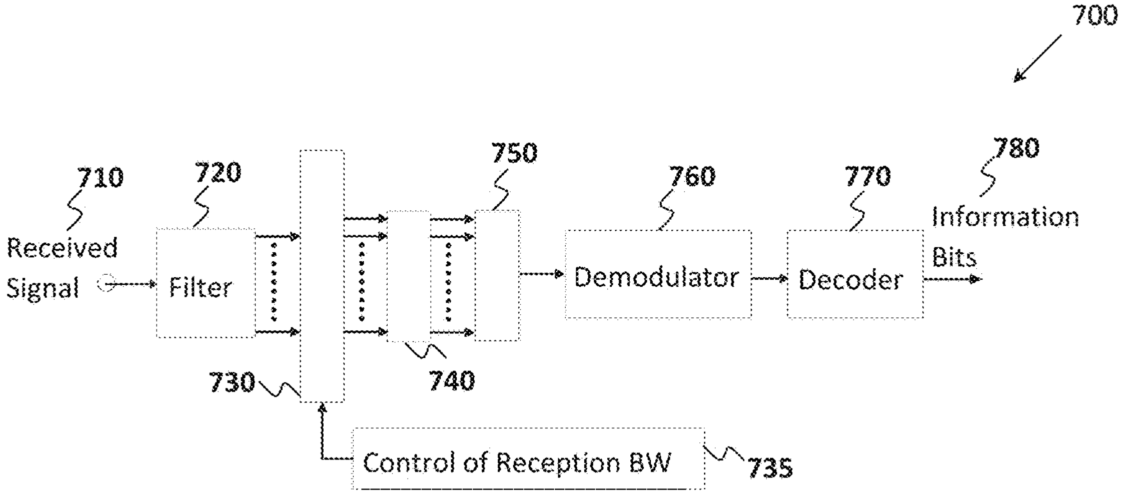
FIG. 7 illustrates an example of a receiver structure for PDSCH in a subframe according to embodiments of the present disclosure.

FIG. 7 illustrates an example of a receiver structure 700 for PDSCH in a subframe according to embodiments of the present disclosure. For example, receiver structure 700 can be implemented by any of the UEs 111-116 of FIG. 1. This example is for illustration only and other embodiments can be used without departing from the scope of the present disclosure.

With reference to FIG. 7, a received signal 710 is filtered by filter 720, REs 730 for an assigned reception BW are selected by BW selector 735, unit 740 applies a Fast Fourier Transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
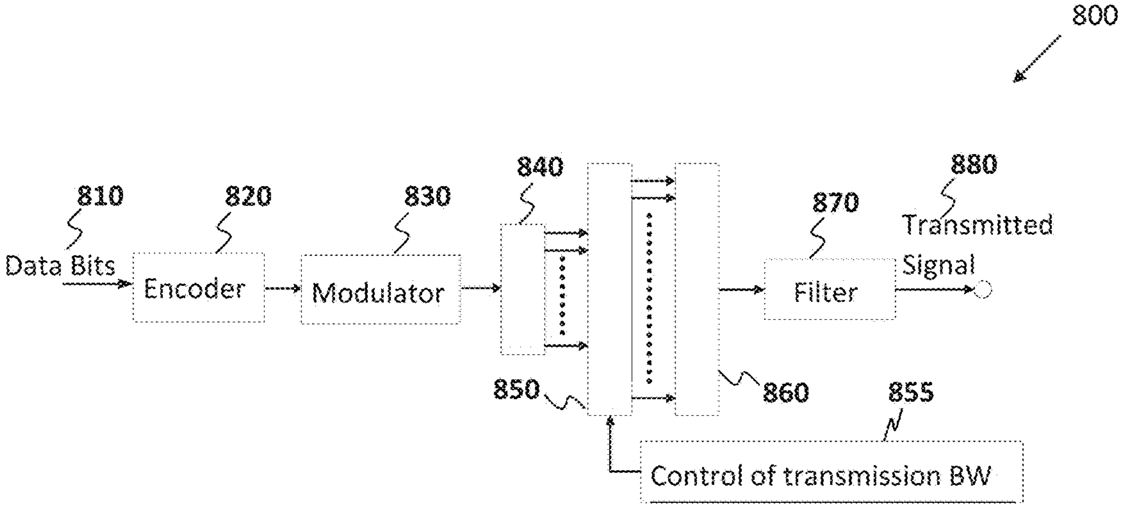
FIG. 8 illustrates an example of a transmitter structure for physical uplink shared channel (PUSCH) in a subframe according to embodiments of the present disclosure.

FIG. 8 illustrates an example of a transmitter structure 800 for PUSCH in a subframe according to embodiments of the present disclosure. For example, transmitter structure 800 can be implemented in gNB 103 of FIG. 1. This example is for illustration only and other embodiments can be used without departing from the scope of the present disclosure.

As illustrated in FIG. 8, information data bits 810 are encoded by encoder 820, such as a turbo encoder, and modulated by modulator 830. A Discrete Fourier Transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
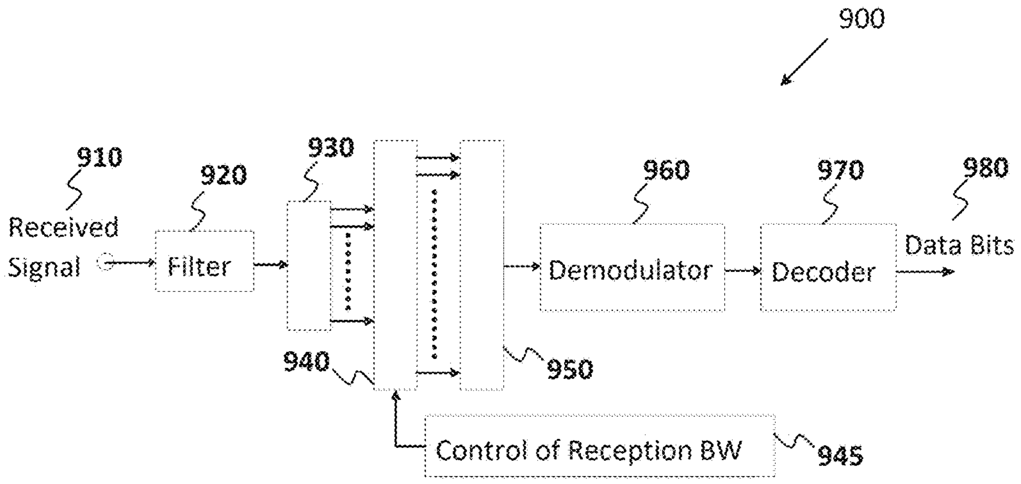
FIG. 9 illustrates an example of a receiver structure for a PUSCH in a subframe according to embodiments of the present disclosure.

FIG. 9 illustrates an example of a receiver structure 900 for a PUSCH in a subframe according to embodiments of the present disclosure; For example, receiver structure 900 can be implemented by the UE 116 of FIG. 3. This example is for illustration only and other embodiments can be used without departing from the scope of the present disclosure.

As illustrated in FIG. 9, a received signal 910 is filtered by filter 920. Subsequently, after a cyclic prefix is removed (not shown), unit 930 applies a FFT, REs 940 corresponding to an assigned PUSCH reception BW are selected by a reception BW selector 945, unit 950 applies an Inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

There are two types of frequency range (FR) defined in 3GPP 5G NR specifications. The sub-6 GHz range is called frequency range 1 (FR1) and millimeter wave range is called frequency range 2 (FR2). An example of the frequency range for FR1 and FR2 is shown herein.

TABLE 0

| Frequency range designation | Corresponding frequency range |
|---|---|
| FR1 | 450 MHz-600 MHz |
| FR2 | 24250 MHz-52600 MHz |

For MIMO in FR1, up to 32 CSI-RS antenna ports is supported, and in FR2, up to 8 CSI-RS antenna ports is supported. In next generation cellular standards (e.g., 6G), in addition to FR1 and FR2, new carrier frequency bands can be evaluated, e.g., FR4 (>52.6 GHz), terahertz (>100 GHz) and upper mid-band (10-15 GHz). The number of CSI-RS ports that can be supported for these new bands is likely to be different from FR1 and FR2. In particular, for 10-15 GHz band, the max number of CSI-RS antenna ports is likely to be more than FR1, due to smaller antenna form factors, and feasibility of fully digital beamforming (as in FR1) at these frequencies. For instance, the number of CSI-RS antenna ports can grow up to 128. Besides, the NW (e.g., the network 130) deployment/topology at these frequencies is also expected to be denser/distributed, for example, antenna ports distributed at multiple (non-co-located, hence geographically separated) TRPs within a cellular region can be the main scenario of interest, due to which the number of CSI-RS antenna ports for MIMO can be even larger (e.g., up to 256).

A (spatial or digital) precoding/beamforming can be used across these large number of antenna ports in order to achieve MIMO gains. Depending on the carrier frequency, and the feasibility of radio RF/hardware (HW)-related components, the (spatial) precoding/beamforming can be fully digital or hybrid analog-digital. In fully digital beamforming, there can be one-to-one mapping between an antenna port and an antenna element, or a 'static/fixed' virtualization of multiple antenna elements to one antenna port can be used. Each antenna port can be digitally controlled. Hence, a spatial multiplexing across antenna ports is provided.

In a wireless communication system, MIMO is often identified as key feature in order to achieve high system throughput requirements. One of the key components of a MIMO transmission scheme is the accurate CSI acquisition at the eNB (or gNB) (or TRP). For multi-user MIMO (MU-MIMO), in particular, the availability of accurate CSI is essential in order to guarantee high MU performance. For time division duplexing (TDD) systems, the CSI can be acquired using the SRS transmission relying on the channel reciprocity. For frequency division duplexing (FDD) systems, on the other hand, it can be acquired using the CSI-RS transmission from eNB (or gNB), and CSI acquisition and feedback from UE. In common FDD systems, the CSI feedback framework is 'implicit' in the form of channel quality indicator (CQI)/precoding matrix indicator (PMI)/rank indicator (RI) (also CSI reference signal identity (CRI) and layer identity (LI)) derived from a codebook implying SU transmission from eNB (or gNB).

In 5G or NR systems ([document and standard [7], document and standard [8]), the herein-mentioned "implicit" CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, embodiments of the present disclosure recognize the overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in document and standard [8]). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising each component) requires to be reported by the UE (e.g., the UE 116). However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in document and standard [8]), wherein the DFT-based SD basis in $W_1$ is replaced with SD CSI-RS port selection, i.e., L out of $P_{CSI-RS}/2$ CSI-RS ports are selected (the selection is common for the two antenna polarizations or two halves of the CSI-RS ports). The CSI-RS ports in this case are beamformed in SD (UL-DL channel reciprocity in angular domain), and the beamforming information can be obtained at the gNB (such as the gNB 102) based on UL channel estimated using SRS measurements.

In Rel. 17 NR, CSI reporting has been enhanced to support the following:

- Further enhanced Type II port selection codebook: it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD or/and M ports are selected in FD. The CSI-RS ports in this case are beamformed in SD (expecting UL-DL channel reciprocity in angular domain) or/and FD (expecting UL-DL channel reciprocity in delay/frequency domain), and the corresponding SD or/and FD beamforming information can be obtained at the gNB based on UL channel estimated using SRS measurements. In Rel. 17, such a codebook is supported (which is referred to as Rel. 17 further enhanced Type II port selection codebook in REF8).
- Non-coherent joint transmission (NCJT) CSI reporting: When the UE can communicate with multiple TRPs that are distributed at different locations in space (e.g. within a cell), the CSI reporting can correspond to a single TRP hypothesis (i.e. CSI reporting for one of the multiple TRPs), or multi-TRP hypothesis (i.e. CSI reporting for at least two of the multiple TRPs). The CSI reporting for both single TRP and multi-TRP hypotheses are supported in Rel. 17. However, the multi-TRP CSI reporting expects a non-coherent joint transmission (NCJT), i.e. a layer (and precoder) of the transmission is restricted to be transmitted from only one TRP.

In In Rel. 18 NR MIMO, the following CSI enhancements are further evaluated targeting two use cases (coherent joint transmission from multiple TRPs, and high/medium velocity UEs):

- Enhancements of CSI acquisition for Coherent-JT targeting FR1 and up to 4 TRPs, expecting ideal backhaul and synchronization as well as the same number of antenna ports across TRPs, as follows:
  - Rel-16/17 Type-II codebook refinement for CJT mTRP targeting FDD and its associated CSI reporting, taking into account throughput-overhead trade-off
- CSI reporting enhancement for high/medium UE velocities by exploiting time-domain correlation/Doppler-domain information to assist DL precoding, targeting FR1, as follows:
  - Rel-16/17 Type-II codebook refinement, without modification to the spatial and frequency domain basis
  - UE reporting of time-domain channel properties measured via CSI-RS for tracking Although Rel-18 CJT CSI can support up to 128 antenna ports by configuring 4 CSI-RS resources each with 32 antenna ports, there is another interest arising to support up to 128 antenna ports using Type-I CSI, which requires smaller feedback overhead than Rel-18 CJT CSI. Currently, a single CSI-RS resource can support up to 32 antenna ports for Type-I single-panel (SP) and multi-panel (MP) CSI. By using multiple CSI-RS resources for Type-I CSI, it is allowed to configure up to 64 antenna ports according to one of the following two schemes:

- Two CSI-RS resources each with 32 antenna ports for Rel-17 NCJT (which is Type-I CSI-based)
- 8 CSI-RS resources each with 8 antenna ports for Type-I SP CSI or Type-I MP CSI However, both of the schemes do not offer CSI feedback associated with the entire channel of 64 antenna ports, but are designed for specific use cases, 1) NCJT from two TRP, and 2) one CSI-RS resource selection and reporting associated with the selected CSI-RS resource, respectively. Hence, embodiments of the present disclosure recognize Type-I CSI with more than 32 antenna ports is limited in terms of use cases, and needs some enhancement.

In next generation MIMO systems, the number of antenna ports is expected to increase further (e.g., up to 256), for example, for carrier frequencies in upper mid-band (10-15 GHz); the NW (e.g., the network 130) deployments are likely to be denser/more distributed (when compared with 5G NR); and the system is expected to work seamlessly even in challenging scenarios such as medium-high (e.g. 120 kmph) speed UEs, 'higher-order) multi-user MIMO.

Similar to common (Rel. 15/18 NR) both low-resolution (aka Type I) and high-resolution (aka Type II) CSI reporting for the distributed systems mentioned herein are needed and beneficial depending on use cases and scenarios. Unlike the common, however, it is preferable to have a common framework or components between the two CSI reporting settings, in order to have a simple, future-proof, and scalable solution, thereby making it more feasible in real deployments.

In this disclosure, a framework for such CSI reporting is provided that is based on Rel.16 enhanced Type II and Rel.18 Type II CJT codebooks. In particular, based on the provided framework, several examples are provided to facilitate the low-resolution (aka Type I) CJT CSI reporting across multiple antenna port groups or NZP CSI-RS resources.

The present disclosure relates to a CSI reporting framework in next generation MIMO systems. In particular, it relates to the CSI reporting based on a low-resolution (or Type I) codebook comprising spatial-, frequency- and time-(Doppler-) domain components for a mTRP CJT with distributed antenna structure (DMIMO). Aspects provided in the present disclosure are as follows:

- W1: based on Rel. 16 eType II and Rel. 18 Type II CJT codebooks.
- W2: based on Rel. 15 Type I (selection and co-phasing) Independent vs joint encoding of layers Additional components: relative amp/power across CSI-RS resources, frequency division (FD)/division duplexing (DD) compression Aspects, features, and advantages of the present disclosure are readily apparent from the following detailed description, simply by illustrating a number of particular embodiments and implementations, including the best mode contemplated for carrying out the present disclosure. Embodiments of the present disclosure also capable of other and different embodiments, and its several details can be modified in various obvious respects, all without departing from the spirit and scope of the present disclosure. Accordingly, the drawings and description are to be regarded as illustrative in nature, and not as restrictive. Embodiments of the present disclosure are illustrated by way of example, and not by way of limitation, in the figures of the accompanying drawings.

In the following, for brevity, both FDD and TDD are regarded as the duplex method for both DL and UL signaling.

Although exemplary descriptions and embodiments to follow imply orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another or can operate as standalone schemes.

Each of the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, each of the following components and embodiments are applicable for UL transmission when the scheduling unit in time is either one subframe (which can include one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include each of the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" or bandwidth part (BWP) can also be used.

In terms of UE configuration, a UE (e.g., the UE 116) can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may be called for multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for each of the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 10:
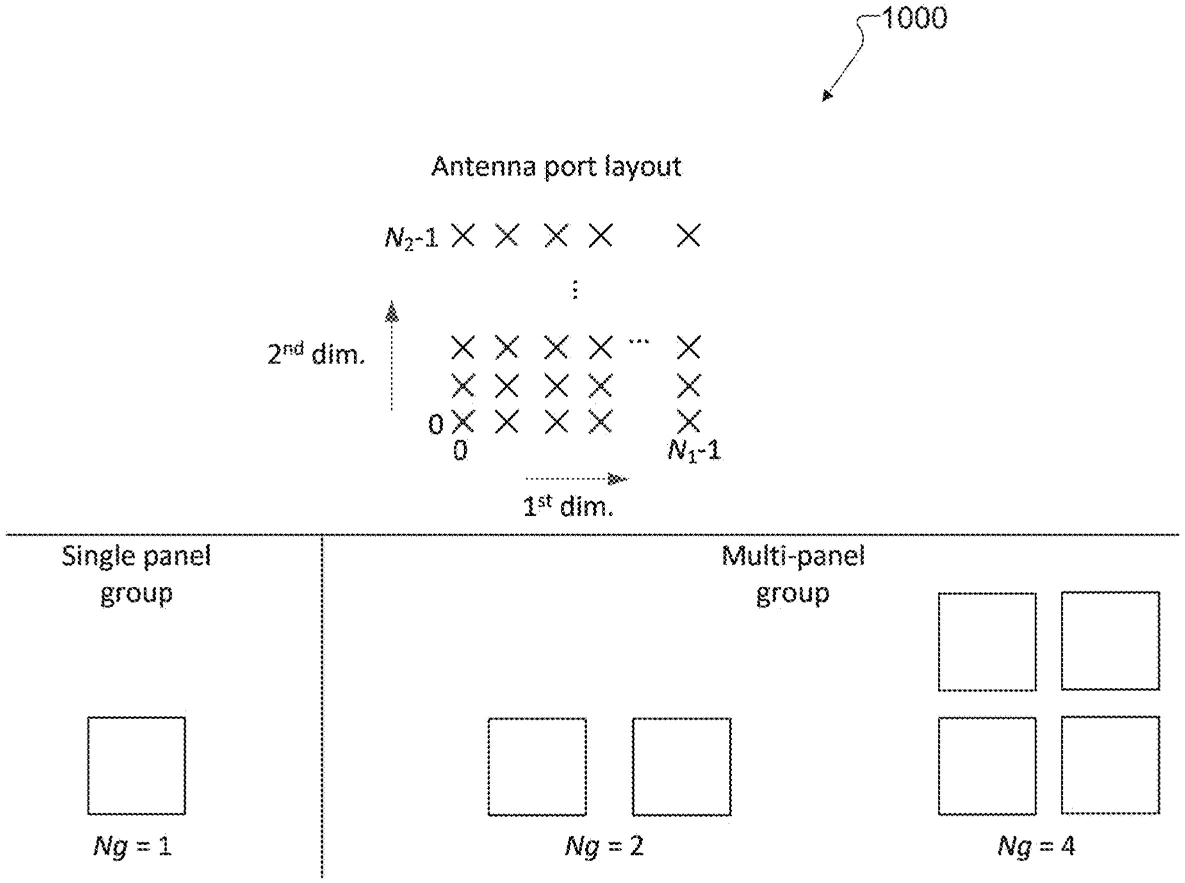
FIG. 10 illustrates a diagram of an antenna port layout according to embodiments of the present disclosure.

FIG. 10 illustrates a diagram of an antenna port layout 1000 according to embodiments of the present disclosure. For example, antenna port layout 1000 of an antenna port layout can be implemented by the BS 102 of FIG. 2. This example is for illustration only and can be used without departing from the scope of the present disclosure.

With reference to FIGS. 10, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$ (or $N_1=1$ and $N_2>1$). For a single-polarized (or co-polarized) antenna port layout, the total number of antenna ports is $P_{CSIRS}=N_1N_2$. And, for a dual-polarized antenna port layout, the total number of antenna ports is $P_{CSIRS}=2N_1N_2$. "X" represents two antenna polarizations. In this disclosure, the term "polarization" refers to a group of antenna ports with the same polarization. For example, antenna ports $$j = X+0, X+1, \ldots, X+\frac{P_{CSIRS}}{2}-1$$

comprise a first antenna polarization, and antenna ports $$j = X+\frac{P_{CSIRS}}{2}, X+\frac{P_{CSIRS}}{2}+1, \ldots, X+P_{CSIRS}-1$$

comprise a second antenna polarization, where $P_{CSIRS}$ is a number of CSI-RS antenna ports and X is a starting antenna port number (e.g. X=3000, then antenna ports are 3000, 3001, 3002, . . . ). Dual-polarized antenna payouts are implied in this disclosure. The embodiments (and examples) in this disclosure however are general and are applicable to single-polarized antenna layouts as well.

Let $N_g$ be a number of antenna groups (AGs). With reference to FIG. 10, when there are multiple antenna groups ($N_g>1$), each group ($g\in\{1, \ldots, N_g\}$) comprises dual-polarized antenna ports with $N_{1,g}$ and $N_{2,g}$ ports in two dimensions. Note that the antenna port layouts may be the same ($N_{1,g}=N_1$ and $N_{2,g}=N_2$) in different antenna groups, or they can be different across antenna groups. For group g, the number of antenna ports is $P_{CSIRS,g}=N_{1,g}N_{2,g}$ or $2N_{1,g}N_{2,g}$ (for co-polarized or dual-polarized respectively).

In one example, an antenna group corresponds to an antenna panel. In one example, an antenna group corresponds to a TRP. In one example, an antenna group corresponds to a remote radio head (RRH). In one example, an antenna group corresponds to CSI-RS antenna ports of a NZP CSI-RS resource. In one example, an antenna group corresponds to a subset of CSI-RS antenna ports of a NZP CSI-RS resource (comprising multiple antenna groups). In one example, an antenna group corresponds to CSI-RS antenna ports of multiple NZP CSI-RS resources (e.g., comprising a CSI-RS resource set).

In one example, an antenna group corresponds to a reconfigurable intelligent surface (RIS) in which the antenna group can be (re-)configured more dynamically (e.g., via MAC CE or/and DCI). For example, the number of antenna ports associated with the antenna group can be changed dynamically. For example, in a dense user environment, larger number of antenna ports may be associated with the antenna group to support higher throughput, while in less dense environments, fewer antenna ports may be associated with the antenna group to save energy. In another example, the BS could dynamically switch between different antenna panel configurations (ex: port layout, number of antenna ports per antenna group, number of antenna groups per panel, structure, etc.) based on user density, traffic demand, channel conditions etc.

Figure 11:
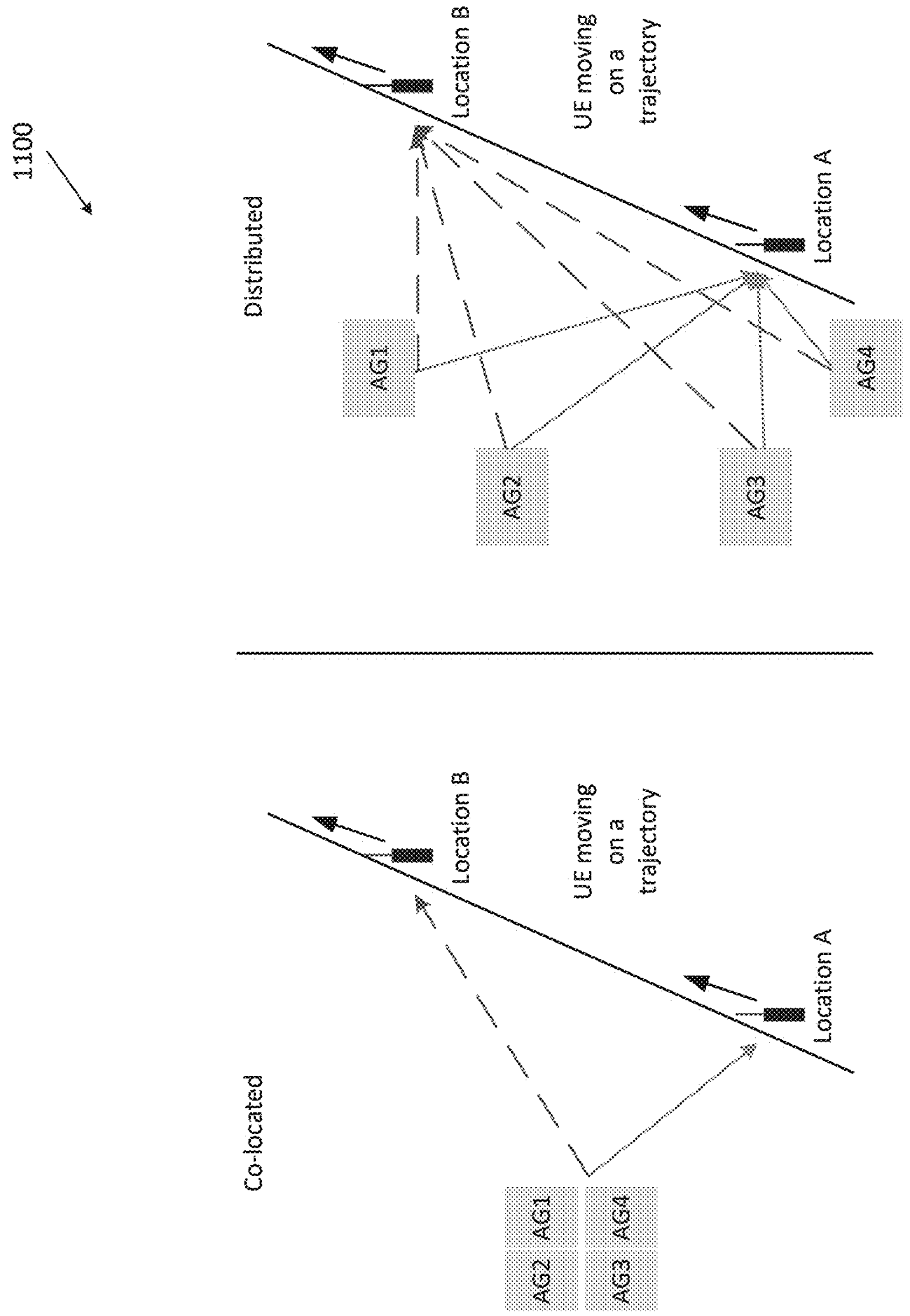
FIG. 11 illustrates examples of a UE moving on a trajectory located in co-located and distributed antenna groups (AGs) according to embodiments of the present disclosure.

FIG. 11 illustrates examples of a UE moving on a trajectory 1100, with AGs of the BS co-located and distributed according to embodiments of the present disclosure. For example, trajectory 1100 with AGs of the BS co-located and distributed can be implemented by any of the UEs 111-116 of FIG. 1. This example is for illustration only and can be used without departing from the scope of the present disclosure.

In one example scenario, multiple AGs can be co-located or distributed, and can serve static (non-mobile) or moving UEs. With reference to FIG. 11, an illustration of AGs serving a moving UE is shown. While the UE (e.g., the UE 116) moves from a location A to another location B, the UE measures the channel, e.g. via NZP CSI-RS resources, (may also measure the interference, e.g. via CSI interference measurement (CSI-IM) resources or CSI-RS resources for interference measurement), uses the measurement to determine/report CSI taking into account joint transmission from multiple AGs. The reported CSI can be based on a codebook. The codebook can include components taking into account multiple AGs, and frequency/delay-domain channel profile and time/Doppler-domain channel profile.

In one example, the antenna architecture of the MIMO system is structured. For example, the antenna structure at each AG is dual-polarized (single or multi-panel as shown in FIG. 10). The antenna structure at each AG can be the same. Or the antenna structure at an AG can be different from another AG. Likewise, the number of ports at each AG can be the same. Or the number of ports at one AG can be different from another AG.

In another example, the antenna architecture of the MIMO system is unstructured. For example, the antenna structure at one AG can be different from another AG.

A structured antenna architecture is expected in the rest of the disclosure. For simplicity, it is expected that each AG is equivalent to a panel (cf. FIG. 10), although, an AG can have multiple panels in practice. The disclosure however is not restrictive to a single panel expectation at each AG, and can easily be extended (covers) to the case when an AG has multiple antenna panels.

In one embodiment, an AG constitutes (or corresponds to or is equivalent to) at least one of the following:

In one example, an AG corresponds to a TRP.

In one example, an AG corresponds to a CSI-RS resource.

A UE is configured with $K=N_g>1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained in this disclosure herein.

In one example, an AG corresponds to a CSI-RS resource group, where a group comprises one or multiple NZP CSI-RS resources. A UE is configured with $K \geq N_g > 1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained in this disclosure herein. In particular, the K CSI-RS resources can be partitioned into $N_g$ resource groups. The information about the resource grouping can be provided together with the CSI-RS resource setting/configuration, or with the CSI reporting setting/configuration, or with the CSI-RS resource configuration.

In one example, an AG corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an AG. The information about the subsets of ports or grouping of ports can be provided together with the CSI-RS resource setting/configuration, or with the CSI reporting setting/configuration, or with the CSI-RS resource configuration.

In one example, an AG corresponds to one or more examples described herein depending on a configuration. For example, this configuration can be explicit via a parameter (e.g., an RRC parameter). Or it can be implicit.

In one example, when implicit, it could be based on the value of K. For example, when K>1 CSI-RS resources, an AG corresponds to one or more examples described herein. For example, when K=1 CSI-RS resource, an AG corresponds to one or more examples described herein.

In another example, the configuration could be based on the configured codebook. For example, an AG corresponds to a CSI-RS resource or resource group according to one or more examples described herein when the codebook corresponds to a decoupled codebook (modular or separate codebook for each AG), and an AG corresponds to a subset (or a group) of CSI-RS ports when codebook corresponds to a coupled (joint or coherent) codebook (one joint codebook across AGs).

In one example, when AG maps (or corresponds to) a CSI-RS resource or resource group, and a UE can select a subset of AGs (resources or resource groups) and report the CSI for the selected AGs (resources or resource groups), the selected AGs can be reported via an indicator. For example, the indicator can be a CRI or a PMI (component) or a new indicator.

In another example, as the UE moves across a trajectory, one or more AGs (either co-located or distributed) may serve the UE based on the predicted mobility patterns or channel conditions.

In one example, when AG maps (or corresponds to) a CSI-RS port group, and a UE (e.g., the UE 116) can select a subset of AGs (port groups) and report the CSI for the selected AGs (port groups), the selected AGs can be reported via an indicator. For example, the indicator can be a CRI or a PMI (component) or a new indicator.

In one example, when multiple (K>1) CSI-RS resources are configured for $N_g$ AGs, a decoupled (modular) codebook is used/configured, and when a single (K=1) CSI-RS resource for $N_g$ AGs, a joint codebook is used/configured.

Figure 12:
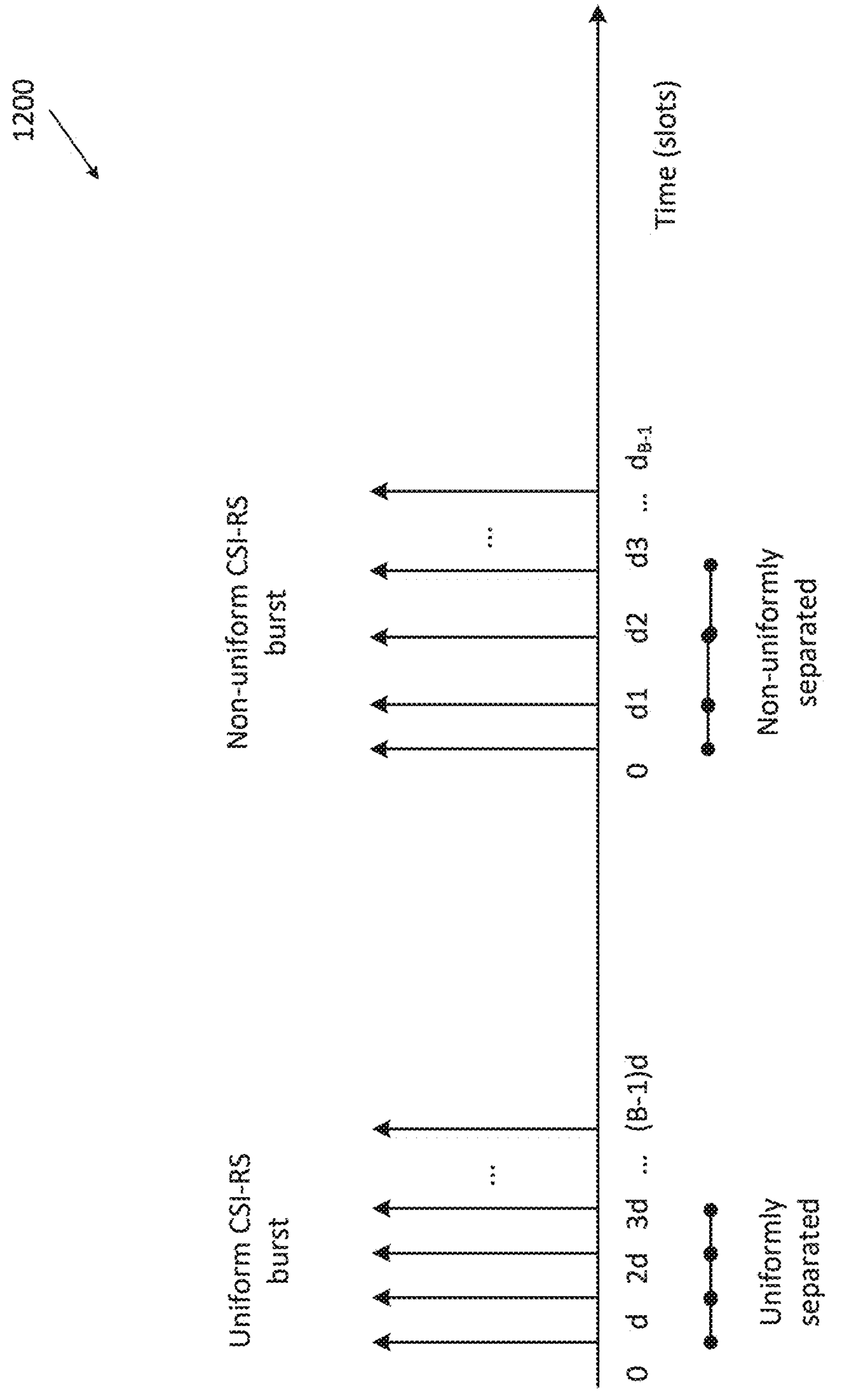
FIG. 12 illustrates an example of a timeline for a UE to receive nonzero power (NZP) CSI reference signal (CSI-RS) resource(s) bursts according to embodiments of the present disclosure.

FIG. 12 illustrates an example of a timeline 1200 for a UE to receive NZP CSI-RS resource(s) bursts according to embodiments of the present disclosure. For example, timeline 1200 for a UE to receive NZP CSI-RS resource(s) bursts can be followed by the UE 116 of FIG. 3. This example is for illustration only and other embodiments can be used without departing from the scope of the present disclosure.

In one embodiment, with reference to FIG. 12, a UE is configured to receive a burst of non-zero power (NZP) CSI-RS resource(s), referred to as CSI-RS burst for brevity, within B time slots comprising a measurement window, where B≥1. The B time slots can be accordingly to at least one of the following examples.

- In one example, the B time slots are evenly/uniformly spaced with an inter-slot spacing d.
- In one example, the B time slots can be non-uniformly spaced with inter-slot spacing $e_1=d_1$, $e_2=d_2-d_1$, $e_3=d_3-d_2$, . . . , so on, where $e_i \neq e_j$ for at least one pair (i, j) with i≠j.

The UE (e.g., the UE 116) receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot t∈{0, 1, . . . , B−1}. When the DL channel estimate in slot t is a matrix $G_t$ of size $N_{Rx} \times N_{Tx} \times N_{Sc}$, then $h_t=\text{vec}(G_t)$, where $N_{Rx}$, $N_{Tx}$, and $N_{Sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, 1→2→3→ and so on, implying that the concatenation starts from the first dimension, then moves second dimension, and continues until the last dimension. Let $H_B=[h_0\ h_1\ .\ .\ .\ h_{B-1}]$ be a concatenated DL channel. The Doppler component(s) of the DL channel can be obtained based on $H_B$. For example, $H_B$ can be represented as $$C\Phi^H = \sum_{s=0}^{N-1} c_s \phi_s^H$$

where $\Phi=[\phi_0\ \phi_1\ .\ .\ .\ \phi_{N-1}]$ is a Doppler domain (DD) basis matrix whose columns comprise basis vectors, $C=[c_0\ c_1\ .\ .\ .\ c_{N-1}]$ is a coefficient matrix whose columns comprise coefficient vectors, and N<B is the number of DD basis vectors. Since the columns of $H_B$ are likely to be correlated, a DD compression can be achieved when the value of N is small (compared to the value of B). In this example, the Doppler component(s) of the channel is represented by the DD basis matrix Φ and the coefficient matrix C.

When there are multiple TRPs/RRHs ($N_{TRP}>1$), the UE can be configured to measure the CSI-RS burst(s) according to at least one of the following examples.

In one example, the UE is configured to measure $N_{TRP}$ CSI-RS bursts, one from each TRP/RRH. The $N_{TRP}$ CSI-RS bursts can be overlapping in time (i.e., measured in same time slots). Or they can be staggered in time (i.e., measured in different time slots). Whether the bursts are overlapping or staggered can be determined based on configuration. It can also depend on the total number of CSI-RS ports across RRHs/TRPs. When the total number of ports is small (e.g., <=32), they can overlap, otherwise (>32), they are staggered. The number of time instances B can be the same for each of the $N_{TRP}$ bursts. Or the number B can be the same or different across bursts (or TRPs/RRHs).

- In one example, each CSI-RS burst corresponds to a semi-persistent (SP) CSI-RS resource. The SP CSI-RS resource can be activated or/and deactivated based on a MAC CE or/and DCI based signaling. Additional details can be as described in the U.S. patent application Ser. No. 17/689,838 filed Mar. 8, 2022 (the '838 Application), which is incorporated by reference in its entirety.
- In one example, each CSI-RS burst corresponds to a group of B≥1 aperiodic (Ap) CSI-RS resources. The Ap-CSI-RS resources can be triggered via a DCI with slot offsets such that they can be measured in B different time slots. The rest of the details can be as described in the '838 Application.
- In one example, each CSI-RS burst corresponds to a periodic (P) CSI-RS resource. The P-CSI-RS resource can be configured via higher layer. The first measurement instance (time slot) and the measurement window of the CSI-RS burst (from the P-CSI-RS resource) can be fixed or configured. The rest of the details can be as described in the '838 Application.
- In one example, a CSI-RS burst can either be a P-CSI-RS, or SP-CSI-RS or Ap-CSI-RS resource.
  - In one example, the time-domain behavior (P, SP, or Ap) of $N_{TRP}$ CSI-RS bursts is the same.
  - In one example, the time-domain behavior of $N_{TRP}$ CSI-RS bursts can be the same or different.

In one example, the UE (such as UE 116) is configured to measure $K \geq N_{TRP}$ CSI-RS bursts, where $$K = \sum_{r=1}^{N_{TRP}}$$

$K_r$ and $K_r$ is a number of CSI-RS bursts associated with RRH/TRP r, where r∈{1, . . . , $N_{TRP}$}. Each CSI-RS burst is according to one or more examples described herein. When $K_r>1$, multiple CSI-RS bursts are linked to (or associated with) a CSI reporting setting, i.e., the UE receives the $N_r$ CSI-RS bursts, estimates the DL channels, and obtains the Doppler component(s) of the channel using each of the $N_r$ CSI-RS bursts. The rest of the details can be as described in the '838 Application.

In one example, the UE is configured to measure one CSI-RS burst across each of the $N_{TRP}$ TRPs/RRHs. Let P be a number of CSI-RS ports associated with the NZP CSI-RS resource measured via the CSI-RS burst. The CSI-RS burst is according to one or more examples described herein. The total of P ports can be divided into $N_{TRP}$ groups/subsets of ports and one group/subset of ports is associated with (or corresponds to) a TRP/RRH. Then, $$P = \sum_{r=1}^{N_{TRP}}$$

$P_r$ and $P_r$ is a number of CSI-RS ports in the group/subset of ports associated with RRH/TRP r.

- In one example, in each of the B time instances, a UE is configured to measure each groups/subsets of ports, i.e., in each time instance within the burst, the UE measures each of P ports (or $N_{TRP}$ groups/subsets of ports).
- In one example, a UE is configured to measure subsets/groups of ports across multiple time instances, i.e., in each time instance within the burst, the UE measures a subset of P ports or a subset of groups of ports (RRHs/TRPs).
  - In one example, in each time instance, the UE measures only one group/subset of ports (1 TRP per time instance). In this case, $B=N_{TRP}\times C$ or $B\geq N_{TRP}\times C$, where C is a number of measurement instances for each TRP/RRH.
  - In one example, the UE is configured to measure one half of the port groups in a time instance, and the remaining half in another time instance.
    - In one example, the two time instances can be consecutive, for example, the UE measures one half of port groups in even-numbered time instances, and the remaining half in the odd-numbered time instances.
    - In one example, a first half of the time instances $$\left(\text{e.g., } 0, 1, \ldots, \frac{B}{2} - 1\right)$$

is configured to measure one half of the port groups, and the second half of the time instances $$\left(\text{e.g., } \frac{B}{2}, \ldots B - 1\right)$$

is configured to measure the remaining half of the port groups.

- In one example, the UE is configured to measure multiple CSI-RS bursts, where each burst is according to one or more examples described herein. Multiple CSI-RS bursts are linked to (or associated with) a CSI reporting setting, i.e., the UE receives multiple CSI-RS bursts, estimates the DL channels, and obtains the Doppler component(s) of the channel using each of multiple CSI-RS bursts.

Let $N_4$ be the length of the DD basis vectors $\{\phi_s\}$, e.g., each basis vector is a length $N_4\times 1$ column vector.

Figure 13:
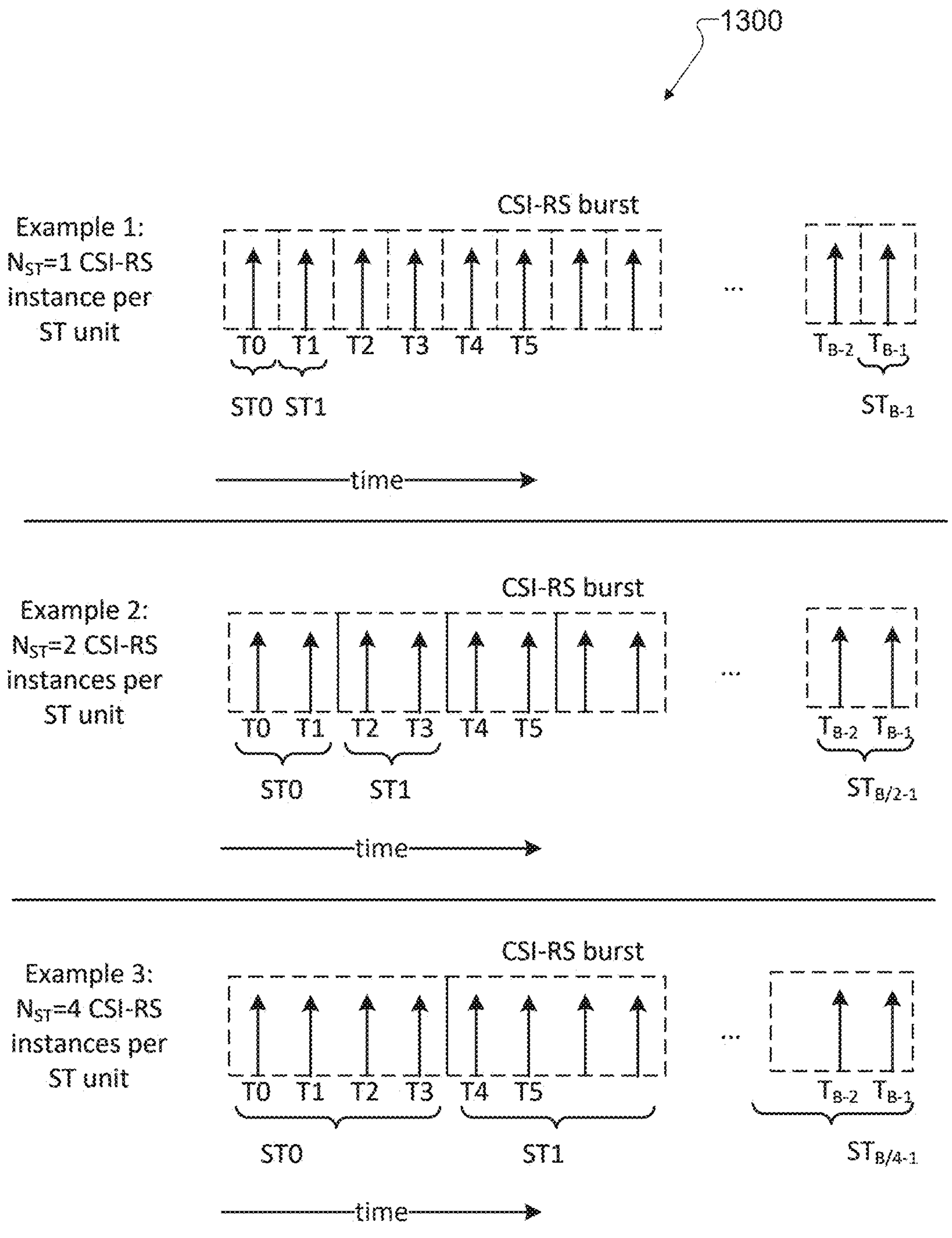
FIG. 13 illustrates examples of timelines for partitioned CSI-RS burst instances according to embodiments of the present disclosure.

FIG. 13 illustrates examples of timelines 1300 for partitioned CSI-RS burst instances according to embodiments of the present disclosure. For example, timelines 1300 for partitioned CSI-RS burst instances. For example, timelines 1300 for partitioned CSI-RS burst instances can be followed by the UE 113 of FIG. 1. This example is for illustration only and other embodiments can be used without departing from the scope of the present disclosure.

In one embodiment, a UE is configured to determine a value of $N_4$ based on the value B (number of CSI-RS instances) in a CSI-RS burst and components across which the DD compression is performed, where each component corresponds to one or multiple time instances within the CSI-RS burst. In one example, $N_4$ is fixed (e.g., $N_4$=B) or configured (e.g., via RRC or MAC CE or DCI) or reported by the UE (e.g., the UE 116) (as part of the CSI report). In one example, the B CSI-RS instances can be partitioned into sub-time (ST) units (instances), where each ST unit is defined as (up to) $N_{ST}$ contiguous time instances in the CSI-RS burst. In this example, a component for the DD compression corresponds to a ST unit. With reference to FIG. 13, three examples of the ST units are shown. In the first example, each ST unit comprises $N_{ST}$=1 time instance in the CSI-RS burst. In the second example, each ST unit comprises $N_{ST}$=2 contiguous time instances in the CSI-RS burst. In the third example, each ST unit comprises $N_{ST}$=4 contiguous time instances in the CSI-RS burst.

The value of $N_{ST}$ can be fixed (e.g., $N_{ST}$=1 or 2 or 4) or indicated to the UE (e.g., via higher layer RRC or MAC CE or DCI based signaling) or reported by the UE (e.g., as part of the CSI report). The value of $N_{ST}$ (fixed or indicated or reported) can be subject to a UE capability reporting. The value of $N_{ST}$ can also be dependent on the value of B (e.g., one value for a range of values for B and another value for another range of values for B).

When there are multiple TRPs/RRHs ($N_{TRP}$>1), the UE can be configured to determine a value of $N_4$ according to at least one of the following examples.

- In one example, a value of $N_4$ is the same for each TRPs/RRHs.
- In one example, a value of $N_4$ can be the same or different across TRPs/RRHs.

Figure 14:
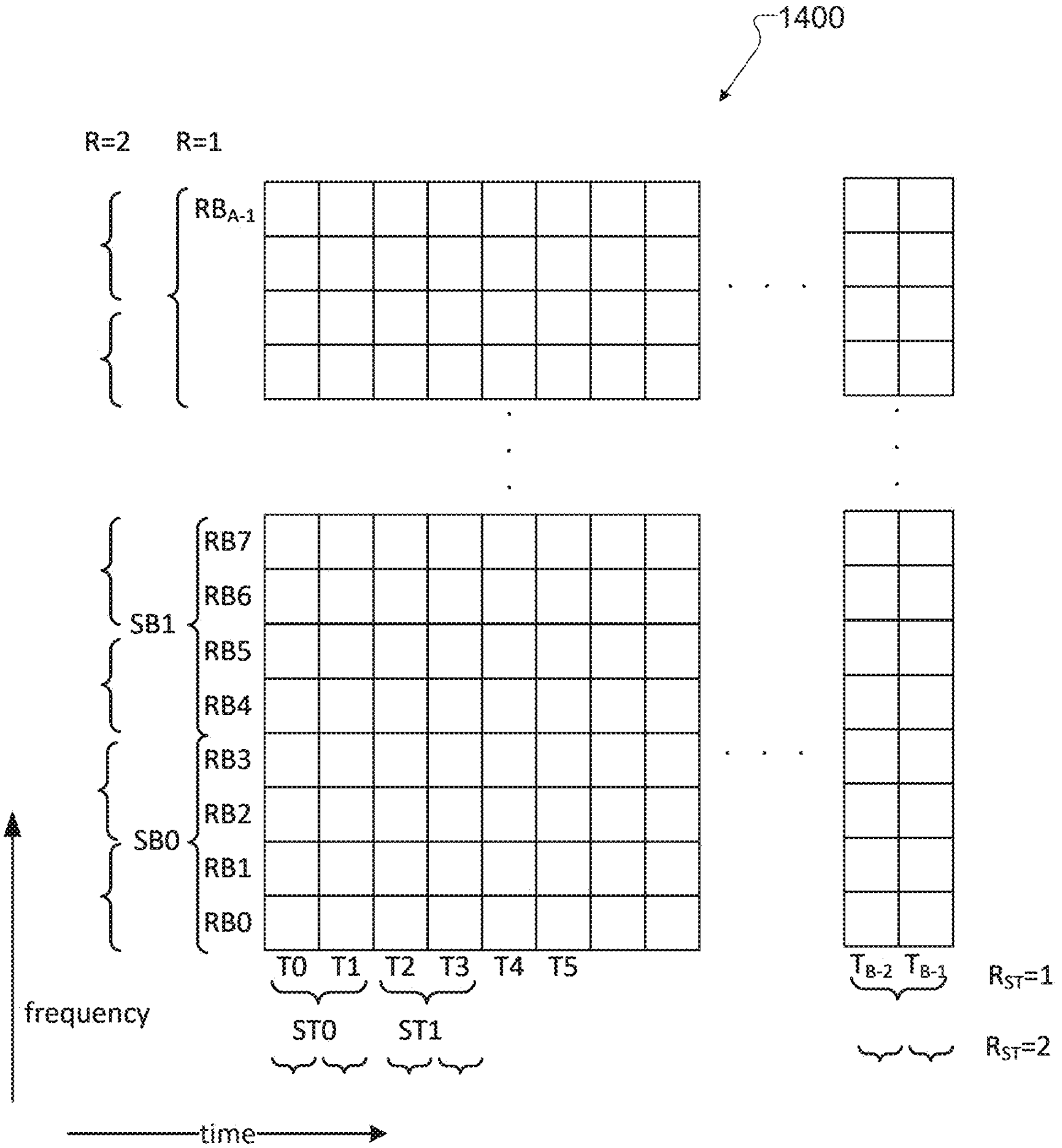
FIG. 14 illustrates an example of a timeline for resource block (RB) and subband (SB) partitions according to embodiments of the present disclosure.

FIG. 14 is an example of a timeline 1400 for RB and SB partitions according to embodiments of the present disclosure. For example, timeline 1400 for RB and SB partitions can be followed by the UE 116 of FIG. 3. This example is for illustration only and other embodiments can be used without departing from the scope of the present disclosure.

In one embodiment, a UE is configured with J≥1 CSI-RS bursts (as illustrated herein) that occupy a frequency band and a time span (duration), wherein the frequency band comprises A RBs, and the time span comprises B time instances (of CSI-RS resource(s)). When J>1, the A RBs or/and B time instances can be aggregated across J CSI-RS bursts. In one example, the frequency band equals the CSI reporting band, and the time span equals the number of CSI-RS resource instances (across J CSI-RS bursts). Both can be configured to the UE (e.g., the UE 116) for a CSI reporting, which can be based on the DD compression.

The UE is further configured to partition (divide) the A RBs into subbands (SBs) or/and the B time instances into sub-times (STs). The partition of A RBs can be based on a SB size value $N_{SB}$, which can be configured to the UE (cf. Table 5.2.1.4-2 of REF8). The partition of B time instances can be based either a ST size value $N_{ST}$ or an r value, as described in this disclosure. With reference to FIG. 14, RB0, RB1, . . . , $RB_{A-1}$ comprise A RBs, $T_0$, $T_1$, . . . , $T_{B-1}$ comprise B time instances, the SB size $N_{SB}$=4, and the ST size $N_{ST}$=2.

When there are multiple TRPs/RRHs ($N_{TRP}$>1), the UE can be configured to determine subbands (SBs) or/and sub-times (STs) according to at least one of the following examples.

- In one example, both subbands (SBs) or/and sub-times (STs) are the same for each TRPs/RRHs.

In one example, subbands (SBs) are the same for each TRPs/RRHs, but sub-times (STs) can be the same or different across RRHs/TRPs.

In one example, sub-times (STs) are the same for each TRPs/RRHs, but subbands (SBs) can be the same or different across RRHs/TRPs.

In one example, both sub-times (STs) and subbands (SBs) can be the same or different across RRHs/TRPs.

For illustration, one or more examples described herein are implied in the rest of this disclosure.

The CSI reporting is based on channel measurements (based on CSI-RS bursts) in three-dimensions (3D): the first dimension corresponds to SD comprising $P_{CSIRS}$ CSI-RS antenna ports (in total across each of the $N_{TRP}$ RRHs/TRPs), the second dimension corresponds to FD comprising $N_3$ FD units (e.g. SB), and the third dimension corresponds to DD comprising $N_4$ DD units (e.g. ST). The 3D channel measurements can be compressed using basis vectors (or matrices) similar to the Rel. 16 enhanced Type II codebook. Let $W_1$, $W_f$, and $W_d$ respectively denote basis matrices whose columns comprise basis vectors for SD, FD, and DD.

In one embodiment, the DD compression (or DD component or $W_d$ basis) can be turned OFF/ON from the codebook. When turned OFF, $W_d$ can be fixed (hence not reported), e.g., $W_d=1$ (scalar 1) or $W_d=[1, \ldots, 1]$ (all-one vector) or $$W_d = \frac{1}{n}[1, \ldots, 1](\text{all-one vector}) \text{ or } W_d = I = \begin{bmatrix} 1 & 0 & 0 \\ 0 & \ddots & 0 \\ 0 & 0 & 1 \end{bmatrix}(\text{identity matrix}),$$

where n is a scaling factor (e.g. $n=N_4$) or $W_d=h_{d*}=$ $$[\phi_0^{(d^*)} \ \phi_1^{(d^*)} \ \cdots \ \phi_{N_4-1}^{(d^*)}],$$

where d* is an index of a fixed DD basis vector $h_{d*}$. In one example, d*=0. In one example, when the DD basis vectors comprise an orthogonal DFT basis set, $h_{d*}$ is a DD basis vector which corresponds to the DC component. When turned ON, $W_d$ (DD basis vectors) is reported.

In one example, $W_d$ is turned OFF/ON via an explicit signaling, e.g., an explicit RRC parameter.

In one example, $W_d$ is turned OFF/ON via a codebook parameter. For example, similar to M=1 in Rel.17, when N=1 is configured, $W_d$ is turned OFF, and when a value N>1 is configured, $W_d$ is turned ON. Here, N denotes a number of DD basis vectors comprising columns of $W_d$.

In one example, the UE reports whether the DD component is turned OFF (not reported) or ON (reported). This reporting can be via a dedicated parameter (e.g., new UCI/CSI parameter). Or this reporting can be via an existing parameter (e.g., PMI component). A two-part UCI (cf. Rel. 15 NR) can be reused wherein the information whether $W_d$ is turned OFF/ON is included in UCI part 1.

In one example, $W_d$ is turned OFF/ON depending on the codebookType. When the codebookType is regular Type II codebook (similar to Rel 16 Type II codebook), $W_d$ is turned ON, and when the codebookType is Type II port selection codebook (similar to Rel 17 Type II codebook), $W_d$ is turned ON/OFF.

Figure 15:
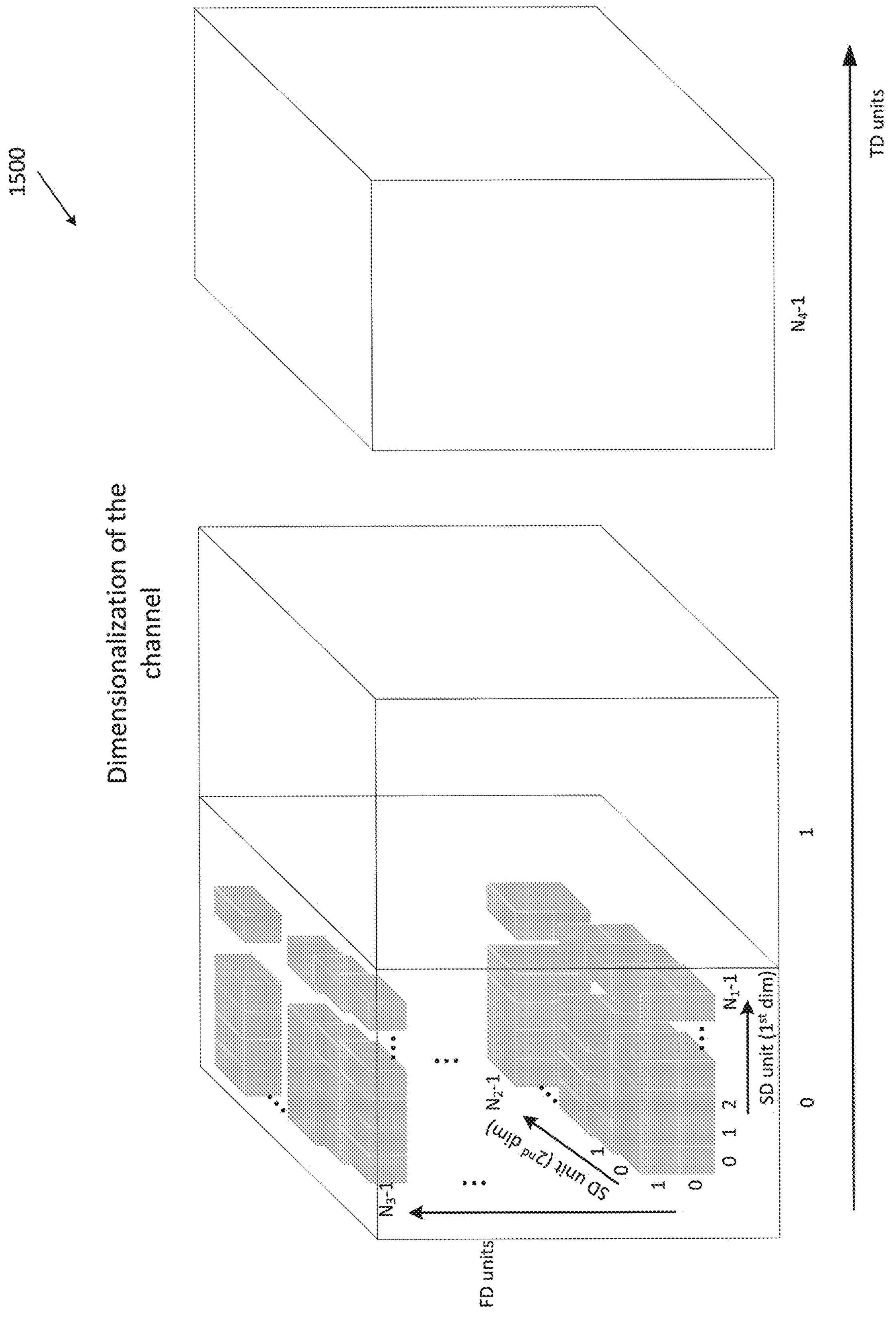
FIG. 15 illustrates a timeline of example spatial-domain (SD) units and frequency-domain (FD) units according to embodiments of the present disclosure.

FIG. 15 illustrates a timeline 1500 of example SD units and FD units according to embodiments of the present disclosure; For example, timeline 1500 of example SD units and FD units can be followed by any of the UEs 111-116 of FIG. 1. This example is for illustration only and other embodiments can be used without departing from the scope of the present disclosure.

In one embodiment, a UE (e.g., the UE 116) is configured (e.g., via a higher layer CSI configuration information) with a CSI report, where the CSI report is based on a channel measurement (and interference measurement) and a codebook. When the CSI report is configured to be aperiodic, it is reported when triggered via a DCI field (e.g., a CSI request field) in a DCI.

The channel measurement can be based on K≥1 channel measurement resources (CMRs) that are transmitted from a plurality of spatial-domain (SD) units (e.g., a SD unit=a CSI-RS antenna port), and are measured via a plurality of frequency-domain (FD) units (e.g., a FD unit=one or more PRBs/SBs) and via either a time-domain (TD) unit or a plurality of TD units (e.g., a TD unit=one or more time slots). In one example, a CMR can be a NZP-CSI-RS resource.

The CSI report can be associated with the plurality of FD units and the plurality of TD units associated with the channel measurement. Alternatively, the CSI report can be associated with a second set of FD units (different from the plurality of FD units associated with the channel measurement) or/and a second set of TD units (different from the plurality of TD units associated with the channel measurement). In this later case, the UE (e.g., the UE 116), based on the channel measurement, can perform prediction (interpolation or extrapolation) in the second set of FD units or/and the second set of TD units associated with the CSI report.

With reference to FIG. 15, an illustration of the SD units (in $1^{st}$ and $2^{nd}$ antenna dimensions), FD units, and TD units is shown.

The first dimension is associated with the 1st antenna port dimension and comprises $N_1$ units.

The second dimension is associated with the 2nd antenna port dimension and comprises $N_2$ units.

The third dimension is associated with the frequency dimension and comprises $N_3$ units.

The fourth dimension is associated with the time/Doppler dimension and comprises $N_4$ units.

The plurality of SD units can be associated with antenna ports (e.g., co-located at one site or distributed across multiple sites) comprising one or multiple antenna groups (i.e., $N_g$≥1), and dimensionalizes the spatial-domain profile of the channel measurement.

When K=1, there is one CMR comprising $P_{CSIRS}$ CSI-RS antenna ports.

When $N_g=1$, there is one AG comprising $P_{CSIRS}$ ports, and the CSI report is based on the channel measurement from the one AG.

When $N_g>1$, there are multiple AGs, and the CSI report is based on the channel measurement from/across the multiple AGs.

When K>1, there are multiple CMRs, and the CSI report is based on the channel measurement across the multiple CMRs. In one example, a CMR corresponds to an AG (one-to-one mapping). In one example, multiple CMRs can correspond to an AG (many-to-one mapping).

In one example, when the $P_{CSIRS}$ antenna ports are co-located at one site, $N_g=1$. In one example, when the $P_{CSIRS}$ antenna ports are distributed (non-co-located) across multiple sites, $N_g>1$.

In one example, when the $P_{CSIRS}$ antenna ports are co-located at one site and within a single antenna panel, $N_g=1$.

In one example, when the $P_{CSIRS}$ antenna ports are distributed across multiple antenna panels (can be co-located or non-co-located), $N_g>1$.

The value of $N_g$ can be configured, e.g., via higher layer RRC parameter. Or it can be indicated via a MAC CE. Or it can be provided via a DCI field.

Likewise, the value of K can be configured, e.g., via higher layer RRC parameter. Or it can be indicated via a MAC CE. Or it can be provided via a DCI field.

In one example, $K=N_g=X$. The value of X can be configured, e.g., via higher layer RRC parameter. Or it can be indicated via a MAC CE. Or it can be provided via a DCI field.

In one example, the value of K is determined based on the value of $N_g$. In one example, the value of $N_g$ is determined based on the value of K.

The plurality of FD units can be associated with a frequency domain allocation of resources (e.g., one or multiple CSI reporting bands, each comprising multiple PRBs) and dimensionalizes the frequency (or delay)-domain profile of the channel measurement.

The plurality of TD units can be associated with a time domain allocation of resources (e.g., one or multiple CSI reporting windows, each comprising multiple time slots) and dimensionalizes the time (or Doppler)-domain profile of the channel measurement.

The CSI report includes an information about a precoding matrix (e.g. the information is an indicator such as PMI). The information about the precoding matrix comprises/includes at least two components ($W_1$ and $W_2$). The first component ($W_1$) includes a basis which corresponds to a set of basis entities. The second component ($W_2$) includes:

- For low-resolution (Type I), selection of a basis entity from the basis entities (per layer) and co-phasing across two polarizations.
- For high-resolution (Type II), combining coefficients which linearly combine the basis entities, i.e., the precoding matrix can be represented as a weighted summation over the basis entities, where the weights are the combining coefficients.

The first component $W_1$ is codebook-based. When the basis needs reporting (or configured to be reported), the codebook configured for the CSI report includes at least one component for reporting the basis $W_1$. This component is similar to typical (e.g. Type I and II codebooks in 5G NR) codebooks. However, since $W_1$ is decoupled from $W_2$, the framework allows more options and parameterization for the $W_1$ basis as future upgrades when newer antenna types become available. The basis can be dictated by (or associated with) at least one of the spatial-domain profile, frequency (or delay)-domain profile, or time (Doppler)-domain profile of the channel measurement. Even though the number of CSI-RS antenna ports can be large (e.g. 256), the antenna ports are expected to have some antenna structure (e.g. similar to 2D active antenna array), hence the SD channel profile can be represented using SD basis entities, where the SD basis entities have dimension depending on the number of SD units ($P_{CSIRS}$ or $P_{CSIRS}/2$ or $2N_1N_2$ or $N_1N_2$). Likewise, the FD channel profile is likely to be correlated across FD units, and the DD/TD channel profile is also expected to have some correlation across DD/TD units (e.g. for low-medium speed UEs). Hence, FD and DD/TD channel profiles can be represented using FD and DD/TD basis entities, respectively, where their dimensions depend on the number of FD units ($N_3$) and the number of DD/TD units ($N_4$), respectively.

The second component ($W_2$) is also codebook-based and is derived based on the channel measurement and $W_1$. For instance, the channel measurement can be projected on to the basis $W_1$ and projected channel can be used to derive the $W_2$ components (coefficients), e.g., based on Type I or Type II codebooks in 5G NR.

In one example, the number of antenna ports across K CSI-RS resources is the same. For example, each of the K CSI-RS resources can be associated with $2N_1N_2$ antenna ports. In this case, the total number of antenna ports is $P_{CSIRS,tot}=2KN_1N_2$.

In one example, the number of antenna ports across K CSI-RS resources can be the same or different. For example, each of the K CSI-RS resources can be associated with $2N_{1,r}N_{2,r}$ antenna ports. In this case, the total number of antenna ports is $$P_{CSIRS,tot}=\sum_{r=1}^{K}2N_{1,r}N_{2,r}.$$

In port numbering scheme 1, the CSI-RS ports are numbered according to the order of (polarization p, NZP CSI-RS resource r) as CSI-RS ports of (p=0, r=1) followed by CSI-RS ports of (p=1, r=1), followed by CSI-RS ports of (p=0, r=2), followed by CSI-RS ports of (p=1, r=2), . . . , followed by CSI-RS ports of (p=0, r=N) followed by CSI-RS ports of (p=1, r=N).

In port numbering scheme 2, the CSI-RS ports are numbered according to the order of (polarization p, NZP CSI-RS resource r) as

- CSI-RS ports of (p=0, r=1) followed by CSI-RS ports of (p=0, r=1), . . . , followed by CSI-RS ports of (p=0, r=N), and
- then CSI-RS ports of (p=1, r=1) followed by CSI-RS ports of (p=1, r=1), . . . , followed by CSI-RS ports of (p=1, r=N).

Figure 16:
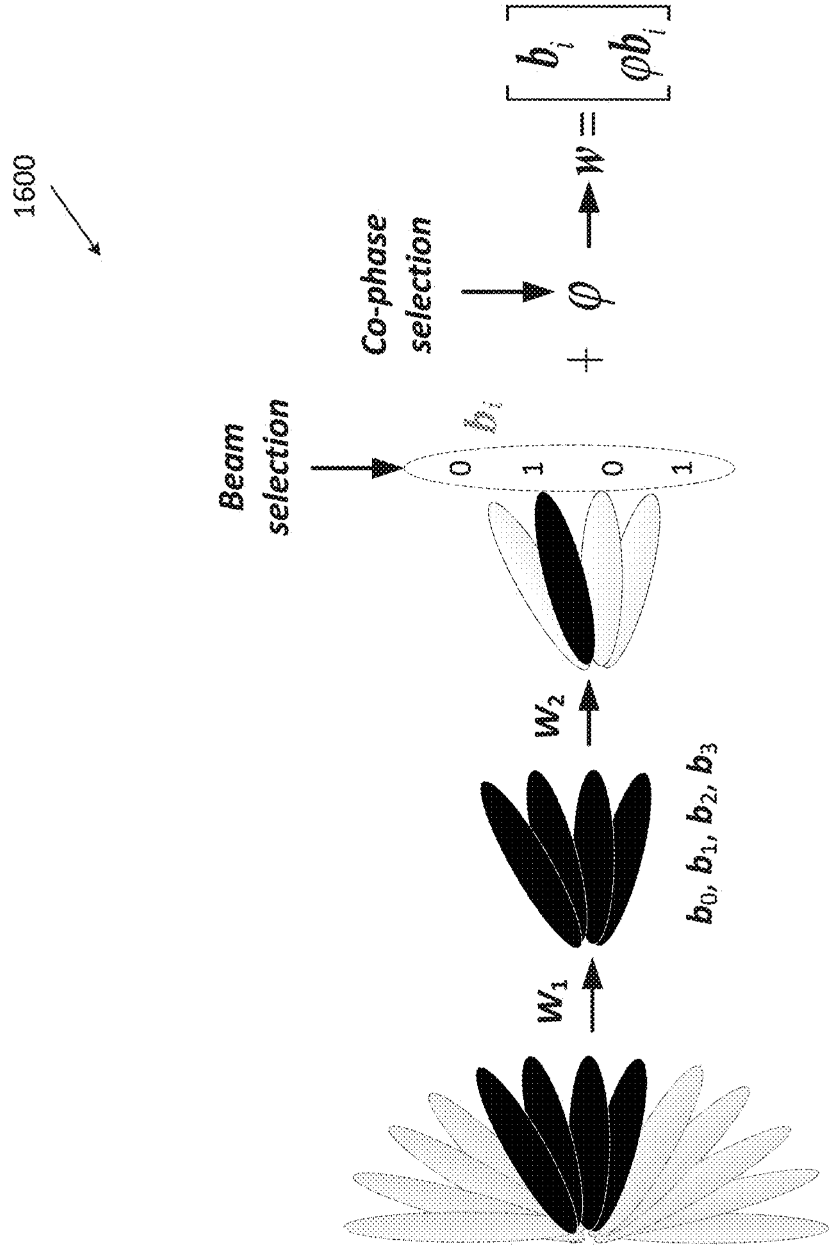
FIG. 16 illustrates a diagram of an example codebook for CSI reporting according to embodiments of the present disclosure.

FIG. 16 illustrates a diagram of an example codebook 1600 for CSI reporting according to embodiments of the present disclosure. For example, codebook 1600 can be utilized by an of the UEs 111-116 of FIG. 1, such as the UE 116 of FIG. 3. This example is for illustration only and other embodiments can be used without departing from the scope of the present disclosure.

In another embodiment, a UE is configured with a CSI report associated with (or across) N≥1 NZP CSI-RS resources (or N≥1 subsets of CSI-RS antenna ports or antenna port groups within a NZP CSI-RS resource), the CSI report is determined based on a codebook comprising components corresponding to $W_1$, and $W_2$. In particular, the precoder for layer l is given by $$W_l=\frac{1}{\gamma}W_1W_2$$

Here, $W_l$ is a $P_{CSIRS}\times 1$ vector, where $$P_{CSIRS}=\sum_{r=1}^{N}2N_{1,r}N_{2,r}$$

or $P_{CSIRS}=2N\ N_1N_2$, $W_1$ is a block diagonal matrix including 2 blocks, where two blocks are associated with two antenna polarizations (two halves or groups of CSI-RS antenna ports) of NZP CSI-RS resources and each block is a $$\frac{P_{CSIRS}}{2} \times L$$

SD basis or port selection matrix (similar to Rel. 15/16/18 Type II or Rel-15 Type I codebook or Rel. 16/17/18 Type II port selection (PS) or CJT PS codebook)

$W_2$ is a 2L×X coefficients matrix, where e.g., X=1 or X>1, and $\gamma$ is a normalization factor.

In one example, N≤K and K is a number of NZP CSI-RS resources (e.g. in a CSI resource set) configured for channel measurements. In one example, K is fixed (e.g. 2 or 3 or 4 or >4) or configured (e.g. via higher layer from {2,3,4} or {1, 2, 3, 4}), or reported by the UE (e.g. as part of UE capability). In one example, the value of N can be ≥1. In one example, the value of N can be ≥2. In one example, the value of N is configured (e.g. via higher layer). In one example, the value of N is reported by the UE (e.g. as part of the CSI report). In one example, the UE is configured with N=K (i.e., no selection of NZP CSI-RS resources) or N≤K (i.e., dynamic selection of NZP CSI-RS resources by the UE). When the UE performs dynamic selection, the selected N NZP CSI-RS resources can be reported via part 1 of the two part CSI (or UCI). The reporting can be via a bitmap indicator of size K bits.

In one example, a codebook with $W_1$ of one or more embodiments described herein can be based on Rel-15 Type-I codebook (or low-resolution codebook, 5.2.2.2.1 TS 38.214), where the codebook includes $W_1$ component in one or more embodiments described herein and $W_2$ component for basis vector selection and/or co-phase selection (e.g., it can be called Rel-19 Type-I CSI).

In one example, a codebook with $W_1$ of one or more embodiments described herein can be based on Rel-16 Type-II codebook (or high-resolution codebook, 5.2.2.2.5 TS 38.214), where the codebook includes $W_1$ component in one or more embodiments described herein, $W_f$ component for frequency-domain basis vector selection, and $W_2$ component for coefficient selection associated with (SD, FD) basis vector pairs (e.g., it can be called Rel-19 Type-II CSI).

In one example, a codebook with $W_1$ of one or more embodiments described herein can be based on Rel-18 Type-II codebook (or high-resolution codebook, 5.2.2.2.8 TS 38.214), where the codebook includes $W_1$ component in one or more embodiments described herein, $W_f$ component for frequency-domain basis vector selection, and $W_2$ component for coefficient selection associated with (SD, FD) basis vector pairs (e.g., it can be called Rel-19 Type-II CSI).

In one embodiment, Type-I and Type-II CSI reporting can be (implicitly) configured from a same codebook via configuring the value of L. The codebook is designed based on $W_1$ according one or more embodiments described herein.

In one example, Type-I CSI reporting can be (implicitly) configured when L=1 is configured.

In one example, when L=1 is configured, FD compression component (i.e., $W_f$ component, e.g., FD basis vector selection ($i_{1,5}$, $i_{1,6}$) and corresponding coefficient selection) is not applied in the codebook, i.e., $W=W_1W_2$.

In one example, when L=1 is configured, FD compression component (i.e., $W_f$ component, e.g., FD basis vector selection ($i_{1,5}$, $i_{1,6}$) and corresponding coefficient selection) can be turned on or turned off by using a higher-layer parameter.

In one example, Type-II CSI reporting can be (implicitly) configured when L>1 is configured.

In one example, when L>1 is configured, FD compression component (i.e., $W_f$ component, e.g., FD basis vector selection ($i_{1,5}$, $i_{1,6}$) and corresponding coefficient selection) can be turned on or turned off by using a higher-layer parameter.

In one example, when L>1 is configured, FD compression component (i.e., $W_f$ component, e.g., FD basis vector selection ($i_{1,5}$, $i_{1,6}$) and corresponding coefficient selection) is turned on, i.e., $$W = W_1 W_2 W_f^H.$$

In one embodiment, Type-I and Type-II CSI reporting can be explicitly configured from a same codebook via a higher-layer parameter, e.g., codebookType, codebookMode, etc. The codebook is designed based on $W_1$ according to one or more embodiments described herein.

In one example, for Type-I CSI reporting, the candidate values of L can include 1 and other value(s) larger than 1 (e.g., 4), and one out of L basis vectors is selected.

In another example, for Type-I CSI reporting, L=1 is only allowed to configure.

In one example, for Type-II CSI reporting, the candidate values of L can include values larger than 1 (e.g., 2,4,6).

In one example, for Type-II CSI reporting, the candidate values of L can include 1 and other values larger than 1 (e.g., 2,4,6).

In the examples described in this disclosure, the terminology of Type-I/Type-II should not be limited to the scope of the present disclosure. They can be denoted by different terminologies such as low-resolution/high-resolution CSI codebook, low-resolution/high-resolution CSI reporting, etc.

With reference to FIG. 16, at least one of the following examples is used/configured regarding $W_1$ and $W_2$.

Figure 17:
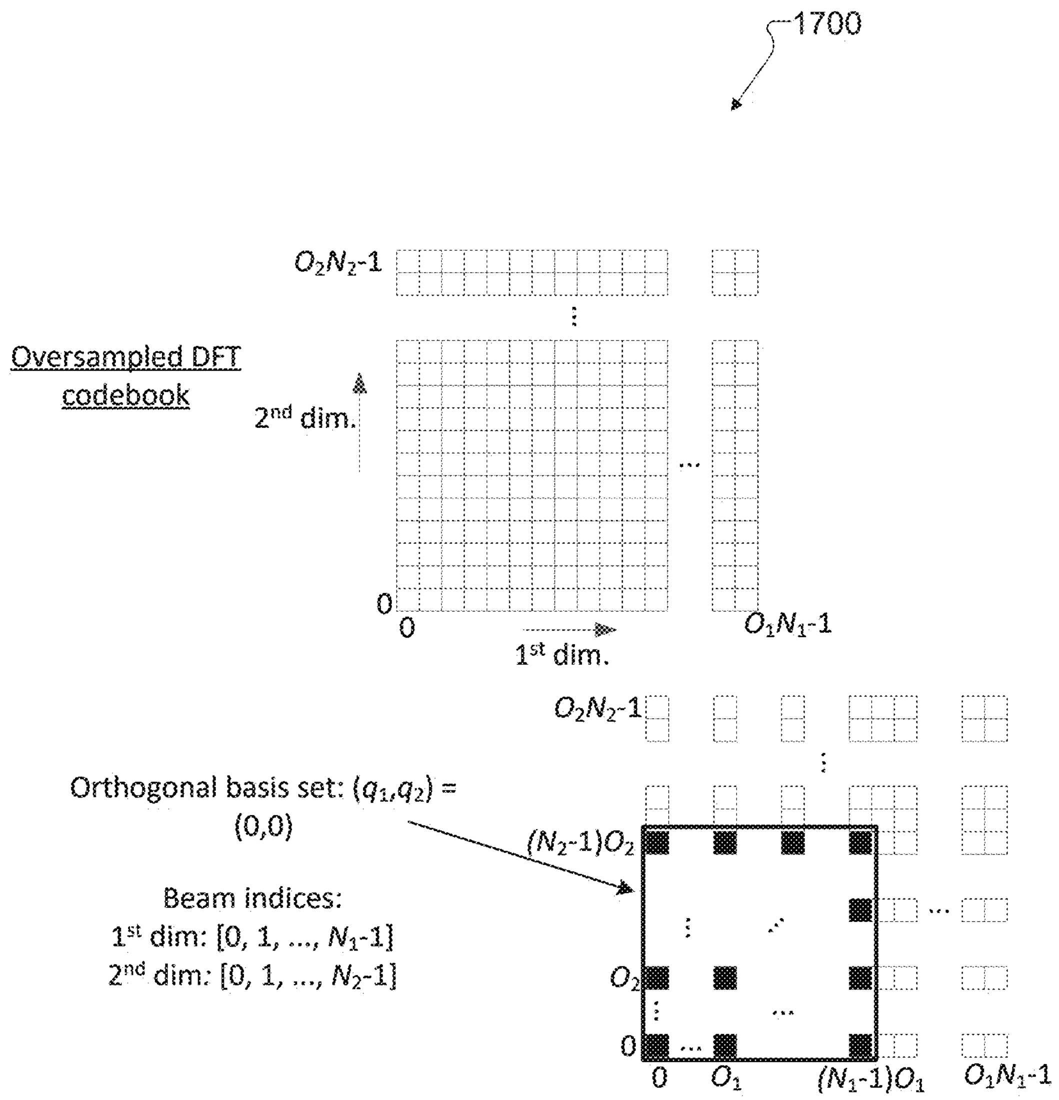
FIG. 17 illustrates a diagram of an example orthogonal basis set for discrete Fourier transform (DFT) beams according to embodiments of the present disclosure.

FIG. 17 illustrates a diagram of an example orthogonal basis set 1700 for discrete fourier transform (DFT) beams according to embodiments of the present disclosure. For example, orthogonal basis set 1700 can be utilized by any of the UEs 111-116 of FIG. 1, such as the UE 111. This example is for illustration only and other embodiments can be used without departing from the scope of the present disclosure.

In one example, $W_1$ is a block diagonal matrix $$\begin{bmatrix} W_{1,1} & 0 \\ 0 & W_{1,2} \end{bmatrix}$$

comprising 2 blocks, $W_{1,1}$ and $W_{1,2}$, are (spatial-domain, SD) basis matrices associated with two antenna polarizations (two halves or groups of CSI-RS antenna ports) of (all) N NZP CSI-RS resources, and $W_2$ can be $$W_2 = W_{2,1} W_{2,2} = \begin{bmatrix} e_j^L & 0 \\ 0 & e_j^L \end{bmatrix} \begin{bmatrix} 1 \\ c \end{bmatrix} = \begin{bmatrix} e_j^L \\ c e_j^L \end{bmatrix}, e_j^L$$

is a L-element column (selection) vector containing a value of 1 in element j or (j mod L) and zeros elsewhere, and c is a coefficient. Note that when L=1, $$W_{2,1}=\begin{bmatrix}1&0\\0&1\end{bmatrix},$$

hence $$e_j^L$$

does not need reporting when L>1.

In one example, $$\begin{bmatrix}W_{1,1}&0\\0&W_{1,2}\end{bmatrix}=\begin{bmatrix}B&0\\0&B\end{bmatrix}$$

is a $P_{CSIRS}$×2L SD basis matrix, where the L SD basis vectors comprising columns of B are determined the same way as in Rel. 15/16 Type II codebooks (cf. 5.2.2.2.3, REF 8), i.e., the SD basis vectors $$v_{m_1^{(i)},m_2^{(i)}},$$

i=0, 1, . . . , L−1 are identified by the indices $q_1$, $q_2$, $n_1$, $n_2$, can be indicated by PMI components $i_{1,1}$, $i_{1,2}$, and are obtained as in 5.2.2.2.3 of [REF 8].

$$i_{1,1}=[q_1q_2]$$

$$q_1\in\{0,1,\ldots,O_1-1\}$$

$$q_2\in\{0,1,\ldots,O_2-1\}$$

$$i_{1,2}\in\left\{0,1,\ldots,\binom{N_1N_2}{L}-1\right\}$$

Let $$n_1\left[n_1^{(0)},\ldots,n_1^{(L-1)}\right]$$

$$n_2\left[n_2^{(0)},\ldots,n_2^{(L-1)}\right]$$

$$n_1^{(i)}\in\{0,1,\ldots,N_1-1\}$$

$$n_2^{(i)}\in\{0,1,\ldots,N_2-1\}$$

and $$C(x,y)=\begin{cases}\binom{x}{y}&x\ge y\\0&x<y\end{cases}$$

where the values of C(x,y) are given in Table 5.2.2.2.3-1 [REF8].

The quantities $$m_1^{(i)},m_2^{(i)}$$

are given by $$m_1^{(i)}=O_1n_1^{(i)}+q_1$$

$$m_2^{(i)}=O_2n_2^{(i)}+q_2$$

and correspond to the DFT beam (vector) indices in the oversampled DFT codebook.

The L DFT beams or DFT vectors are selected or identified by the components $i_{1,1}$ and $i_{1,2}$ of the codebook index $i_1$, where ($q_1$, $q_2$) indicates the orthogonal basis set comprising of $N_1N_2$ DFT beams. With reference to FIG. 17, an example is shown for ($q_1$, $q_2$)=(0,0) where beams are shown as black squares located in an ($N_1$, $N_2$) grid.

Figure 18:
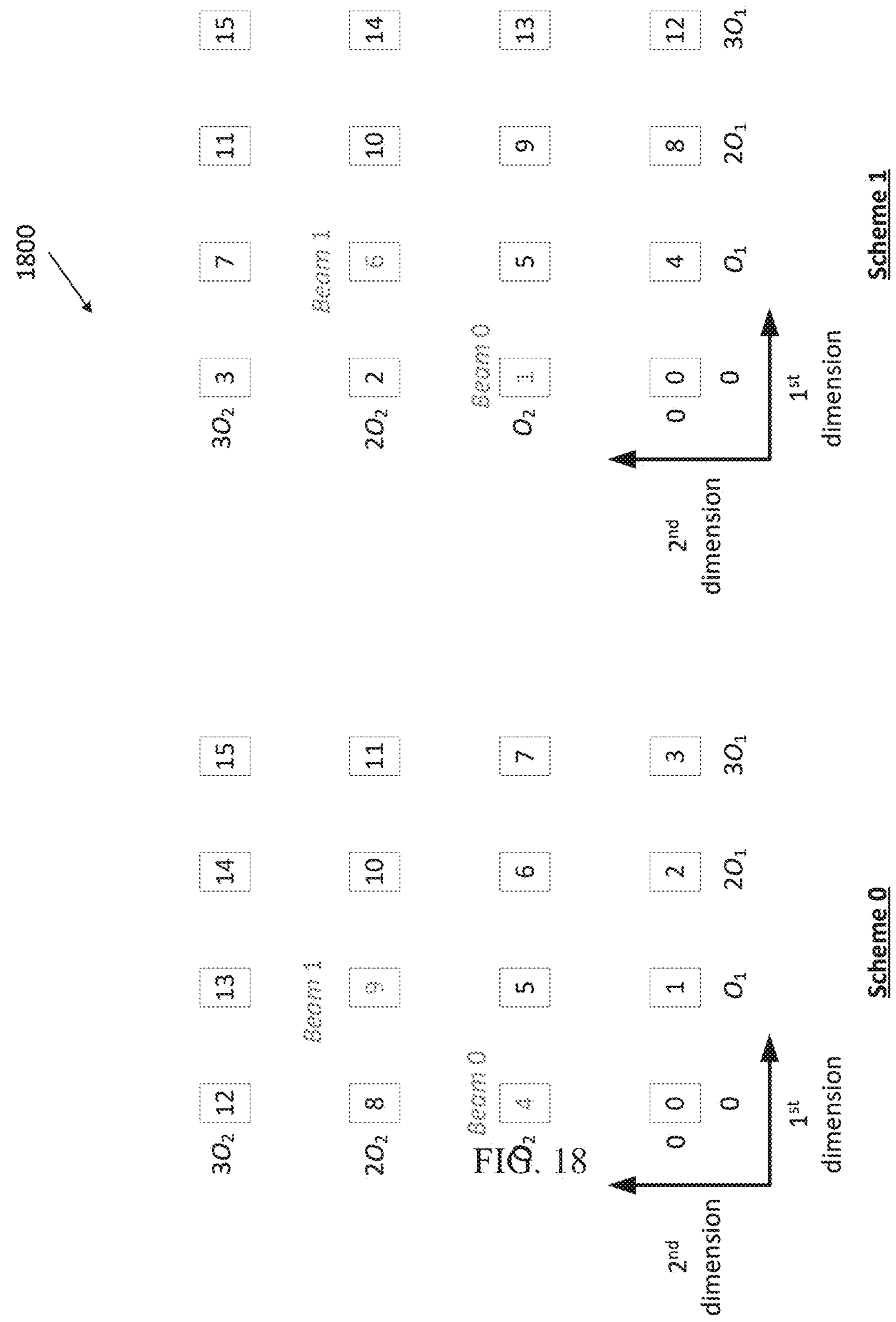
FIG. 18 illustrates diagrams of example beam sorting schemes for beam selection according to embodiments of the present disclosure.

FIG. 18 illustrates diagrams of example beam sorting schemes 1800 for beam selection according to embodiments of the present disclosure. For example, beam sorting schemes 1800 for beam selection can be utilized by the UE 112 of FIG. 1. This example is for illustration only and other embodiments can be used without departing from the scope of the present disclosure.

For the L out $N_1N_2$ beam selection, the $N_1N_2$ beams in the orthogonal basis set, indicated by ($q_1$, $q_2$), are sorted or numbered according to at least one of the following schemes:

Scheme 0: Starting from the leading beam ($q_1$, $q_2$), $N_1N_2$ beams in the orthogonal basis set are sorted or numbered sequentially 0 to $N_1N_2$−1 first in the 1st dimension and then in the 2nd dimension. For a given beam $$\left(n_1^{(i)},n_2^{(i)}\right)$$

in the orthogonal basis set, the sorted beam index is then given by $$n^{(i)}=N_1n_2^{(i)}+n_1^{(i)}$$

where the indices i=0, 1, . . . , L−1 are assigned such that $n^{(i)}$ increases as i increases.

Scheme 1: Starting from the leading beam ($q_1$, $q_2$), $N_1N_2$ beams are numbered sequentially 0 to $N_1N_2$−1 first in the 2nd dimension and then in the 1st dimension. For a given beam $$\left(n_1^{(i)},n_2^{(i)}\right)$$

in the orthogonal basis set, the sorted beam index is then given by $$n^{(i)}=N_2n_1^{(i)}+n_2^{(i)}$$

where the indices i=0, 1, . . . , L−1 are assigned such that $n^{(i)}$ increases as i increases.

The sorted beam indices $n^{(i)}\in\{0, 1, \ldots, N_1N_2-1\}$. With reference to FIG. 18, two beam sorting (numbering)

schemes are shown. An example of L=2 out of $N_1N_2=16$ beam selection is also shown according to the two schemes, where $$\left(n_1^{(0)}, n_2^{(0)}\right) = (0, 1)$$

for Beam 0 and, $$\left(n_1^{(i)}, n_2^{(i)}\right) = (1, 2)$$

(1,2) for Beam 1. According to Scheme 0, Beam 0 and Beam 1 are numbered as $n^{(0)}=4$ and $n^{(1)}=9$, respectively, and according to Scheme 1, they are numbered as $n^{(0)}=1$ and $n^{(}1)=6$, respectively.

For a given antenna port layout $(N_1, N_2)$ and oversampling factors $(O_1, O_2)$ for two dimensions, a DFT vector $v_{l,m}$ (the superscript $N_1$ and $N_2$ shall be used when needed in this disclosure) can be expressed as follows.

$$v_{l,m}^{N_1,N_2} = \left[u_m \quad e^{j\frac{2\pi l}{O_1N_1}}u_m \quad \ldots \quad e^{j\frac{2\pi l(N_1-1)}{O_1N_1}}u_m\right]^T$$

-continued $$u_m^{N_2} = \left[1 \quad e^{j\frac{2\pi m}{O_2N_2}} \quad \ldots \quad e^{j\frac{2\pi m(N_2-1)}{O_2N_2}}\right]$$

where $l\in\{0, 1, \ldots, O_1N_1-1\}$ and $m\in\{0, 1, \ldots, O_2N_2-1\}$. Here, $(O_1, O_2)$ can be fixed, e.g. (1,1), (2,2), (2,1), (2,2), (4,1), or (4,4), or configured. $(O_1, O_2)$ can be different across resources. $(O_1, O_2)$ can depend on $(N_1, N_2)$. For example, $O_iN_i=v$ or $\leq v$ where v can be fixed, e.g. 64, 128 or configured.

Let $P_{CSIRS,r}=2N_{1,r}N_{2,r}$ be number of CSI-RS ports associated with CSI-RS resource r. Let $K=M_1M_2$ be a total number of resources or port groups, where $M_i$ is a number of resources in i-th dimension, and i=1, 2. In one example, the UE is configured with one of the following:

- In one example, the UE is configured with K or $(M_1, M_2)$, and $P_{CSIRS,r}$.
- In one example, the UE is configured with K or $(M_1, M_2)$, and $P_{CSIRS}$.
- In one example, the UE is configured with $P_{CSIRS}$, and $P_{CSIRS,r}$.
- In one example, the UE is configured with K or $(M_1, M_2)$, $P_{CSIRS,r}$ and $P_{CSIRS}$.

In one example, the UE is configured with one of the parameters herein from a set of supported combinations of values, which can be each of or a subset of the combinations shown in Table 1.

TABLE 1

| Number of CSI-RS antenna ports, $P_{CSI-RS}$ | $(N_1, N_2)$ | Number of resources: $M_1 \times M_2$, $(M_1, M_2)$ |
|---|---|---|
| 4 | (2, 1) | |
| 8 | (2, 2) | |
| | (4, 1) | |
| 12 | (3, 2) | |
| | (6, 1) | |
| 16 | (4, 2) | |
| | (8, 1) | |
| 24 | (4, 3) | |
| | (6, 2) | |
| | (12, 1) | |
| 32 | (4, 4) | |
| | (8, 2) | |
| | (16, 1) | |
| 64 | $P_{CSIRS,\ r}$ = 2: (1, 1) | (32, 1), (16, 2), (8, 4), (4, 8)(2, 16), (1, 32) |
| | $P_{CSIRS,\ r}$ = 4: (2, 1) | (16, 1), (8, 2), (4, 4), (2, 8)(1, 16) |
| | $P_{CSIRS,\ r}$ = 8: (2, 2), (4, 1) | (8, 1), (4, 2), (2, 4), (1, 8) |
| | $P_{CSIRS,\ r}$ = 16: (4, 2), (8, 1) | (4, 1), (2, 2), (1, 4) |
| | $P_{CSIRS,\ r}$ = 32: (4, 4), (8, 2), (16, 1) | (2, 1), (1, 2) |
| 96 | $P_{CSIRS,\ r}$ = 2: (1, 1) | (48, 1), (24, 2), (16, 3), (12, 4), (8, 6), (6, 8), (4, 12), (3, 16), (2, 24), (1, 48) |
| | $P_{CSIRS,\ r}$ = 4: (2, 1) | (24, 1), (12, 2), (8, 3), (6, 4), (4, 6), (3, 8), (2, 12), (1, 24) |
| | $P_{CSIRS,\ r}$ = 8: (2, 2), (4, 1) | (12, 1), (6, 2), (4, 3), (3, 4), (2, 6), (1, 12) |
| | $P_{CSIRS,\ r}$ = 12: (3, 2), (6, 1) | (8, 1), (4, 2), (2, 4), (1, 8) |
| | $P_{CSIRS,\ r}$ = 16: (4, 2), (8, 1) | (6, 1), (3, 2), (2, 3), (1, 6) |
| | $P_{CSIRS,\ r}$ = 24: (4, 3), (6, 2), (12, 1) | (4, 1), (2, 2), (1, 4) |
| | $P_{CSIRS,\ r}$ = 32: (4, 4), (8, 2), (16, 1) | (3, 1), (1, 3) |
| 128 | $P_{CSIRS,\ r}$ = 2: (1, 1) | (64, 1), (32, 2), (16, 4), (8, 8), (4, 16), (2, 32), (1, 64) |
| | $P_{CSIRS,\ r}$ = 4: (2, 1) | (32, 1), (16, 2), (8, 4), (4, 8)(2, 16), (1, 32) |
| | $P_{CSIRS,\ r}$ = 8: (2, 2), (4, 1) | (16, 1), (8, 2), (4, 4), (2, 8)(1, 16) |

TABLE 1-continued

| Number of CSI-RS antenna ports, $P_{CSI\text{-}RS}$ | $(N_1, N_2)$ | Number of resources: $M_1 \times M_2$, $(M_1, M_2)$ |
|---|---|---|
| | $P_{CSIRS,r}$ = 16: (4, 2), (8, 1) | (8, 1), (4, 2), (2, 4), (1, 8) |
| | $P_{CSIRS,r}$ = 32: (4, 4), (8, 2), (16, 1) | (4, 1), (2, 2), (1, 4) |
| | $P_{CSIRS,r}$ = 64: (8, 4), (16, 2), (32, 1) | (2, 1), (1, 2) |
| 36 | $P_{CSIRS,r}$ = 2: (1, 1) | (18, 1), (9, 2), (6, 3), (3, 6), (2, 9), (1, 18) |
| | $P_{CSIRS,r}$ = 4: (2, 1) | (9, 1), (3, 3), (1, 9) |
| | $P_{CSIRS,r}$ = 12: (6, 1), (3, 2) | (3, 1), (1, 3) |
| 48 | $P_{CSIRS,r}$ = 2: (1, 1) | (24, 1), (12, 2), (8, 3), (3, 8)(2, 12), (1, 24) |
| | $P_{CSIRS,r}$ = 4: (2, 1) | (12, 1), (6, 2), (4, 3), (3, 4), (2, 6)(1, 12) |
| | $P_{CSIRS,r}$ = 8: (2, 2), (4, 1) | (6, 1), (3, 2), (2, 3), (1, 6) |
| | $P_{CSIRS,r}$ = 12: (4, 2), (8, 1) | (4, 1), (2, 2), (1, 4) |
| | $P_{CSIRS,r}$ = 16: (4, 2), (8, 1) | (3, 1), (1, 3) |
| | $P_{CSIRS,r}$ = 24: (4, 3), (6, 2)(12, 1) | (2, 1), (1, 2) |
| 72 | $P_{CSIRS,r}$ = 2: (1, 1) | (36, 1), (18, 2), (9, 4), (4, 9)(2, 18), (1, 36) |
| | $P_{CSIRS,r}$ = 4: (2, 1) | (18, 1), (9, 2), (2, 9)(1, 18) |
| | $P_{CSIRS,r}$ = 8: (2, 2), (4, 1) | (9, 1), (3, 3), (1, 9) |
| | $P_{CSIRS,r}$ = 12: (4, 2), (8, 1) | (6, 1), (3, 2), (2, 3), (1, 6) |
| | $P_{CSIRS,r}$ = 16: (4, 2), (8, 1) | (4, 1), (2, 2), (1, 4) |
| | $P_{CSIRS,r}$ = 24: (4, 3), (6, 2), (12, 1) | (3, 1), (1, 3) |
| | $P_{CSIRS,r}$ = 32: (4, 4), (8, 2), (16, 1) | (2, 1), (1, 2) |

In one example, the UE is configured with one of the parameters herein from a set of supported combinations of values, which can be each of or a subset of the combinations shown in Table 2.

TABLE 2

| Number of CSI-RS antenna ports, $P_{CSI\text{-}RS}$ | $(N_1, N_2)$ | Number of resources: $M_1 \times M_2$, $(M_1, M_2)$ |
|---|---|---|
| 4 | $P_{CSIRS,r}$ = 2: (1, 1) | (1, 2), (2, 1) |
| | $P_{CSIRS,r}$ = 4: (2, 1) | (1, 1) |
| 8 | $P_{CSIRS,r}$ = 2: (1, 1) | (4, 1), (2, 2), (1, 4) |
| | $P_{CSIRS,r}$ = 4: (2, 1) | (1, 2), (2, 1) |
| | $P_{CSIRS,r}$ = 8: (2, 2), (4, 1) | (1, 1) |
| 12 | $P_{CSIRS,r}$ = 2: (1, 1) | (1, 12), (2, 6), (3, 4), (4, 3), (6, 2), (12, 1) |
| | $P_{CSIRS,r}$ = 4: (2, 1) | (1, 3), (3, 1) |
| | $P_{CSIRS,r}$ = 12: (3, 2), (6, 1) | (1, 1) |
| 16 | $P_{CSIRS,r}$ =2: (1, 1) | (8, 1), (4, 2), (2, 4), (1, 8) |
| | $P_{CSIRS,r}$ =4: (2, 1) | (4, 1), (2, 2), (1, 4) |
| | $P_{CSIRS,r}$ =8: (2, 2), (4, 1) | (2, 1), (1, 2) |
| | $P_{CSIRS,r}$ = 16: (4, 2), (8, 1) | (1, 1) |
| 24 | $P_{CSIRS,r}$ =2: (1, 1) | (1, 12), (2, 6), (3, 4), (4, 3), (6, 2), (12, 1) |
| | $P_{CSIRS,r}$ = 4: (2, 1) | (1, 6), (2, 3), (3, 2), (6, 1) |
| | $P_{CSIRS,r}$ = 12: (3, 2), (6, 1) | (2, 1), (1, 2) |
| | $P_{CSIRS,r}$ = 24: (6, 2), (4, 3), (12, 1) | (1, 1) |
| 32 | $P_{CSIRS,r}$ =2: (1, 1) | (16, 1), (8, 2), (4, 4), (2, 8)(1, 16) |
| | $P_{CSIRS,r}$ = 4: (2, 1) | (8, 1), (4, 2), (2, 4), (1, 8) |
| | $P_{CSIRS,r}$ =8: (2, 2), (4, 1) | (4, 1), (2, 2), (1, 4) |
| | $P_{CSIRS,r}$ = 16: (4, 2), (8, 1) | (2, 1), (1, 2) |
| | $P_{CSIRS,r}$ = 32: (4, 4), (8, 2), (16, 1) | (1, 1) |
| 64, 96, 128, 36, 48, 72 | Same as in Table 1 | Same as in Table 1 |

In one example, $$C = e^{\frac{j2\pi\phi}{N_{PSK}}}$$

where $\phi \in \{0, 1, \ldots, N_{PSK}-1\}$, and $N_{PSK}=2$ (for Binary Phase-shift keying (BPSK)), $N_{PSK}=4$ (for QPSK), 8 (for 8 PSK), or 16 (for 16 PSK). In one example, $N_{PSK}$ is fixed, e.g. $N_{PSK}=4$, or $N_{PSK}=2$. In one example, $N_{PSK}$ is configured via higher layer, e.g. from {2,4}. In one example, UE (e.g., the UE 116) determines/selects which $N_{PSK}$ is used and reports it as a part of CSI. In one example, the range of $\phi$ is a subset of $\{0, 1, \ldots, N_{PSK}-1\}$. For example, $\phi \in$ $$\left\{0, 1, \ldots, \frac{N_{PSK}}{2} - 1\right\}.$$

In another example, $\phi \in$ $$\left\{0, 1, \ldots, \frac{N_{PSK}}{4} - 1\right\}.$$

The selection vector $$e_j^L$$

and coefficient c are identified by the indices $j \in \{0, 1, \ldots, L-1\}$ and $\phi$ respectively, can be indicated by PMI components $i_{2,1}$, $i_{2,2}$, and are obtained as $$i_2=[i_{2,1},i_{2,2}]$$

$$i_{2,1}=j$$

$$i_{2,2}=\phi$$

In one example, $$c = pe^{\frac{j2\pi\phi}{N_{PSK}}}$$

where p is an amplitude or power level. The selection vector $$e_j^L$$

and coefficient c for are identified by the indices $j \in \{0, 1, \ldots, L-1\}$ and $(\phi, k)$ respectively, can be indicated by PMI components $i_{2,1}$, $i_{2,2}$, $i_{2,3}$, and are obtained as $$i_2=[i_{2,1},i_{2,2},i_{2,3}]$$

The selection vector indicator $i_{2,1}=j$.

The phase coefficient indicators $i_{2,2}=\phi$.

The amplitude coefficient indicators $i_{2,3}=k$.

In one example, the mapping from k to the amplitude coefficient p is given one of the examples in Table 3.

TABLE 3

Mapping of elements of $i_{2,3}$: k to p

| k | p (Ex 1) | p (Ex 2) | p (Ex 3) | p (Ex 4) |
|---|---|---|---|---|
| 0 | $\frac{1}{2\sqrt{2}}$ | 0 | $\frac{1}{8\sqrt{2}}$ | 0 |
| 1 | $\frac{1}{2}$ | $\frac{1}{2}$ | $\frac{1}{8}$ | $\frac{1}{8}$ |
| 2 | $\frac{1}{\sqrt{2}}$ | $\frac{1}{\sqrt{2}}$ | $\frac{1}{4\sqrt{2}}$ | $\frac{1}{4\sqrt{2}}$ |
| 3 | 1 | 1 | $\frac{1}{4}$ | $\frac{1}{4}$ |
| 4 | | | $\frac{1}{2\sqrt{2}}$ | $\frac{1}{2\sqrt{2}}$ |
| 5 | | | $\frac{1}{2}$ | $\frac{1}{2}$ |
| 6 | | | $\frac{1}{\sqrt{2}}$ | $\frac{1}{\sqrt{2}}$ |
| 7 | | | 1 | 1 |

In one example, the rank-1 (1-layer) precoder is then given by $$W_{i_{1,1},i_{1,2},i_2}^{(1)} = \frac{1}{\sqrt{P_{CSIRS}}}\begin{bmatrix} v_{m_1^{(j)},m_2^{(j)}} \\ cv_{m_1^{(j)},m_2^{(j)}} \end{bmatrix}.$$

In another variation (V1) of previous example, $$W_2 = W_{2,1}W_{2,2} = \begin{bmatrix} e_j^L & 0 \\ 0 & e_j^L \end{bmatrix}\begin{bmatrix} c_0 \\ c_1 \end{bmatrix} = \begin{bmatrix} c_0 e_j^L \\ c_1 e_j^L \end{bmatrix},$$

where $c_0$ and $c_1$ are coefficients (phase only or phase and amplitude) associated with two antenna polarizations (0 and 1).

$$W_2 = W_{2,1}W_{2,2} = \begin{bmatrix} e_j^L & 0 \\ 0 & e_j^L \end{bmatrix}\begin{bmatrix} 1 \\ c \end{bmatrix} = \begin{bmatrix} e_j^L \\ ce_j^L \end{bmatrix}.$$

In another variation (V2) of previous example, $$W_2 = W_{2,1}W_{2,2} = \begin{bmatrix} e_{j_0}^L & 0 \\ 0 & e_{j_1}^L \end{bmatrix}\begin{bmatrix} 1 \\ c \end{bmatrix} = \begin{bmatrix} e_{j_0}^L \\ ce_{j_1}^L \end{bmatrix},$$

where $j_0$ and $j_1$ are selected basis vectors associated with two antenna polarizations (0 and 1).

In another variation (V3) of previous example, $$W_2 = W_{2,1}W_{2,2} = \begin{bmatrix} e^L_{j_0} & 0 \\ 0 & e^L_{j_1} \end{bmatrix}\begin{bmatrix} c_0 \\ c_1 \end{bmatrix} = \begin{bmatrix} c_0 e^L_{j_0} \\ c_1 e^L_{j_1} \end{bmatrix},$$

where $j_0$ and $j_1$ are selected basis vectors associated with two antenna polarizations (0 and 1), and $c_0$ and $c_1$ are coefficients (phase only or phase and amplitude) associated with two antenna polarizations (0 and 1).

In general, as an example, the selection vector $$e^L_{j_p}$$

and coefficient $c_p$ for p=0, 1 are identified by the indices $j_p \in \{0, 1, \ldots, L-1\}$ and ($\phi_p$, $k_p$) respectively, can be indicated by PMI components $i_{2,1}$, $i_{2,2}$, $i_{2,3}$, and are obtained as $$i_2=[i_{2,1}, i_{2,2}, i_{2,3}]$$

$$i_{2,1}=[j_0 j_1]$$

$$i_{2,2}=[\phi_0 \phi_1]$$

$$i_{2,3}=[k_0 k_1]$$

In general, as an example, the rank-1 (1-layer) precoder can be given by $$W^{(1)}_{i_{1,1},i_{1,2},i_2} = \frac{1}{\sqrt{P_{CSIRS}}}\begin{bmatrix} c_0 v_{m_1^{(j_0)},m_2^{(j_0)}} \\ c_1 v_{m_1^{(j_1)},m_2^{(j_1)}} \end{bmatrix}.$$

Where depending on the variations mentioned herein, either

- $j_0$ and $j_1$ can be the same, i.e., $j_0=j_1$, or
- $j_0$ and $j_1$ can be different, i.e., both $j_0=j_1$ and $j_0 \neq j_1$ are feasible, or
- $k_0$ and $k_1$ can be the same, i.e., $k_0=k_1$, or
- $k_0$ and $k_1$ can be different, i.e., both $k_0=k_1$ and $k_0 \neq k_1$ are feasible, or.
- $c_0$ can be fixed (e.g. 1) and $c_0=c_1$ or $c_0 \neq c_1$.

In one example, the $W_1$ has the following structure, i.e., SD basis vectors are the same for two polarizations (polarization common) but can be different across layers (layer-specific):

$$W_1^{(l)} = \begin{bmatrix} B_l & 0 \\ 0 & B_l \end{bmatrix}, \text{ for } l = 1, \ldots v,$$

where $B_l=[b_{l,0}, b_{l,1}, \ldots, b_{l,L-1}]$ including L SD basis vectors (as columns), and v is the number of layers (i.e., rank).

In one example (for layer-specific $q_1$, $q_2$), the SD basis vectors $$v^{(l)}_{m_1^{(i)},m_2^{(i)}},\ i = 0, 1, \ldots, L-1,\ l = 1, \ldots, v$$

i=0, 1, . . . , L−1, l=1, . . . , v are indicated by PMI components $i_{1,1,l}$, $i_{1,2,l}$, where $$i_{1,1,l} = [\,q_{1,l} \quad q_{2,l}\,],$$
$$q_{1,l} \in \{0, 1, \ldots, O_1 - 1\},$$
$$q_{2,l} \in \{0, 1, \ldots, O_2 - 1\},$$
$$i_{1,2,l} \in \left\{0, 1, \ldots, \binom{N_1N_2}{L} - 1\right\}.$$

In another example (for layer-specific $q_1$, $q_2$), the SD basis vectors $$v^{(l)}_{m_1^{(i)},m_2^{(i)}},\ i = 0, 1, \ldots, L-1,\ l = 1, \ldots, v$$

0, 1, . . . , L−1, l=1, . . . , v are indicated by PMI components $i_{1,1}$, $i_{1,2}$, where $$i_{1,1} = [\,i_{1,1,1} \ \cdots \ i_{1,1,v}\,],$$
$$i_{1,1,l} = [\,q_{1,l} \quad q_{2,l}\,],$$
$$q_{1,l} \in \{0, 1, \ldots, O_1 - 1\},$$
$$q_{2,l} \in \{0, 1, \ldots, O_2 - 1\},$$
$$i_{1,2} = [\,i_{1,2,1} \ \cdots \ i_{1,2,v}\,],$$
$$i_{1,2,l} \in \left\{0, 1, \ldots, \binom{N_1N_2}{L} - 1\right\}.$$

In one example (for layer-common $q_1$, $q_2$), the SD basis vectors $$v^{(l)}_{m_1^{(i)},m_2^{(i)}},\ i = 0, 1, \ldots, L-1,\ l = 1, \ldots, v$$

i=0, 1, . . . , L−1, l=1, . . . , v are indicated by PMI components $i_{1,1,l}$, $i_{1,2,l}$, where $$i_{1,1} = [\,q_1 \quad q_2\,],$$
$$q_1 \in \{0, 1, \ldots, O_1 - 1\},$$
$$q_2 \in \{0, 1, \ldots, O_2 - 1\},$$
$$i_{1,2,l} \in \left\{0, 1, \ldots, \binom{N_1N_2}{L} - 1\right\}.$$
$$i_{1,1} = [\,q_1 \quad q_2\,],$$
$$q_1 \in \{0, 1, \ldots, O_1 - 1\},$$
$$q_2 \in \{0, 1, \ldots, O_2 - 1\},$$
$$i_{1,2} = [\,i_{1,2,1} \ \cdots \ i_{1,2,v}\,],$$
$$i_{1,2,l} \in \left\{0, 1, \ldots, \binom{N_1N_2}{L} - 1\right\}.$$

In another example (for layer-common $q_1$, $q_2$), the SD basis vectors $$v^{(l)}_{m_1^{(i)},m_2^{(i)}},\ i = 0, 1, \ldots, L-1,\ l = 1, \ldots, v$$

i=0, 1, . . . , L−1, l=1, . . . , v are indicated by PMI components $i_{1,1}$, $i_{1,2}$, where In one example, the $W_1$ has the following structure, i.e., SD basis vectors can be different across two polarizations (polarization-specific) but are the same for each of the layers (layer-common):

$$W_1 = \begin{bmatrix} B_0 & 0 \\ 0 & B_1 \end{bmatrix}, \text{ for } l = 1, \ldots v,$$

where $B_p=[b_{p,0}, b_{p,1}, \ldots, b_{p,L-1}]$ including L SD basis vectors (as columns), and v is the number of layers (i.e., rank).

In one example (for layer-specific $q_1$, $q_2$), the SD basis vectors $$v_{m_1^{(i)},m_2^{(i)},p}, \ i = 0, 1, \ldots, L-1, \ p = 0, 1$$

i=0, 1, . . . , L−1, p=0.1 are indicated by PMI components $i_{1,1,p}$, $i_{1,2,p}$, where $$i_{1,1,p} = [\, q_{1,p} \quad q_{2,p} \,],$$
$$q_{1,p} \in \{0, 1, \ldots, O_1 - 1\},$$
$$q_{2,p} \in \{0, 1, \ldots, O_2 - 1\},$$
$$i_{1,2,p} \in \left\{0, 1, \ldots, \binom{N_1N_2}{L} - 1\right\}.$$

In another example (for layer-specific $q_1$, $q_2$), the SD basis vectors $$v_{m_1^{(i)},m_2^{(i)},p}, \ i = 0, 1, \ldots, L-1, \ p = 0, 1,$$

i=0, 1, . . . , L−1, p=0, 1, are indicated by PMI components $i_{1,1}$, $i_{1,2}$, where $$i_{1,1} = [\, i_{1,1,0} \quad i_{1,1,1} \,],$$
$$i_{1,1,p} = [\, q_{1,p} \quad q_{2,p} \,],$$
$$q_{1,p} \in \{0, 1, \ldots, O_1 - 1\},$$
$$q_{2,p} \in \{0, 1, \ldots, O_2 - 1\},$$
$$i_{1,2} = [\, i_{1,2,0} \quad i_{1,2,1} \,],$$
$$i_{1,2,p} \in \left\{0, 1, \ldots, \binom{N_1N_2}{L} - 1\right\}.$$

In one example (for layer-common $q_1$, $q_2$), the SD basis vectors $$v_{m_1^{(i)},m_2^{(i)},p}, \ i = 0, 1, \ldots, L-1, \ p = 0, 1$$

i=0, 1, . . . , L−1, p=0.1 are indicated by PMI components $i_{1,1}$, $i_{1,2,p}$, where $$i_{1,1} = [\, q_1 \quad q_2 \,],$$
$$q_1 \in \{0,1, \ldots, O_1 - 1\},$$
$$q_2 \in \{0,1, \ldots, O_2 - 1\},$$
$$i_{1,2,p} \in \left\{0,1, \ldots, \binom{N_1N_2}{L} - 1\right\}.$$

In another example (for layer-common $q_1$, $q_2$), the SD basis vectors $$v_{m_1^{(i)},m_2^{(i)},p}, \ i = 0, 1, \ldots, L-1, \ p = 0, 1$$

i=0, 1, . . . , L−1, p=0.1 are indicated by PMI components $i_{1,1}$, $i_{1,2}$, where $$i_{1,1} = [\, q_1 \quad q_2 \,],$$
$$q_1 \in \{0,1, \ldots, O_1 - 1\},$$
$$q_2 \in \{0,1, \ldots, O_2 - 1\},$$
$$i_{1,2} = [\, i_{1,2,0} \quad i_{1,2,1} \,],$$
$$i_{1,2,p} \in \left\{0,1, \ldots, \binom{N_1N_2}{L} - 1\right\}.$$

In one example, the $W_1$ has the following structure, i.e., SD basis vectors can be different across two polarizations (polarization-specific) and can be different across layers (layer-specific):

$$W_1^{(l)} = \begin{bmatrix} B_{l,0} & 0 \\ 0 & B_{l,1} \end{bmatrix}, \text{ for } l = 1, \ldots v,$$

where $B_{l,p}=[b_{l,p,0}, b_{l,p,1}, \ldots, b_{l,p,L-1}]$ including L SD basis vectors (as columns), and v is the number of layers (i.e., rank).

In one example (for layer-specific and polarization-specific $q_1$, $q_2$), the SD basis vectors $$v^{(l)}_{m_1^{(i)},m_2^{(i)},p}, \ i = 0, 1, \ldots, L-1, \ p = 0, 1, \ l = 1, 2, \ldots, v$$

i=0, 1, . . . , L−1, p=0, 1, l=1, 2, . . . , v are indicated by PMI components $i_{1,1,l,p}$, $i_{1,2,l,p}$, where $$i_{1,1,l,p} = [\, q_{1,l,p} \quad q_{2,l,p} \,],$$
$$q_{1,l,p} \in \{0,1, \ldots, O_1 - 1\},$$
$$q_{2,l,p} \in \{0,1, \ldots, O_2 - 1\},$$
$$i_{1,2,l,p} \in \left\{0,1, \ldots, \binom{N_1N_2}{L} - 1\right\}.$$

In another example (for layer-specific and polarization-specific $q_1$, $q_2$), the SD basis vectors $$v^{(l)}_{m_1^{(i)},m_2^{(i)},p},\ i=0,1,\ldots,L-1,\ p=0,1,\ l=1,2,\ldots,v$$

i=0, 1, . . . , L−1, p=0, 1, l=1, 2, . . . , v are indicated by PMI components $i_{1,1}$, $i_{1,2}$, where $$i_{1,1}=[i_{1,1,1}\ \cdots\ i_{1,1,v}],$$
$$i_{1,1,l}=[\,i_{1,1,l,0}\ \ i_{1,1,l,1}\,],$$
$$i_{1,1,l,p}=[q_{1,l,p}q_{2,l,p}],$$
$$q_{1,l,p}\in\{0,1,\ldots,O_1-1\},$$
$$q_{2,l,p}\in\{0,1,\ldots,O_2-1\},$$
$$i_{1,2}=[i_{1,2,1}\ \cdots\ i_{1,2,v}],$$
$$i_{1,2,l}=[\,i_{1,2,l,0}\ \ i_{1,2,l,1}\,],$$
$$i_{1,2,l,p}\in\left\{0,1,\ldots,\binom{N_1N_2}{L}-1\right\}.$$

In one example (for layer-specific but polarization-common $q_1$, $q_2$), the SD basis vectors $$v^{(l)}_{m_1^{(i)},m_2^{(i)},p},\ i=0,1,\ldots,L-1,\ p=0,1,\ l=1,2,\ldots,v$$

i=0, 1, . . . , L−1, p=0, 1, l=1, 2, . . . , v are indicated by PMI components $i_{1,1,l}$, $i_{1,2,l,p}$, where $$i_{1,1,l}=[\,q_{1,l}\ \ q_{2,l}\,],$$
$$q_{1,l}\in\{0,1,\ldots,O_1-1\},$$
$$q_{2,l}\in\{0,1,\ldots,O_2-1\},$$
$$i_{1,2,l,p}\in\left\{0,1,\ldots,\binom{N_1N_2}{L}-1\right\}.$$

In another example (for layer-specific but polarization-common $q_1$, $q_2$), the SD basis vectors $$v^{(l)}_{m_1^{(i)},m_2^{(i)},p},\ i=0,1,\ldots,L-1,\ p=0,1,\ l=1,2,\ldots,v$$

i=0, 1, . . . , L−1, p=0, 1, l=1, 2, . . . , v are indicated by PMI components $i_{1,1}$, $i_{1,2}$, where $$i_{1,1}=[i_{1,1,1}\ \cdots\ i_{1,1,v}],$$
$$i_{1,1,l}=[\,q_{1,l}\ \ q_{2,l}\,],$$
$$q_{1,l}\in\{0,1,\ldots,O_1-1\},$$
$$q_{2,l}\in\{0,1,\ldots,O_2-1\},$$
$$i_{1,2}=[i_{1,2,1}\ \cdots\ i_{1,2,v}],$$
$$i_{1,2,l}=[\,i_{1,2,l,0}\ \ i_{1,2,l,1}\,],$$
$$i_{1,2,l,p}\in\left\{0,1,\ldots,\binom{N_1N_2}{L}-1\right\}.$$

In one example (for polarization-specific but layer-common $q_1$, $q_2$), the SD basis vectors $$v^{(l)}_{m_1^{(i)},m_2^{(i)},p},$$

i=0, 1, . . . , L−1, p=0, 1, l=1, 2, . . . , v are indicated by PMI components $i_{1,1,p}$, $i_{1,2,l,p}$, where $$i_{1,1,p}=[\,q_{1,p}\ \ q_{2,p}\,],$$
$$q_{1,p}\in\{0,1,\ldots,O_1-1\},$$
$$q_{2,p}\in\{0,1,\ldots,O_2-1\},$$
$$i_{1,2,l,p}\in\left\{0,1,\ldots,\binom{N_1N_2}{L}-1\right\}.$$

In another example (for polarization-specific but layer-common $q_1$, $q_2$), the SD basis vectors $$v^{(l)}_{m_1^{(i)},m_2^{(i)},p},$$

i=0, 1, . . . , L−1, p=0, 1, l=1, 2, . . . , v are indicated by PMI components $i_{1,1}$, $i_{1,2}$, where $$i_{1,1}=[\,i_{1,1,0}\ \ i_{1,1,1}\,],$$
$$i_{1,1,p}=[\,q_{1,p}\ \ q_{2,p}\,],$$
$$q_{1,p}\in\{0,1,\ldots,O_1-1\},$$
$$q_{2,p}\in\{0,1,\ldots,O_2-1\},$$
$$i_{1,2}=[i_{1,2,1}\ \cdots\ i_{1,2,v}],$$
$$i_{1,2,l}=[\,i_{1,2,l,0}\ \ i_{1,2,l,1}\,],$$
$$i_{1,2,l,p}\in\left\{0,1,\ldots,\binom{N_1N_2}{L}-1\right\}.$$

In one example (for polarization-common and layer-common $q_1$, $q_2$), the SD basis vectors $$v^{(l)}_{m_1^{(i)},m_2^{(i)},p},$$

i=0, 1, . . . , L−1, p=0, 1, l=1, 2, . . . , v are indicated by PMI components $i_{1,1}$, $i_{1,2,l,p}$, where $$i_{1,1}=[\,q_1\ \ q_2\,],$$
$$q_1\in\{0,1,\ldots,O_1-1\},$$
$$q_2\in\{0,1,\ldots,O_2-1\},$$
$$i_{1,2,l,p}\in\left\{0,1,\ldots,\binom{N_1N_2}{L}-1\right\}.$$

In another example (for polarization-common and layer-common $q_1$, $q_2$), the SD basis vectors $$v^{(l)}_{m_1^{(i)},m_2^{(i)},p},$$

i=0, 1, . . . , L−1, p=0, 1, l=1, 2, . . . , v are indicated by PMI components $i_{1,1}$, $i_{1,2}$, where $$i_{1,1} = [\,q_1 \quad q_2\,],$$
$$q_1 \in \{0,1, \ldots , O_1 - 1\},$$
$$q_2 \in \{0,1, \ldots , O_2 - 1\},$$
$$i_{1,2} = [i_{1,2,1} \ \ldots \ i_{1,2,v}],$$
$$i_{1,2,l} = [\,i_{1,2,l,0} \quad i_{1,2,l,1}\,],$$
$$i_{1,2,l,p} \in \left\{0,1, \ldots , \binom{N_1N_2}{L} - 1\right\}.$$

In one example, a payload of $i_{1,1}$ or $i_{1,1,l}$ or $i_{1,1,p}$ or $i_{1,1,l,p}$ corresponds to $\lceil \log_2 O_1O_2 \rceil$ bits.

In one example, a payload of $i_{1,2}$ or $i_{1,2,l}$ or $i_{1,2,p}$ or $i_{1,2,l,p}$ corresponds to $$\left\lceil \log_2\binom{N_1N_2}{L} \right\rceil$$

For example, when L=1, the payload corresponds to $\lceil \log_2(N_1N_2) \rceil$ bits.

In one embodiment for rank value (v)>1, at least one of the following example is used/configured. Let $$W_1^{(v)} \text{ and } W_2^{(v)}$$

denote that $W_1$ and $W_2$ components for v layers.

In one example, components of $W_1$ and $W_2$ are determined/reported according to each example according to one or more embodiments described herein for layers l=1, . . . , v.

In one example, L=1 or

In one example, L>1 or

In one example, L∈{1, x} where x>1.

In one example, L=1 for each rank v≥1.

In one example, L∈{1, x} for rank 1 and L=1 for each rank v>1.

In one example, L∈{1, x} for rank 1, 2 and L=1 for each rank v>2.

In one example, L∈{1, x} for rank 1, 2, 3, 4 and L=1 for each rank v>4.

In one example, x=2, x=4, or x=6 in the examples herein.

In one example, the rotation factor ($q_1$, $q_2$) are determined/reported common for each of the layers, and L SD basis vectors and components of $W_2$, as described herein, are determined/reported independently for each layer l=1, . . . , v, and $W_2$ is determined/reported for each layer l=1, . . . , v.

In one example, components of $W_1$, as described herein, are determined/reported common for each of the layers, and components of $W_2$, as described herein, are determined/reported independently for each layer l=1, . . . , v, and $W_2$ is determined/reported for each layer l=1, . . . , v.

In one example, components of $W_1$, as described herein, are determined/reported independently for each layer l=1, . . . , v, and one joint $W_2$ across v layers are determined/reported, where the columns of $W_2$ correspond to $W_2$ for v layers.

In one example, the rotation factor ($q_1$, $q_2$) are determined/reported common for each of the layers, L SD basis vectors, as described herein, are determined/reported independently for each layer l=1, . . . , v, and one joint $W_2$ across u layers are determined/reported, where the columns of $W_2$ correspond to $W_2$ for v layers.

In one example, components of $W_1$, as described herein, are determined/reported common for each of the layers, and one joint $W_2$ across u layers are determined/reported, where the columns of $W_2$ correspond to $W_2$ for u layers.

In one embodiment, when the number of layers (rank) v=2, the rank-2 (2-layer) precoding matrix is given by $$W^{(2)}_{i_{1,1},i_{1,2},i_2} = \frac{1}{\sqrt{2P_{CSIRS}}}[U^{(2)}].$$

At least one of the following examples is used/configured regarding $U^{(2)}$.

In one example, $$U^{(2)} = \begin{bmatrix} b & b \\ cb & -cb \end{bmatrix}$$

where $$b = v_{m_1^{(j)},m_2^{(j)}}$$

(precoder structure A1).

In one example, for L=1, the indicator ($i_{1,1}$, $i_{1,2}$) indicates an SD vector b (according to one or more embodiments described herein) and $i_2$ indicates c (in a subband (SB) manner), using an $N_{PSK}$-PSK scheme (according to one or more embodiments described herein).

In one example, for L>1, the indicator ($i_{1,1}$, $i_{1,2}$) indicates L SD vectors B (according to one or more embodiments described herein) and a first part of $i_2$ indicates c (in a SB manner), using an $N_{PSK}$-PSK scheme (according to one or more embodiments described herein), and a second part of $i_2$ indicate an SD vector b out of the L SD vectors (in a SB manner).

In one example, $$U^{(2)} = \begin{bmatrix} b & b \\ c_1b & c_2b \end{bmatrix}$$

where $$b = v_{m_1^{(j)},m_2^{(j)}}$$

and $c_l$, l=1, 2 is a co-phase for layer l (precoder structure A2).

In one example, for L=1, the indicator ($i_{1,1}$, $i_{1,2}$) indicates an SD vector b (according to one or more embodiments described herein) and $i_2$ indicates $c_l$, l=1, 2 (in a SB manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates $c_l$, l=1, 2 (in a SB manner), using an $N_{PSK}$-PSK scheme (according to one or more embodiments described herein), and a second part of $i_2$ indicate an SD vector b out of the L SD vectors (in a SB manner).

In one example, $$U^{(2)} = \begin{bmatrix} b_1 & b_2 \\ cb_1 & -cb_2 \end{bmatrix}$$

where $$b_l = v^{(l)}_{m_1^{(j)}, m_2^{(j)}},$$

l=1, 2 is a DFT vector for layer l (precoder structure A3).

In one example, for L=1, the indicator $(i_{1,1}, i_{1,2})$ indicates an SD vector $b_l$ for l=1, 2 (according to one or more embodiments described herein) and $i_2$ indicates c (in a SB manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates c (in a SB manner), using an $N_{PSK}$-PSK scheme (according to one or more embodiments described herein), and a second part of $i_2$ indicate an SD vector $b_l$ out of the L SD vectors (in a SB manner) for each layer l=1, 2.

In one example, for L>1, the indicator $(i_{1,1}, i_{1,2})$ indicates L SD vectors B (according to one or more embodiments described herein) and a first part of $i_2$ indicates c (in a SB manner), using an $N_{PSK}$-PSK scheme (according to one or more embodiments described herein), and a second part of $i_2$ indicate two SD vectors $b_1$ and $b_2$ out of the L SD vectors (in a SB manner).

In one example, for L>1, the indicator $(i_{1,1}, i_{1,2})$ indicates L SD vectors $B_l$ for each layer l=1, 2 (according to one or more embodiments described herein) and a first part of $i_2$ indicates c (in a SB manner), using an $N_{PSK}$-PSK scheme (according to one or more embodiments described herein), and a second part of $i_2$ indicate an SD vectors $b_l$ out of the L SD vectors (in a SB manner) for each layer l=1, 2.

In one example, $$U^{(2)} = \begin{bmatrix} b_1 & b_2 \\ c_1b_1 & c_2b_2 \end{bmatrix}$$

where $b_l$ and $c_l$ are as described herein (precoder structure A4).

In one example, for L=1, the indicator $(i_{1,1}, i_{1,2})$ indicates an SD vector $b_l$ for l=1, 2 (according to one or more embodiments described herein) and $i_2$ indicates $c_l$ for l=1, 2 (in a SB manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates $c_l$ for l=1, 2 (in a SB manner), using an $N_{PSK}$-PSK scheme (according to one or more embodiments described herein), and a second part of $i_2$ indicate an SD vector $b_l$ out of the L SD vectors (in a SB manner) for each layer l=1, 2.

In one example, for L>1, the indicator $(i_{1,1}, i_{1,2})$ indicates L SD vectors B (according to one or more embodiments described herein) and a first part of $i_2$ indicates $c_l$ for l=1, 2 (in a SB manner), using an $N_{PSK}$-PSK scheme (according to one or more embodiments described herein), and a second part of $i_2$ indicate two SD vectors $b_1$ and $b_2$ out of the L SD vectors (in a SB manner).

In one example, for L>1, the indicator $(i_{1,1}, i_{1,2})$ indicates L SD vectors $B_l$ for each layer l=1, 2 (according to one or more embodiments described herein) and a first part of $i_2$ indicates $c_l$ for l=1, 2 (in a SB manner), using an $N_{PSK}$-PSK scheme (according to one or more embodiments described herein), and a second part of $i_2$ indicate an SD vectors $b_l$ out of the L SD vectors (in a SB manner) for each layer l=1, 2.

In one example, $$c_l = e^{\frac{j2\pi\phi_l}{N_{PSK}}}$$

where $\phi_l \in \{0, 1, \ldots, N_{PSK}-1\}$, and $N_{PSK}=2$ (for BPSK), $N_{PSK}=4$ (for QPSK), 8 (for 8PSK), or 16 (for 16PSK). In one example, $N_{PSK}$ is fixed, e.g. $N_{PSK}=4$, or $N_{PSK}=2$. In one example, $N_{PSK}$ is configured via higher layer, e.g. from {2, 4}. In one example, UE (e.g., the UE 116) determines/selects which $N_{PSK}$ is used and reports it as a part of CSI. In one example, the range of $\phi_1$ is a subset of $\{0, 1, \ldots, N_{PSK}-1\}$. For example, $$\phi_l \in \left\{0, 1, \ldots, \frac{N_{PSK}}{2} - 1\right\}.$$

In one example, a payload for indicating $c_l$ corresponds to $\log_2 N_{PSK}$ bits or $\lceil \log_2 N_{PSK} \rceil$ bits.

In another example, $$\phi_l \in \left\{0, 1, \ldots, \frac{N_{PSK}}{4} - 1\right\}.$$

In one example, $$c_l = e^{\frac{j2\pi\phi_l}{xN_{PSK}}},$$

where e.g., x=2. In one example, x=4.

In one example, $N_{PSK}$ (or the number of cophase values) depends on rank value (i.e., RI or rank value v). In one example, $N_{PSK}$ can be according to at least one of the following examples.

In one example, $N_{PSK}=n_{psk,1}$ for v≤a and $N_{PSK}=n_{psk,2}$ for v>a.

In one example, $N_{PSK}=n_{psk,1}$ for v<a and $N_{PSK}=n_{psk,2}$ for v≥a.

In one example, $N_{PSK}=n_{psk,1}$ for v∈A and $N_{PSK}=n_{psk,2}$ for v∈B.

In one example, $N_{psk}=n_{psk,1}$ for v=1 and $N_{PSK}=n_{psk,2}$ for v>1.

In one example, $N_{PSK}=n_{psk,1}$ for l=1, . . . , v.

In one example, a=4. In one example, a=5. In one example, a=1. In one example, a=2. In one example, a=3. In one example, a=6. In one example, a=7. In one example, a=8.

In one example, $n_{psk,1}>N_{psk,2}$. In one example, $(n_{psk,1}, n_{psk,2})=(4,2)$.

In one example, $n_{psk,1}<n_{psk,2}$. In one example, $(n_{psk,1}, n_{psk,2})=(2,4)$.

In one example, $n_{psk,1}=n_{psk,2}$. In one example, $(n_{psk,1}, n_{psk,2})=(4,4)$. In one example, $(n_{psk,1}, n_{psk,2})=(2,2)$.

In one example, A includes 1. In one example, A includes 2. In one example, A includes 1 and 2.

In one example, B includes 3. In one example, B includes 4. In one example, B includes 3 and 4.

In one example, $$c_l = p_l e^{\frac{j2\pi\phi_l}{N_{PSK}}}$$

where $p_l$ is an amplitude or power level. In this disclosure, coefficient $c_l$ can be reported in a WB manner or in a SB manner.

In one embodiment, when the number of layers (rank) v=3, the rank-3 (3-layer) precoding matrix is given by $$W^{(3)}_{i_{1,1},i_{1,2},i_2} = \frac{1}{\sqrt{3P_{CSIRS}}}[U^{(3)}].$$

At least one of the following examples is used/configured regarding $U^{(2)}$.

In one example, $$U^{(3)} = \begin{bmatrix} b & b & b \\ cb & -cb & -cb \end{bmatrix} \text{ or } U^{(3)} = \begin{bmatrix} b & b & b \\ cb & cb & -cb \end{bmatrix}$$

where b=

$$v_{m_1^{(j)},m_2^{(j)}}$$

(precoder structure A1).

In one example, for L=1, the indicator $(i_{1,1}, i_{1,2})$ indicates an SD vector b (according to one or more embodiments described herein) and $i_2$ indicates c (in a subband (SB) manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates c (in a SB manner), using an $N_{PSK}$-PSK scheme (according to one or more embodiments described herein), and a second part of $i_2$ indicate an SD vector b out of the L SD vectors (in a SB manner).

In one example, $$U^{(3)} = \begin{bmatrix} b & b & b \\ c_1 b & c_2 b & c_3 b \end{bmatrix}$$

where $$b = v_{m_1^{(j)},m_2^{(j)}}$$

and $c_l$, l=1, 2, 3 is a co-phase for layer l (precoder structure A2).

In one example, for L=1, the indicator $(i_{1,1}, i_{1,2})$ indicates an SD vector b (according to one or more embodiments described herein) and $i_2$ indicates $c_l$, l=1, 2, 3 (in a SB manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates $c_l$, l=1, 2, 3 (in a SB manner), using an $N_{PSK}$-PSK scheme (according to one or more embodiments described herein), and a second part of $i_2$ indicate an SD vector b out of the L SD vectors (in a SB manner).

In one example, $$U^{(3)} = \begin{bmatrix} b_1 & b_2 & b_3 \\ cb_1 & -cb_2 & -cb_3 \end{bmatrix} \text{ or } U^{(3)} = \begin{bmatrix} b_1 & b_2 & b_3 \\ cb_1 & cb_2 & -cb_3 \end{bmatrix}$$

where $b_l$=

$$v^{(l)}_{m_1^{(j)},m_2^{(j)}},$$

l=1, 2, 3 is a DFT vector for layer l (precoder structure A3).

In one example, for L=1, the indicator $(i_{1,1}, i_{1,2})$ indicates an SD vector $b_l$ for l=1, 2, 3 (according to one or more embodiments described herein) and $i_2$ indicates c (in a SB manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates c (in a SB manner), using an $N_{PSK}$-PSK scheme (according to one or more embodiments described herein), and a second part of $i_2$ indicate an SD vector $b_l$ out of the L SD vectors (in a SB manner) for each layer l=1, 2, 3.

In one example, for L>1, the indicator $(i_{1,1}, i_{1,2})$ indicates L SD vectors B (according to one or more embodiments described herein) and a first part of $i_2$ indicates c (in a SB manner), using an $N_{PSK}$-PSK scheme (according to one or more embodiments described herein), and a second part of $i_2$ indicate two SD vectors $b_1$ and $b_2$ out of the L SD vectors (in a SB manner).

In one example, for L>1, the indicator $(i_{1,1}, i_{1,2})$ indicates L SD vectors $B_l$ for each layer l=1, 2, 3 (according to one or more embodiments described herein) and a first part of $i_2$ indicates c (in a SB manner), using an $N_{PSK}$-PSK scheme (according to one or more embodiments described herein), and a second part of $i_2$ indicate an SD vectors $b_l$ out of the L SD vectors (in a SB manner) for each layer l=1, 2, 3.

In one example, $$U^{(3)} = \begin{bmatrix} b_1 & b_2 & b_3 \\ c_1 b_1 & c_2 b_2 & c_3 b_3 \end{bmatrix}$$

where $b_l$ and $c_l$ are as described herein (precoder structure A4).

In one example, for L=1, the indicator $(i_{1,1}, i_{1,2})$ indicates an SD vector $b_l$ for l=1, 2, 3 (according to one or more embodiments described herein) and $i_2$ indicates $c_l$ for l=1, 2, 3 (in a SB manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates $c_l$ for l=1, 2, 3 (in a SB manner), using an $N_{PSK}$-PSK scheme (according to one or more embodiments described herein), and a second part of $i_2$ indicate an SD vector $b_l$ out of the L SD vectors (in a SB manner) for each layer l=1, 2, 3.

In one example, for L>1, the indicator $(i_{1,1}, i_{1,2})$ indicates L SD vectors B (according to one or more embodiments described herein) and a first part of $i_2$ indicates $c_l$ for l=1, 2, 3 (in a SB manner), using an $N_{PSK}$-PSK scheme (according to one or more embodiments described herein), and a second part of $i_2$ indicate two SD vectors $b_1$ and $b_2$ out of the L SD vectors (in a SB manner).

In one example, for L>1, the indicator $(i_{1,1}, i_{1,2})$ indicates L SD vectors $B_l$ for each layer l=1, 2, 3 (according to one or more embodiments described herein) and a first part of $i_2$ indicates $c_l$ for l=1, 2, 3 (in a SB manner), using an $N_{PSK}$-PSK scheme (according to one or more embodiments described herein), and a second part of $i_2$ indicate an SD vectors $b_l$ out of the L SD vectors (in a SB manner) for each layer l=1, 2, 3.

In one embodiment, when the number of layers (rank) v=4, the rank-4 (4-layer) precoding matrix is given by $$W^{(3)}_{i_{1,1},i_{1,2},i_2} = \frac{1}{\sqrt{4P_{CSIRS}}}\left[U^{(4)}\right].$$

At least one of the following examples is used/configured regarding $U^{(2)}$.

In one example, $$U^{(4)} = \begin{bmatrix} b & b & b & b \\ cb & -cb & cb & -cb \end{bmatrix} \text{ or } U^{(4)} = \begin{bmatrix} b & b & b & b \\ cb & cb & -cb & -cb \end{bmatrix}$$

where $$b = v_{m_1^{(j)}, m_2^{(j)}}$$

(precoder structure A1).

In one example, for L=1, the indicator $(i_{1,1}, i_{1,2})$ indicates an SD vector b (according to one or more embodiments described herein) and $i_2$ indicates c (in a subband (SB) manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates c (in a SB manner), using an $N_{PSK}$-PSK scheme (according to one or more embodiments described herein), and a second part of $i_2$ indicate an SD vector b out of the L SD vectors (in a SB manner).

In one example, $$U^{(4)} = \begin{bmatrix} b & b & b & b \\ c_1 b & c_2 b & c_3 b & c_4 b \end{bmatrix}$$

where $$b = v_{m_1^{(j)}, m_2^{(j)}}$$

and $c_l$, l=1, 2, 3, 4 is a co-phase for layer l (precoder structure A2).

In one example, for L=1, the indicator $(i_{1,1}, i_{1,2})$ indicates an SD vector b (according to one or more embodiments described herein) and $i_2$ indicates $c_l$, l=1, 2, 3, 4 (in a SB manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates $c_l$, l=1, 2, 3, 4 (in a SB manner), using an $N_{PSK}$-PSK scheme (according to one or more embodiments described herein), and a second part of $i_2$ indicate an SD vector b out of the L SD vectors (in a SB manner).

In one example, $$U^{(4)} = \begin{bmatrix} b_1 & b_2 & b_3 & b_4 \\ cb_1 & -cb_2 & cb_3 & -cb_4 \end{bmatrix} \text{ or } U^{(4)} = \begin{bmatrix} b_1 & b_2 & b_3 & b_4 \\ cb_1 & cb_2 & -cb_3 & -cb_4 \end{bmatrix}$$

where $$b = v^{(l)}_{m_1^{(j)}, m_2^{(j)}},$$

l=1, 2, 3, 4 is a DFT vector for layer l (precoder structure A3).

In one example, for L=1, the indicator $(i_{1,1}, i_{1,2})$ indicates an SD vector $b_l$ for l=1, 2, 3, 4 (according to one or more embodiments described herein) and $i_2$ indicates c (in a SB manner), using an $N_{PSK}$-PSK scheme (according to one or more embodiments described herein).

In one example, for L>1, the indicator $(i_{1,1}, i_{1,2})$ indicates L SD vectors B (according to one or more embodiments described herein) and a first part of $i_2$ indicates c (in a SB manner), using an $N_{PSK}$-PSK scheme (according to one or more embodiments described herein), and a second part of $i_2$ indicate an SD vector $b_l$ out of the L SD vectors (in a SB manner) for each layer l=1, 2, 3, 4.

In one example, for L>1, the indicator $(i_{1,1}, i_{1,2})$ indicates L SD vectors B (according to one or more embodiments described herein) and a first part of $i_2$ indicates c (in a SB manner), using an $N_{PSK}$-PSK scheme (according to one or more embodiments described herein), and a second part of $i_2$ indicate two SD vectors $b_1$ and $b_2$ out of the L SD vectors (in a SB manner).

In one example, for L>1, the indicator $(i_{1,1}, i_{1,2})$ indicates L SD vectors $B_l$ for each layer l=1, 2, 3, 4 (according to one or more embodiments described herein) and a first part of $i_2$ indicates c (in a SB manner), using an $N_{PSK}$-PSK scheme (according to one or more embodiments described herein), and a second part of $i_2$ indicate an SD vectors $b_l$ out of the L SD vectors (in a SB manner) for each layer l=1, 2, 3, 4.

In one example, $$U^{(4)} = \begin{bmatrix} b_1 & b_2 & b_3 & b_4 \\ c_1 b_1 & c_2 b_2 & c_3 b_3 & c_4 b_4 \end{bmatrix}$$

where $b_l$ and $c_l$ are as described herein (precoder structure A4).

- In one example, for L=1, the indicator ($i_{1,1}$, $i_{1,2}$) indicates an SD vector $b_l$ for l=1, 2, 3, 4 (according to one or more embodiments described herein) and $i_2$ indicates $c_l$ for l=1, 2, 3, 4 (in a SB manner), using an $N_{PSK}$-PSK scheme (according to one or more embodiments described herein).
- In one example, for L>1, the indicator ($i_{1,1}$, $i_{1,2}$) indicates L SD vectors B (according to one or more embodiments described herein) and a first part of $i_2$ indicates c for l=1, 2, 3, 4 (in a SB manner), using an $N_{PSK}$-PSK scheme (according to one or more embodiments described herein), and a second part of $i_2$ indicate an SD vector $b_l$ out of the L SD vectors (in a SB manner) for each layer l=1, 2, 3, 4.
- In one example, for L>1, the indicator ($i_{1,1}$, $i_{1,2}$) indicates L SD vectors B (according to one or more embodiments described herein) and a first part of $i_2$ indicates $c_l$ for l=1, 2, 3, 4 (in a SB manner), using an $N_{PSK}$-PSK scheme (according to one or more embodiments described herein), and a second part of $i_2$ indicate two SD vectors $b_1$ and $b_2$ out of the L SD vectors (in a SB manner).
- In one example, for L>1, the indicator ($i_{1,1}$, $i_{1,2}$) indicates L SD vectors $B_l$ for each layer l=1, 2, 3, 4 (according to one or more embodiments described herein) and a first part of $i_2$ indicates $c_1$ for l=1, 2, 3, 4 (in a SB manner), using an $N_{PSK}$-PSK scheme (according to one or more embodiments described herein), and a second part of $i_2$ indicate an SD vectors $b_l$ out of the L SD vectors (in a SB manner) for each layer l=1, 2, 3, 4.

In one embodiment, when the number of layers (rank) v>4, the rank-v (v-layer) precoding matrix is given by $$W^{(v)}_{i_{1,1},i_{1,2},i_2} = \frac{1}{\sqrt{vP_{CSIRS}}}\left[U^{(v)}\right].$$

In one example, $$U^{(v)} = \begin{bmatrix} b & b & \ldots & b \\ c_1 b & c_2 b & \ldots & c_v b \end{bmatrix}$$

where $$b = v_{m_1^{(j)}, m_2^{(j)}}$$

and $c_l$, l=1, 2, 3, . . . , v is a co-phase for layer l (precoder structure A2).

- In one example, for L=1, the indicator ($i_{1,1}$, $i_{1,2}$) indicates an SD vector b (according to one or more embodiments described herein) and $i_2$ indicates $c_l$, l=1, 2, 3, . . . , v (in a SB manner), using an $N_{PSK}$-PSK scheme (according to one or more embodiments described herein).
- In one example, for L>1, the indicator ($i_{1,1}$, $i_{1,2}$) indicates L SD vectors B (according to one or more embodiments described herein) and a first part of $i_2$ indicates $c_l$, l=1, 2, 3, . . . , v (in a SB manner), using an $N_{PSK}$-PSK scheme (according to one or more embodiments described herein), and a second part of $i_2$ indicate an SD vector b out of the L SD vectors (in a SB manner).

In one example, $$U^{(v)} = \begin{bmatrix} b_1 & b_2 & \ldots & b_v \\ c_1 b_1 & c_2 b_2 & \ldots & c_v b_v \end{bmatrix}$$

where $b_l$ and $c_l$ are as described herein (precoder structure A4).

- In one example, for L=1, the indicator ($i_{1,1}$, $i_{1,2}$) indicates an SD vector $b_l$ for l=1, 2, 3, . . . , v (according to one or more embodiments described herein) and $i_2$ indicates $c_l$ for l=1, 2, 3, . . . , v (in a SB manner), using an $N_{PSK}$-PSK scheme (according to one or more embodiments described herein).
- In one example, for L>1, the indicator ($i_{1,1}$, $i_{1,2}$) indicates L SD vectors B (according to one or more embodiments described herein) and a first part of $i_2$ indicates $c_l$ for l=1, 2, 3, . . . , v (in a SB manner), using an $N_{PSK}$-PSK scheme (according to one or more embodiments described herein), and a second part of $i_2$ indicate an SD vector $b_l$ out of the L SD vectors (in a SB manner) for each layer l=1, 2, 3, . . . v.
- In one example, for L>1, the indicator ($i_{1,1}$, $i_{1,2}$) indicates L SD vectors B (according to one or more embodiments described herein) and a first part of $i_2$ indicates $c_l$ for l=1, 2, 3, . . . , v (in a SB manner), using an $N_{PSK}$-PSK scheme (according to one or more embodiments described herein), and a second part of $i_2$ indicate two SD vectors $b_1$ and $b_2$ out of the L SD vectors (in a SB manner).
- In one example, for L>1, the indicator ($i_{1,1}$, $i_{1,2}$) indicates L SD vectors $B_l$ for each layer l=1, 2, 3, . . . v (according to one or more embodiments described herein) and a first part of $i_2$ indicates $c_l$ for l=1, 2, 3, . . . , v (in a SB manner), using an $N_{PSK}$-PSK scheme (according to one or more embodiments described herein), and a second part of $i_2$ indicate an SD vectors $b_l$ out of the L SD vectors (in a SB manner) for each layer l=1, 2, 3, . . . , v.

In one embodiment, a UE can be configured with CSI reporting with a codebook described in this disclosure under a restriction.

In one example, the UE can be configured with CSI reporting with a codebook described in this disclosure when a total number of CSI-RS ports $P_{CSI\text{-}RS,total}$ across CSI-RS resources is greater than (or equal to) t. In one example, t=32. In one example, t=16. In one example, t=8. In one example, t=4.

For example, for $P_{CSI\text{-}RS,total} \le t$, the UE can be configured with CSI reporting with a typical codebook.

In one embodiment, an indicator(s) to indicate which layers share same (or different) SD basis vector(s) is included in CSI part 1, and SD basis vector indicator(s) (e.g., $i_{1,2}$ or $i_{1,2,l}$) for indicating (only) different SD vectors are included in CSI part 2.

In one example, a bitmap indicator is used to indicate which layers share the same (or different) SD basis vector(s).

- In one example, the bitmap indicator is with RImax bits, where RImax is a maximum RI value among RI values that are allowed to select and report. For example, the values of '1' in the bitmap indicator are indicating layers that are associated with the same SD basis vectors. For example, when RImax=4 and the bitmap indicator indicates 0101, the second and the four layers (if most significant bit (MSB) to least significant bit (LSB)=$1^{st}$ to $4^{th}$ layers) have a same SD basis vector. In another example, when RImax=4 and the bitmap indicator indicates 0101, the first and the third layers (if LSB to MSB=$1^{st}$ to $4^{th}$ layers) have a same SD basis vector.

In one example, SD basis vector indicator(s) for layers that are associated with different SD vectors are included in CSI Part 2. For example, when RImax=4 and the first layer and third layer are indicated to have a same SD vector via the indicator in CSI Part 1, only one SD basis vector indicator is included for the both layers in CSI part 2 and each SD basis vector indicator is included for each of the second and fourth layers in CSI Part 2.

In one sub-embodiment, cophase (or coefficient) indicator(s) (e.g., $i_2$ or $i_{2,l}$) for layers that are associated with a same SD vector(s) has a smaller size of payload than that of cophase indicators for the other layers, and the cophase indicators are included in CSI part 2.

In one example, cophase (or coefficient) indicator(s) (e.g., $i_2$ or $i_{2,l}$) for layers that are associated with a same SD vector(s) is a BPSK indicator with 1 bit, and cophase indicators for the other layers are a QPSK indicator with 2 bits.

In one example, an indicator X to indicate which layers share same (or different) SD basis vectors, which is included in CSI part 1, can be described as follows.

For RImax=4, when RI=4 is selected, there are 15 possibilities for indicating which SD basis vectors are same or different among four SD basis vectors, as shown in the following table. For i≠j, the SD vectors corresponding to $\sigma_i$ and $\sigma_j$ are different, and for i=j, the SD vectors corresponding to $\sigma_i$ and $\sigma_j$ are the same. For example, for S5, ($\sigma_1$, $\sigma_2$, $\sigma_2$, $\sigma_3$) means that the second (layer's) and third (layer's) SD basis vectors are the same, and the first (layer's) and the second (layer's) and the fourth (layer's) SD vectors are different. In the case of S5, for example, only three SD basis vectors for $\sigma_1$, $\sigma_2$, $\sigma_3$ are indicated via an indicator in CSI part 2.

TABLE 4

| | Selected SD vectors | Index |
|---|---|---|
| All four SD vectors are different, i.e., (1, 1, 1, 1) | ($\sigma_1$, $\sigma_2$, $\sigma_3$, $\sigma_4$) | S1 |
| Only two SD vectors are the same, i.e. (2, 1, 1) | ($\sigma_1$, $\sigma_1$, $\sigma_2$, $\sigma_3$) | S2 |
| | ($\sigma_1$, $\sigma_2$, $\sigma_1$, $\sigma_3$) | S3 |
| | ($\sigma_1$, $\sigma_2$, $\sigma_3$, $\sigma_1$) | S4 |
| | ($\sigma_1$, $\sigma_2$, $\sigma_2$, $\sigma_3$) | S5 |
| | ($\sigma_1$, $\sigma_2$, $\sigma_3$, $\sigma_2$) | S6 |
| | ($\sigma_1$, $\sigma_2$, $\sigma_3$, $\sigma_3$) | S7 |
| Two SD vectors are the same and the other two SD vectors are the same, i.e. (2, 2) | ($\sigma_1$, $\sigma_1$, $\sigma_2$, $\sigma_2$) | S8 |
| | ($\sigma_1$, $\sigma_2$, $\sigma_1$, $\sigma_2$) | S9 |
| | ($\sigma_1$, $\sigma_2$, $\sigma_2$, $\sigma_1$) | S1σ |
| Only three SD vectors are the same, i.e., (3, 1) | ($\sigma_1$, $\sigma_1$, $\sigma_1$, $\sigma_2$) | S11 |
| | ($\sigma_1$, $\sigma_1$, $\sigma_2$, $\sigma_1$) | S12 |
| | ($\sigma_1$, $\sigma_2$, $\sigma_1$, $\sigma_1$) | S13 |
| | ($\sigma_1$, $\sigma_2$, $\sigma_2$, $\sigma_2$) | S14 |
| All four SD vectors are the same, i.e., (4) | ($\sigma_1$, $\sigma_1$, $\sigma_1$, $\sigma_1$) | S15 |

In one example, the indicator X includes codepoints corresponding to S1, S2, S3, . . . , and S15.

In one example, the indicator X includes codepoints corresponding to S1, S2, S3, . . . , and S14.

In one example, the indicator X includes codepoints corresponding to S1, S2, S3, . . . , and S10.

In one example, the indicator X includes codepoints corresponding to S1, S2, S3, . . . , and S7.

In one example, the indicator X includes codepoints corresponding to S1, S8, S9, and S10.

In one example, regardless of that there are duplicated SD basis vectors, QPSK (2-bit) (or other bits) cophase indicator (e.g., $i_{2,l}$) is used for each layer l.

In one example, QPSK (2-bit) (or other bits) cophase indicator (e.g., $i_{2,l}$) is used for different SD basis vectors and an additional 1-bit cophase indicator for each set of same SD basis vectors. For example, for the case of S2, 2-bit cophase indicator is used for the three different SD basis vectors $\sigma_1$, $\sigma_2$, $\sigma_3$, and an 1-bit additional cophase indicator for the same SD vector $\sigma_1$ for the first and second layers is used (to satisfy orthogonal across the layers). In another example, for the case of S8, 2-bits cophase indicator is used for the two different SD basis vectors $\sigma_1$, $\sigma_2$, and an 1-bit additional cophase indicator for the same SD vector $\sigma_1$ for the first and second layers is used (to satisfy orthogonal across the layers) and an 1-bit additional cophase indicator for the same SD vector $\sigma_2$ for the third and fourth layers is used (to satisfy orthogonal across the layers).

When RI=3 is selected, there are 5 possibilities for indicating which SD basis vectors are same or different among three SD basis vectors, as shown in the following table.

TABLE 5

| | Selected SD vectors | Index |
|---|---|---|
| All three SD vectors are different, i.e., (1, 1, 1) | ($\sigma_1$, $\sigma_2$, $\sigma_3$) | K1 |
| Only two SD vectors are the same, i.e. (2, 1) | ($\sigma_1$, $\sigma_1$, $\sigma_2$) | K2 |
| | ($\sigma_1$, $\sigma_2$, $\sigma_1$) | K3 |
| | ($\sigma_1$, $\sigma_2$, $\sigma_2$) | K4 |
| All three SD vectors are the same, i.e., (3) | ($\sigma_1$, $\sigma_1$, $\sigma_1$) | K5 |

In one example, the indicator X includes codepoints corresponding to K1, K2, K3, K4, and K5.

In one example, the indicator X includes codepoints corresponding to K1, K2, K3, and K4.

In one example, the indicator X includes codepoints corresponding to K1.

In one example, the indicator X does not include codepoints corresponding to K1, K2, K3, K4, and K5.

In one example, regardless of that there are duplicated SD basis vectors, QPSK (2-bit) (or other bits) cophase indicator (e.g., $i_{2,l}$) is used for each layer l.

In one example, QPSK (2-bit) (or other bits) cophase indicator (e.g., $i_{2,l}$) is used for different SD basis vectors and an additional 1-bit cophase indicator for each set of same SD basis vectors. For example, for the case of K2, 2-bit cophase indicator is used for the two different SD basis vectors $\sigma_1$, $\sigma_2$, and an 1-bit additional cophase indicator for the same SD vector $\sigma_1$ for the first and second layers is used (to satisfy orthogonal across the layers).

When RI=2 is selected, there are 2 possibilities for indicating which SD basis vectors are same or different among two SD basis vectors, as shown in the following table.

TABLE 6

| | Selected SD vectors | Index |
|---|---|---|
| Two SD vectors are different, i.e., (1, 1) | $(\sigma_1, \sigma_2)$ | M1 |
| Two SD vectors are the same, i.e. (2) | $(\sigma_1, \sigma_1)$ | M2 |

In one example, the indicator X includes codepoints corresponding to $M_1$ and $M_2$.

In one example, the indicator X includes codepoints corresponding to $M_1$.

In one example, the indicator X does not include codepoints corresponding to M1 and $M_2$.

In one example, regardless of that there are duplicated SD basis vectors, QPSK (2-bit) (or other bits) cophase indicator (e.g., $i_{2,l}$) is used for each layer l.

In one example, QPSK (2-bit) (or other bits) cophase indicator (e.g., $i_{2,l}$) is used for different SD basis vectors and an additional 1-bit cophase indicator for each set of same SD basis vectors. For example, for the case of M2, 2-bit cophase indicator is used for the one SD basis vectors $\sigma_1$, and an 1-bit additional cophase indicator for the same SD vector $\sigma_1$ for the first and second layers is used (to satisfy orthogonal across the layers).

In one example, the indicator X includes codepoints corresponding to the indices described in any combination of the examples shown herein. For example, the indicator X includes S1, S2, S3, . . . , S10, K1, K2, K3, K4, M1, and M2.

In one embodiment, SD basis vector indicator(s) for layers l=1, . . . , v are included in CSI part 2, and cophase (or coefficient) indicator(s) for layers l=1, . . . , v are included in CSI part 2.

Figure 19:
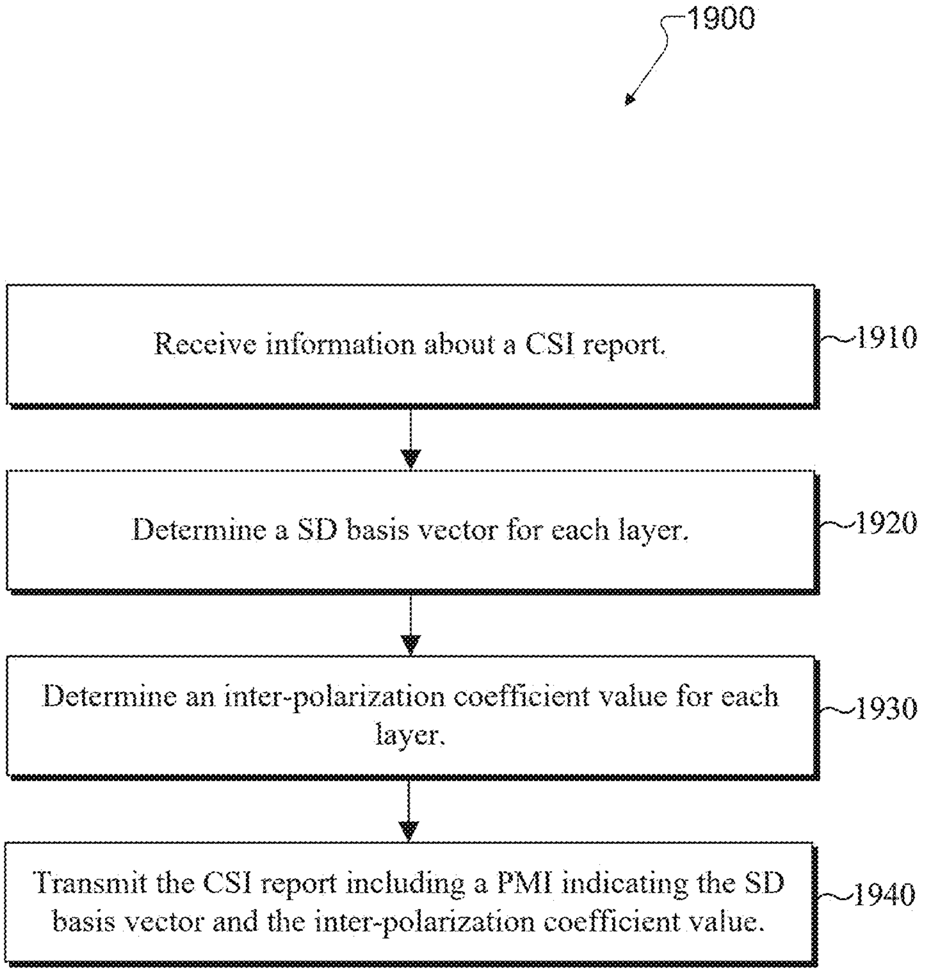
FIG. 19 illustrates an example method performed by a UE in a wireless communication system according to embodiments of the present disclosure.

FIG. 19 illustrates an example method 1900 performed by a UE in a wireless communication system according to embodiments of the present disclosure. The method 1900 of FIG. 19 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1900 is for illustration only and other embodiments can be used without departing from the scope of the present disclosure.

The method begins with the UE receiving information about a CSI report (1910). For example, in 1910, the information indicates an antenna port group.

The UE then determines a SD basis vector for each layer (1920). For example, in 1920, the determination is based on the information and the SD basis vector $b_l$ is determined for each layer l=1, 2 . . . , v. The UE then determines an inter-polarization coefficient value for each layer (1930). For example, in 1930, the determination is based on the information and the inter-polarization coefficient value $c_l$ is determined for each layer l=1, 2 . . . , v.

The UE then transmits the CSI report including a PMI (1940). For example, in 1940, the PMI indicates the SD basis vector and the inter-polarization coefficient value.

In various embodiments, a precoder matrix indicated by the PMI corresponds to $$W = \frac{1}{\sqrt{vP_{CSI-RS}}}\begin{bmatrix} b_1 & b_2 & \dots & b_v \\ c_1b_1 & c_2b_2 & \dots & c_vb_v \end{bmatrix},$$

where $P_{CSI-RS}$ corresponds to a number of antenna ports associated with the antenna port group.

In various embodiments, the antenna port group corresponds to a CSI-RS resource or K CSI-RS resources, where K>1.

In various embodiments, the SD basis vector $b_l$ is a 2D DFT vector, expressed as $$v_{k_l,m_l} = \begin{bmatrix} u_{m_l} & e^{j\frac{2\pi k_l}{O_1N_1}}u_{m_l} & \dots & e^{j\frac{2\pi k_l(N_1-1)}{O_1N_1}}u_{m_l} \end{bmatrix}^T,$$
$$u_{m_l} = \begin{bmatrix} 1 & e^{j\frac{2\pi m_l}{O_2N_2}} & \dots & e^{j\frac{2\pi m_l(N_2-1)}{O_2N_2}} \end{bmatrix}$$

where $N_1$ and $N_2$ are numbers of antenna ports in a first dimension and a second dimension of the antenna port group, respectively; $O_1$ and $O_2$ are values of oversampling factors for the first and second dimensions, respectively; and $k_l \in \{0, 1, \dots, O_1N_1-1\}$, and $m_l \in \{0, 1, \dots, O_2N_2-1\}$.

In various embodiments, $k_l$ and $m_l$ are indicated by a layer-specific indicator $i_{1,1,l}$ and a layer-specific indicator $i_{1,2,l}$, where: $i_{1,1,l}$ indicates $q_{1,l} \in \{0, 1, \dots, O_1-1\}$ and $q_{2,l} \in \{0, 1, \dots, O_2-1\}$, $i_{1,2,l}$ indicates a value in $\{0, 1, \dots, N_1N_2-1\}$, which corresponds to $n_{1,l} \in \{0, 1, \dots, N_1-1\}$ and $n_{2,l} \in \{0, 1, \dots, N_2-1\}$, and $k_l$ and $m_l$ are represented by $k_l=O_1n_{1,l}+q_{1,l}$ and $m_l=O_2n_{2,l}+q_{2,l}$ for layer l=1, 2 . . . , v.

In various embodiments, $k_l$ and $m_l$ are indicated by a layer-common indicator $i_{1,1}$ and a layer-specific indicator $i_{1,2,l}$, where: $i_{1,1}$ indicates $q_1 \in \{0, 1, \dots, O_1-1\}$ and $q_2 \in \{0, 1, \dots, O_2-1\}$, $i_{1,2,l}$ indicates a value in $\{0, 1, \dots, N_1N_2-1\}$, which corresponds to $n_{1,l} \in \{0, 1, \dots, N_1-1\}$ and $n_{2,l} \in \{0, 1, \dots, N_2-1\}$, and $k_l$ and $m_l$ are represented by $k_l=O_1n_{1,l}+q_1$ and $m_l=O_2n_{2,l}+q_2$ for layer l=1, 2 . . . , v. In various embodiments, payloads of the layer-common indicator $i_{1,1}$ and the layer-specific indicator $i_{1,2,l}$ correspond to $\lceil \log_2 O_1O_2 \rceil$ bits and $\lceil \log_2 N_1N_2 \rceil$ bits, respectively.

In various embodiments, the UE further determines an indicator $i_{2,l}$ per sub-band or per wideband, where $i_{2,l} \in \{0, 1, \dots, N_{PSK}-1\}$, and $$c_l = e^{\frac{j2\pi i_{2,l}}{N_{PSK}}},$$

and $N_{PSK}$ is a non-zero, integer value, and the inter-polarization co-phasing value $c_l$ is indicated by the indicator.

Any of the above variation embodiments can be utilized independently or in combination with at least one other variation embodiment. The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE) comprising:

a transceiver configured to receive information about a channel state information (CSI) report, the information indicating an antenna port group; and a processor operably coupled to the transceiver, the processor configured to:

determine, based on the information, a spatial domain (SD) basis vector $b_l$ for each layer l=1, 2 . . . , v; and determine, based on the information, an inter-polarization coefficient value $c_l$ for each layer l=1, 2 . . . , v, where v is a rank value, wherein the transceiver is further configured to transmit the CSI report including a precoding matrix indicator (PMI), wherein the PMI indicates the SD basis vector and the inter-polarization coefficient value.

2. The UE of claim 1, wherein a precoder matrix indicated by the PMI corresponds to $$W = \frac{1}{\sqrt{vP_{CSI-RS}}}\begin{bmatrix} b_1 & b_2 & \dots & b_v \\ c_1b_1 & c_2b_2 & \dots & c_vb_v \end{bmatrix},$$

where $P_{CSI-RS}$ corresponds to a number of antenna ports associated with the antenna port group.

3. The UE of claim 1, wherein the antenna port group corresponds to a CSI reference signal (CSI-RS) resource or K CSI-RS resources, where K>1.

4. The UE of claim 1, wherein the SD basis vector $b_l$ is a 2D Discrete Fourier Transform (DFT) vector, expressed as:

$$v_{k_l,m_l} = \begin{bmatrix} u_{m_l} & e^{j\frac{2\pi k_l}{O_1N_1}}u_{m_l} & \dots & e^{j\frac{2\pi k_l(N_1-1)}{O_1N_1}}u_{m_l} \end{bmatrix}^T,$$
$$u_{m_l} = \begin{bmatrix} 1 & e^{j\frac{2\pi m_l}{O_2N_2}} & \dots & e^{j\frac{2\pi m_l(N_2-1)}{O_2N_2}} \end{bmatrix}$$

where:

$N_1$ and $N_2$ are numbers of antenna ports in a first dimension and a second dimension of the antenna port group, respectively;

$O_1$ and $O_2$ are values of oversampling factors for the first and second dimensions, respectively; and $k_l \in \{0, 1, \dots, O_1N_1-1\}$, and $m_l \in \{0, 1, \dots, O_2N_2-1\}$.

5. The UE of claim 4, wherein $k_l$ and $m_l$ are indicated by a layer-specific indicator $i_{1,1,l}$ and a layer-specific indicator $i_{1,2,l}$, where:

$i_{1,1,l}$ indicates $q_{1,l} \in \{0, 1, \dots, O_1-1\}$ and $q_{2,l} \in \{0, 1, \dots, O_2-1\}$, $i_{1,2,l}$ indicates a value in $\{0, 1, \dots, N_1N_2-1\}$, which corresponds to $n_{1,l} \in \{0, 1, \dots, N_1-1\}$ and $n_{2,l} \in \{0, 1, \dots, N_2-1\}$, and $k_l$ and $m_l$ are represented by $k_l=O_1n_{1,l}+q_{1,l}$ and $m_l=O_2n_{2,l}+q_{2,l}$ for layer l=1, 2 . . . , v.

6. The UE of claim 4, wherein $k_l$ and $m_l$ are indicated by a layer-common indicator $i_{1,1}$ and a layer-specific indicator $i_{1,2,l}$, where:

$i_{1,1}$ indicates $q_1 \in \{0, 1, \dots, O_1-1\}$ and $q_2 \in \{0, 1, \dots, O_2-1\}$, $i_{1,2,l}$ indicates a value in $\{0, 1, \dots, N_1N_2-1\}$, which corresponds to $n_{1,l} \in \{0, 1, \dots, N_1-1\}$ and $n_{2,l} \in \{0, 1, \dots, N_2-1\}$, and $k_l$ and $m_l$ are represented by $k_l=O_1n_{1,l}+q_1$ and $m_l=O_2n_{2,l}+q_2$ for layer l=1, 2 . . . , v.

7. The UE of claim 6, wherein payloads of the layer-common indicator $i_{1,1}$ and the layer-specific indicator $i_{1,2,l}$ correspond to $\lceil \log_2 O_1O_2 \rceil$ bits and $\lceil \log_2 N_1N_2 \rceil$ bits, respectively.

8. The UE of claim 1, wherein:

the processor is further configured to determine an indicator $i_{2,l}$ per sub-band or per wideband, where $i_{2,l} \in \{0, 1, \dots, N_{PSK}-1\}$, $$c_l = e^{\frac{j2\pi i_{2,l}}{N_{PSK}}},$$

$N_{PSK}=2^n$, and n is a non-negative integer value, and the inter-polarization coefficient value $c_l$ is indicated by the indicator.

9. A base station (BS) comprising:

a processor; and a transceiver operably coupled to the processor, the transceiver configured to:

transmit information about a channel state information (CSI) report, the information indicating an antenna port group; and receive the CSI report that includes a precoding matrix indicator (PMI), wherein the PMI indicates (i) a spatial domain (SD) basis vector $b_l$ for each layer l=1, 2 . . . , v and (ii) an inter-polarization coefficient value $c_l$ for each layer l=1, 2 . . . , v, where v is a rank value.

10. The BS of claim 9, wherein a precoder matrix indicated by the PMI corresponds to $$W = \frac{1}{\sqrt{vP_{CSI-RS}}}\begin{bmatrix} b_1 & b_2 & \dots & b_v \\ c_1b_1 & c_2b_2 & \dots & c_vb_v \end{bmatrix},$$

where $P_{CSI-RS}$ corresponds to a number of antenna ports associated with the antenna port group.

11. The BS of claim 9, wherein the antenna port group corresponds to a CSI reference signal (CSI-RS) resource or K CSI-RS resources, where K>1.

12. The BS of claim 9, wherein the SD basis vector $b_l$ is a 2D Discrete Fourier Transform (DFT) vector, expressed as:

$$v_{k_l,m_l} = \begin{bmatrix} u_{m_l} & e^{j\frac{2\pi k_l}{O_1N_1}}u_{m_l} & \dots & e^{j\frac{2\pi k_l(N_1-1)}{O_1N_1}}u_{m_l} \end{bmatrix}^T,$$
$$u_{m_l} = \begin{bmatrix} 1 & e^{j\frac{2\pi m_l}{O_2N_2}} & \dots & e^{j\frac{2\pi m_l(N_2-1)}{O_2N_2}} \end{bmatrix}$$

where:

$N_1$ and $N_2$ are numbers of antenna ports in a first dimension and a second dimension of the antenna port group, respectively;

$O_1$ and $O_2$ are values of oversampling factors for the first and second dimensions, respectively; and $k_l \in \{0, 1, \dots, O_1N_1-1\}$, and $m_l \in \{0, 1, \dots, O_2N_2-1\}$.

13. The BS of claim 12, wherein $k_l$ and $m_l$ are indicated by a layer-specific indicator $i_{1,1,l}$ and a layer-specific indicator $i_{1,2,l}$, where:

$i_{1,1,l}$ indicates $q_{1,l} \in \{0, 1, \dots, O_1-1\}$ and $q_{2,l} \in \{0, 1, \dots, O_2-1\}$, $i_{1,2,l}$ indicates a value in $\{0, 1, \dots, N_1N_2-1\}$, which corresponds to $n_{1,l} \in \{0, 1, \dots, N_1-1\}$ and $n_{2,l} \in \{0, 1, \dots, N_2-1\}$, and $k_l$ and $m_l$ are represented by $k_l=O_1 n_{1,l}+q_{1,l}$ and $m_l=O_2 n_{2,l}+q_{2,l}$ for layer l=1, 2 . . . , v.

14. The BS of claim 12, wherein $k_l$ and $m_l$ are indicated by a layer-common indicator $i_{1,1}$ and a layer-specific indicator $i_{1,2,l}$, where:

$i_{1,1}$ indicates $q_1 \in \{0, 1, \ldots, O_1-1\}$ and $q_2 \in \{0, 1, \ldots, O_2-1\}$, $i_{1,2,l}$ indicates a value in $\{0, 1, \ldots, N_1N_2-1\}$, which corresponds to $n_{1,l} \in \{0, 1, \ldots, N_1-1\}$ and $n_{2,l} \in \{0, 1, \ldots, N_2-1\}$, and $k_l$ and $m_l$ are represented by $k_l=O_1 n_{1,l}+q_1$ and $m_l=O_2 n_{2,l}+q_2$ for layer l=1, 2 . . . , v.

15. The BS of claim 14, wherein payloads of the layer-common indicator $i_{1,1}$ and the layer-specific indicator $i_{1,2,l}$ correspond to $\lceil \log_2 O_1O_2 \rceil$ bits and $\lceil \log_2 N_1N_2 \rceil$ bits, respectively.

16. The BS of claim 9, wherein:

an indicator $i_{2,l}$ is per sub-band or per wideband, where $i_{2,l} \in \{0, 1, \ldots, N_{PSK}-1\}$, $$c_l = e^{\frac{j2\pi i_{2,l}}{N_{PSK}}},$$

$N_{PSK}=2^n$, and n is a non-negative integer value, and the inter-polarization coefficient value $c_l$ is indicated by the indicator.

17. A method performed by a user equipment (UE), the method comprising:

receiving information about a channel state information (CSI) report, the information indicating an antenna port group;

determining, based on the information, a spatial domain (SD) basis vector $b_l$ for each layer l=1, 2 . . . , v;

determining, based on the information, an inter-polarization coefficient value $c_l$ for each layer l=1, 2 . . . , v, where v is a rank value; and transmitting the CSI report including a precoding matrix indicator (PMI), wherein the PMI indicates the SD basis vector and the inter-polarization coefficient value.

18. The method of claim 17, wherein a precoder matrix indicated by the PMI corresponds to $$W = \frac{1}{\sqrt{vP_{CSI-RS}}}\begin{bmatrix} b_1 & b_2 & \ldots & b_v \\ c_1b_1 & c_2b_2 & \ldots & c_vb_v \end{bmatrix},$$

where $P_{CSI-RS}$ corresponds to a number of antenna ports associated with the antenna port group.

19. The method of claim 17, wherein the antenna port group corresponds to a CSI reference signal (CSI-RS) resource or K CSI-RS resources, where K>1.

20. The method of claim 17, wherein the SD basis vector $b_l$ is a 2D Discrete Fourier Transform (DFT) vector, expressed as:

$$v_{k_l,m_l} = \begin{bmatrix} u_{m_l} & e^{j\frac{2\pi k_l}{O_1N_1}}u_{m_l} & \ldots & e^{j\frac{2\pi k_l(N_1-1)}{O_1N_1}}u_{m_l} \end{bmatrix}^T,$$

$$u_{m_l} = \begin{bmatrix} 1 & e^{j\frac{2\pi m_l}{O_2N_2}} & \ldots & e^{j\frac{2\pi m_l(N_2-1)}{O_2N_2}} \end{bmatrix}$$

where:

$N_1$ and $N_2$ are numbers of antenna ports in a first dimension and a second dimension of the antenna port group, respectively;

$O_1$ and $O_2$ are values of oversampling factors for the first and second dimensions, respectively; and $k_l \in \{0, 1, \ldots, O_1N_1-1\}$, and $m_l \in \{0, 1, \ldots, O_2N_2-1\}$.

* * * * *